(12) United States Patent
Altrichter

(10) Patent No.: US 11,105,655 B2
(45) Date of Patent: Aug. 31, 2021

(54) INTEGRATED DATA REGISTRATION

(71) Applicant: BAE Systems Information and Electronic Systems Integration Inc., Nashua, NH (US)

(72) Inventor: Wayne W. Altrichter, Chatham, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 700 days.

(21) Appl. No.: 15/785,777

(22) Filed: Oct. 17, 2017

(65) Prior Publication Data

US 2018/0038712 A1 Feb. 8, 2018

Related U.S. Application Data

(63) Continuation-in-part of application No. 14/350,585, filed as application No. PCT/US2013/054248 on Aug. 9, 2013, now abandoned.
(Continued)

(51) Int. Cl.
*G01C 25/00* (2006.01)
*G01S 13/50* (2006.01)
*G01C 21/16* (2006.01)

(52) U.S. Cl.
CPC ............ *G01C 25/00* (2013.01); *G01C 21/165* (2013.01); *G01S 13/50* (2013.01)

(58) Field of Classification Search
CPC ....... G01C 25/00; G01C 21/165; G01S 13/50; G01S 7/295
See application file for complete search history.

(56) References Cited

U.S. PATENT DOCUMENTS 7,782,247 B1 8/2010 VanLaningham et al.
8,610,041 B1 12/2013 Boardman
(Continued)

FOREIGN PATENT DOCUMENTS

WO PCT/US2013/54248 8/2013

OTHER PUBLICATIONS

Allerton et al., "A Review of Multisensor Fusion Methodologies for Aircraft Navigation Systems," (2005), pp. 405-417.*
(Continued)

*Primary Examiner* — John E Breene
*Assistant Examiner* — Eyob Hagos
(74) *Attorney, Agent, or Firm* — Sand, Sebolt & Wernow LPA; Scott J. Asmus

(57) ABSTRACT

A system and method for integrated data registration includes at least one host system and a first sensor where the first sensor provides a first input data. The system and method may further include a second sensor where the second sensor provides a second input data, a first navigation data source where the first navigation data source provides a third input data and a second navigation data source where the second navigation data source provides a fourth input data. The system and method may further include at least one non-transitory computer readable storage medium, in operative communication with the host system, first sensor, the second sensor, the first navigation source and the second navigation source, having at least one set of instructions encoded thereon that, when executed by at least one processor, performs operations to perform integrated data registration.

14 Claims, 8 Drawing Sheets

Related U.S. Application Data

(60) Provisional application No. 61/681,280, filed on Aug. 9, 2012.

(56) References Cited

U.S. PATENT DOCUMENTS

| | | | | |
|---|---|---|---|---|
| 2007/0282529 A1* | 12/2007 | Thompson | ............ | G01C 25/00 |
| | | | | 701/510 |
| 2010/0179758 A1 | 7/2010 | Latif | | |
| 2015/0153178 A1* | 6/2015 | Koo | .................... | G01C 21/165 |
| | | | | 701/472 |
| 2016/0209236 A1* | 7/2016 | Steinhardt | ............ | G01C 21/165 |
| 2017/0307379 A1* | 10/2017 | Steinhardt | ............... | G01S 19/47 |
| 2018/0112983 A1* | 4/2018 | Ahmed | ................ | G01C 21/165 |

OTHER PUBLICATIONS

Howard et al., "Coalitions for Distributed Sensor Fusion," (2002), pp. 636-641.*
Allerton, et al., A Review of Multisensor Fusion Methodologies for Aircraft Navigation Systems, The Royal Institute of Navigation, The Journal of Navigation, 2005, 58, pp. 405-417.
Altrichter, JTIDS Relative Navigation and Data Registration, IEEE AES Magazine, Jun. 1992, pp. 42-50.

* cited by examiner

INTEGRATED DATA REGISTRATION

CROSS REFERENCE TO RELATED APPLICATIONS

This application is a continuation-in-part of U.S. patent application Ser. No. 14/350,585, filed on Apr. 9, 2014, which is a National Phase application of PCT Application No. PCT/US2013/054248, filed Aug. 9, 2013, which claims the benefit of U.S. Provisional Patent Application Ser. No. 61/681,280, filed Aug. 9, 2012, the disclosures of which are incorporated herein by reference.

STATEMENT OF GOVERNMENT INTEREST

The invention was made with U.S. Government support under contract no. H94003-04-D-0002 awarded by the U.S. Air Force. The U.S. Government has certain rights in the invention.

BACKGROUND

Technical Field

The present disclosure relates generally to systems and methods for data registration. More particularly, the present disclosure relates to integrated data registration for improving target accuracy for local and remote data. Specifically, the present disclosure relates to improving target accuracy for local and remote data by estimating and removing bias errors associated with time, sensor, and navigation errors.

Background Information

Typically, an interface unit, such as a military vehicle, includes an interface unit sensor system. An interface unit's sensor system is typically designed to detect and measure the position (and sometimes the radial rate) of objects within its field of view, relative to the sensor aperture. A navigation system is typically designed to measure the position, rates, and orientation of itself (and, to a first approximation, the unit to which it is mounted) relative to the earth, or more precisely, relative to a commonly accepted, high-fidelity model of the earth. Neither of these types of systems can typically perform this measurement task perfectly, and the errors realized in making these measurements can be classified as being of three distinct types.

The first category of errors are random and variable (in that the individual values of a collection of them would appear to be independent of one another), but may be modeled with some degree of accuracy by known statistical distributions. These might also be referred to as "rapidly changing" errors. The second category of errors may or may not be random, but they are relatively slowly varying. The third category of error may or may not be random but are fixed in magnitude, i.e., static.

The first category of error is typically referred to as noise and it is typically addressed using a variety of filtering or smoothing techniques; the second and third categories are commonly referred to as biases and can also be typically addressed using a variety of estimation techniques.

All of these error types are typically present in measurements and, for the types of sensors and navigation systems found in aircraft, ships, and ground units today, the estimation and correction of the errors likely should be addressed if a network data link or sensor networking system is to function properly.

However, estimation and correction of the errors is often difficult. Since an interface unit's sensor aperture is rarely collocated and aligned precisely with the navigation system with which it is associated, there are typically additional biases in the location and orientation of the sensor aperture relative to the navigation system.

Generally, these biases exist no matter how much care is taken to survey the location and orientation of the sensor aperture. That being the case, if precise alignment of sensor data is required for a given application, then all of these biases should typically be estimated and removed before the system can arrive at a correct solution for data registration alignment.

SUMMARY

Issues continue to exist with systems and methods for estimating and removing bias errors associated with time, sensor, and navigation errors. The present disclosure addresses these and other issues by providing a system and method of integrated data registration for estimating and removing bias errors associated with time, sensor, and navigation errors.

In one aspect, the present disclosure may provide a system for integrated data registration comprising: at least one host system and a first sensor. The first sensor provides a first input data. The system may further include a second sensor where the second sensor provides a second input data. The system may further include a first navigation data source where the first navigation data source provides a third input data. The system may further include a second navigation data source where the second navigation data source provides a fourth input data. The system may further include at least one non-transitory computer readable storage medium, in operative communication with the host system, first sensor, the second sensor, the first navigation source and the second navigation source, having at least one set of instructions encoded thereon that, when executed by at least one processor, performs operations to perform integrated data registration, and the instructions including: logic to store the first input data, the second input data, the third input data and the fourth input data in separate files, logic to time-align the second input data with the first input data, logic to time align the fourth input data with the third input data, logic to difference the time-aligned second input data with the first input data, logic to difference the time-aligned fourth input data with the third input data, logic to estimate corrections to the first input data, logic to estimate corrections to the third input data and logic to provide the first input data corrections and the third input data corrections to the at least one host system.

In another aspect, the present disclosure may provide an integrated data registration method comprising providing at least one host system, receiving a first input data from a first sensor, receiving a second input data from a second sensor, receiving a third input data from a first navigation data source and receiving a fourth input data from a second navigation data source. The method may further include storing the first input data, the second input data, the third input data and the fourth input data, time-aligning the second input data with the first input data, time aligning the fourth input data with the third input data, differencing the time-aligned second input data with the first input data and differencing the time-aligned fourth input data with the third input data. The method may further include estimating corrections to the first input data, estimating corrections to the third input data and providing the first input data corrections and the third input data corrections to the at least one host system.

In another aspect, the present disclosure may provide a system and method for integrated data registration including at least one host system and a first sensor where the first sensor provides a first input data. The system and method may further include a second sensor where the second sensor provides a second input data, a first navigation data source where the first navigation data source provides a third input data and a second navigation data source where the second navigation data source provides a fourth input data. The system and method may further include at least one non-transitory computer readable storage medium, in operative communication with the host system, first sensor, the second sensor, the first navigation source and the second navigation source, having at least one set of instructions encoded thereon that, when executed by at least one processor, performs operations to perform integrated data registration.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
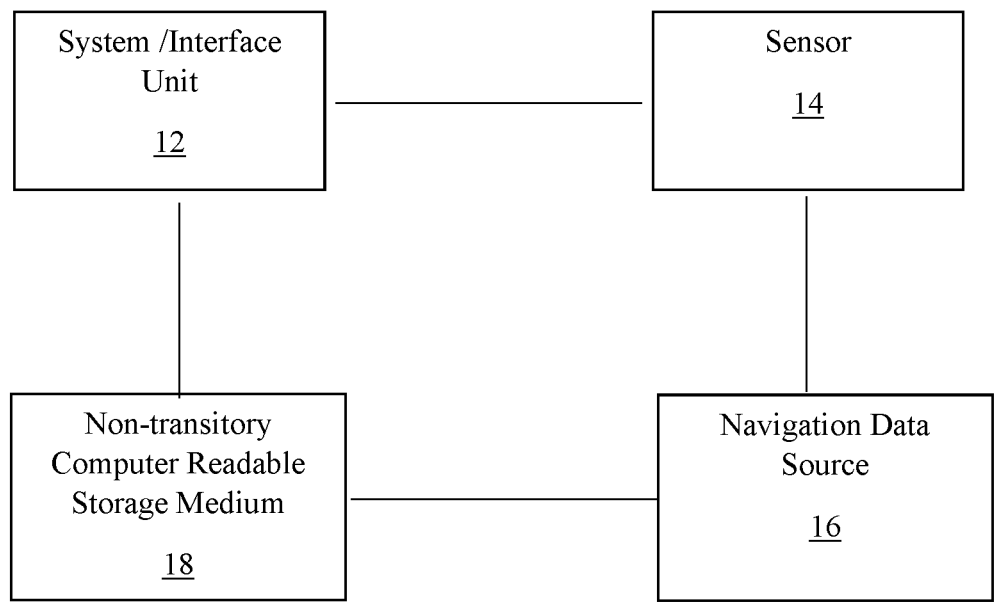
FIG. 1 is a representation of one embodiment of the integrated data registration system.

FIG. 1 depicts one embodiment of a system in accordance with the present disclosure for integrated data registration for removing bias errors associated with time, sensor, and navigation errors generally at 10. System 10 may include at least one host system/interface unit 12, at least one sensor 14, at least one navigation data source 16 and at least one non-transitory computer readable storage medium 18 having instructions encoded thereon that, when executed by at least one processor, performs operations to perform integrated data registration as more fully described below.

In accordance with one aspect of the present disclosure, the system 10 may be implemented in logic and/or software containing algorithms and associated processing required for estimating and removing bias errors associated with time, sensor, and navigation errors. In one example, the integrated data registration algorithms were developed as a general absolute data registration solution that is suitable for a wide variety of interface unit sensor systems. The system 10 may be used to solve for the primary physical errors present in sensor measurement or track position reports received from multiple local sensor apertures or between local and remote units 20.

In one example, each unit is responsible for estimating the time, navigation, and sensor registration errors for each local aperture, e.g., radar 1 and radar 2. This precludes the need to estimate the registration errors of other interface units (assuming those interface units are also using the system 10) and permits the exchange of corrected (i.e., aligned) data amongst network interface units.

One benefit of this approach is that the implementation for the system 10 solution scales with the number of error states of a given sensor on the local interface unit and is completely independent of the number of interface units in a particular network. In one example, the system 10 utilizes an eleven-state geodetic Sensor Registration Kalman Filter (SRKF) augmented with local navigation registration error states. The result is the integrated data registration solution that incorporates time registration, navigation registration, and sensor registration error estimation in a single Kalman filter. In one example, the system 10 is an absolute registration process which utilizes the Universal Time Coordinated (UTC) US Naval Observatory (USNO) time standard and the World Geodetic System-1984 (WGS-84) geodetic reference frame.

In accordance with one aspect of the present disclosure, the time registration errors considered in the system 10 may comprise residual time bias errors that may be present in local sensor measurements. Typically, in a properly designed and integrated interface unit's sensor systems, residual uncompensated time bias errors will be negligible; however, the system 10 processing accommodates the possibility that these bias errors may exist in the local sensor measurements. The system 10 processing estimates these errors and provides the means to remove them as further described below.

In accordance with one aspect of the present disclosure, in order to determine own-unit position, speed, and heading, a typical mobile interface unit may employ both an Inertial Navigation System (INS) and a Global Positioning System (GPS) which operate together to produce a hybrid navigation solution providing continuous position, velocity, and attitude data in the WGS-84 reference frame. An interface unit with a Link-16 data link terminal has its own navigation capability, based on the WGS-84 reference frame, which integrates the local GPS/INS solution with the Precise Participant Location Identification (PPLI) messages received from other network participants. This produces a local unit navigation solution that benefits from the navigation solution of other sources, which can be preferable if the local unit is having difficulty receiving valid GPS updates. Thus, for an interface unit with a Link-16 terminal, there are potentially three distinct and high-quality sources of navigation data available: the INS, the GPS, and the Link-16 navigation solution.

The system 10 architecture monitors the combination of INS, GPS, and Link-16 navigation data to determine if there are any residual uncompensated navigation registration bias errors for the local interface unit. That is, the system 10 does not create or fuse navigation data, but it observes whether or not the interface unit's navigation data contains any bias errors. Through the continuous direct comparison of position measurements from these three sources a Navigation Registration Kalman Filter (NRKF) is used as an estimator to determine any residual navigation registration position bias errors (3-states) for the interface unit. It can also be shown that measurements of common air objects (CAOs) (i.e., measurements from multiple sensors used to update the track of a single object from both local and remote sensors may be used to estimate residual navigation registration bias errors. Again, this is distinct from the interface unit's fusion or combining of its local navigation systems data. These CAO measurements are generally only useful in the case where both the local GPS and Link-16 navigation accuracies become degraded or when that data is unavailable, but the system accommodates that possibility as described more fully below.

Figure 2:
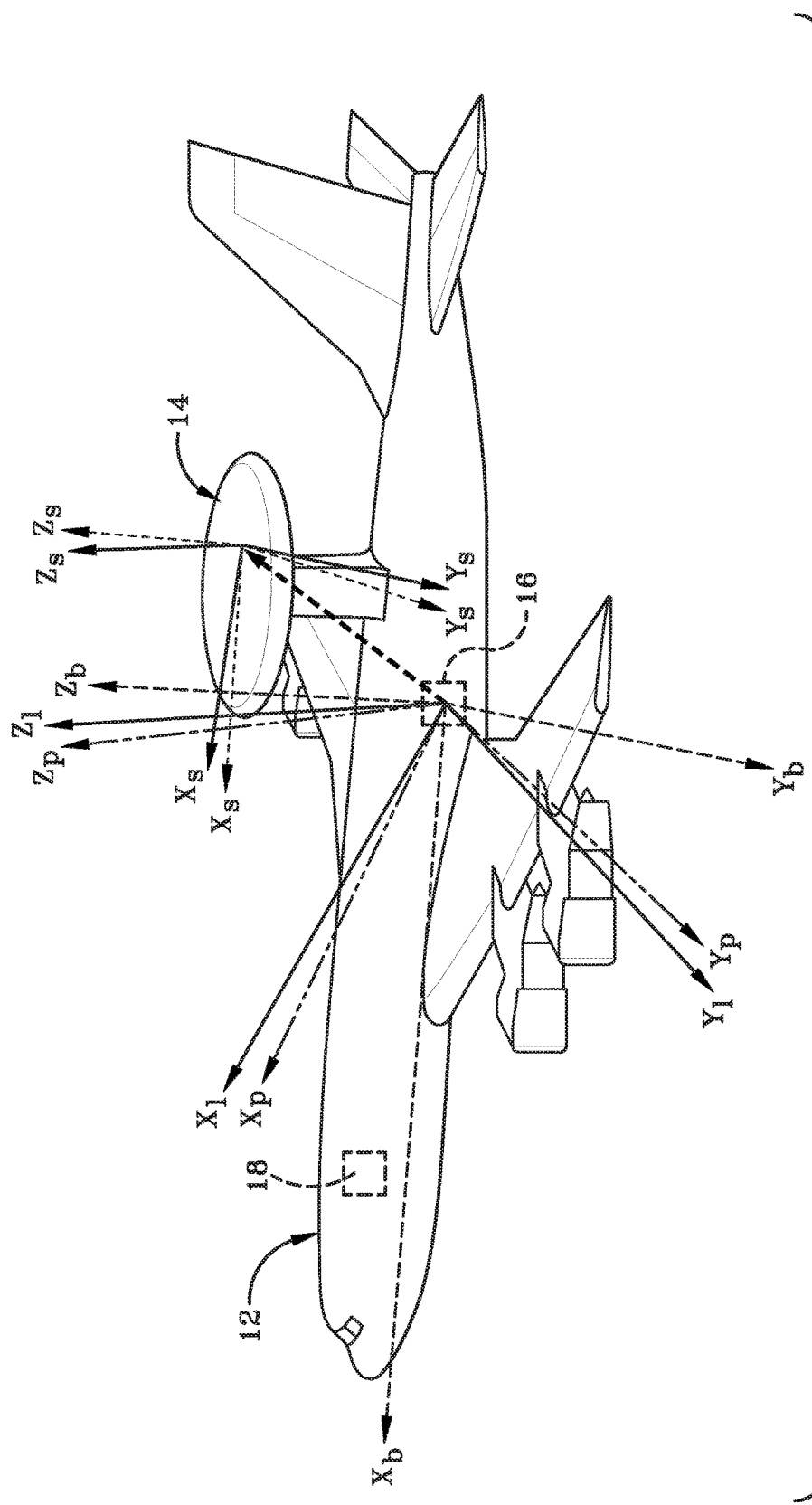
FIG. 2 is a schematic representation of an aircraft sensor and navigation coordinate frames.

In accordance with one aspect of the present disclosure, sensor measurement bias errors (e.g. range, azimuth, elevation, and range-rate), and sensor aperture alignment bias errors (the aperture orientation angles) relative to the body-frame of the interface unit, are the primary sensor errors contributing to biased sensor measurement reports. FIG. 2 illustrates the relevant coordinate frames for an interface unit's, depicted as an aircraft's, navigation and sensor systems. FIG. 2. depicts the X, Y and Z axes for the local level frame (l-frame) as $X_l$, $Y_l$ and $Z_l$, the platform frame (p-frame) as $X_p$, $Y_p$ and $Z_p$, the body frame (b-frame) as $X_b$, $Y_b$ and $Z_b$, and the sensor aperture frame (s-frame) as $X_s$, $Y_s$, and $Z_s$. Estimation and correction of the sensor bias errors is preferable, since measurement accuracy determines, at least in part, the performance of an interface unit's tracking algorithms such as track-to-track correlation, measurement-to-track association, and critical downstream processing functionality such as combat identification and engagement planning/prosecution.

In accordance with one aspect of the present disclosure, the system 10 may be configured to estimate and remove biases and align the sensor measurements to the WGS-84 reference frame and UTC (USNO) time standard. The Sensor Registration portion of the system 10 models eleven fundamental physical errors to estimate the sensor measurement range, bearing, elevation, and range-rate bias errors, the aperture alignment bias errors (aperture orientation angles), and sensor time bias errors. It is important to note that the Sensor Registration corrections applied to a given measurement are a function of the location of each measurement within the field-of-view (FOV) of the sensor aperture, i.e., the corrections are not simply constant offset values across the entire FOV of the sensor aperture but vary with the location of the object relative to the aperture. The system 10 accounts for this physical geometric variation. This capability is a direct result of employing a high-fidelity error model in the bias estimation process for each sensor aperture on the local unit as more fully described below.

In accordance with one aspect of the present disclosure, the reference or measurement data used by the IDR sensor registration algorithm may be obtained from a variety of Self-Reporting Objects (SROs) as well as sensor measurements of air tracks mutually, i.e., common objects, held by local or remote sensors in the network. The Link-16 PPLI reports represent a high-quality source reference data, but other types of SRO sources are available and can be used by the system 10 (e.g., Identify Friend or Foe (IFF) Mode S and IFF Mode 5 reports). The ability to use local or remote measurements on CAOs (mutually held tracks) offers a significant degree of robustness for those operating environments that do not have significant numbers of SROs.

In accordance with one aspect of the present disclosure, the sensor registration processing when augmented with the navigation registration states produces a fully integrated data registration capability using the composite time, navigation, and sensor bias estimator termed the Data Registration Kalman Filter (DRKF) as more fully described below. The DRKF models local time, navigation, and sensor registration errors in a single 14-state Kalman filter. In addition to the navigation-derived geodetic sensor registration measurements (i.e., SROs) employed by the sensor registration process, the DRKF of the fully integrated registration process also includes navigation registration measurements based on the direct comparisons of local navigation data from the INS, GPS, and Link-16 developed in the NRKF. Further, the DRKF may utilize common (or mutual) target observations from multiple local or remote sensors to estimate data registration errors. In one example, it is this fully integrated treatment of data registration—geodetic sensor registration, navigation registration, and time registration—utilizing SRO data as well as measurements from CAOs, that results in the capability of the system 10.

In accordance with one aspect of the present disclosure, the NRKF may provide estimation of the local hybrid INS residual position errors using comparison of the local hybrid INS data with either GPS or Link 16 position data. If the local hybrid INS is tracking GPS or Link 16 position then these residual NR errors should be relatively small. Conversely, when the local hybrid INS, GPS, and Link 16 positions are not in agreement then either the integration of these navigation systems has errors or one or more of these sources has degraded performance, e.g., GPS denied environments. Hence, the NRKF may also be used to detect navigation integration or performance problems.

Figure 3:
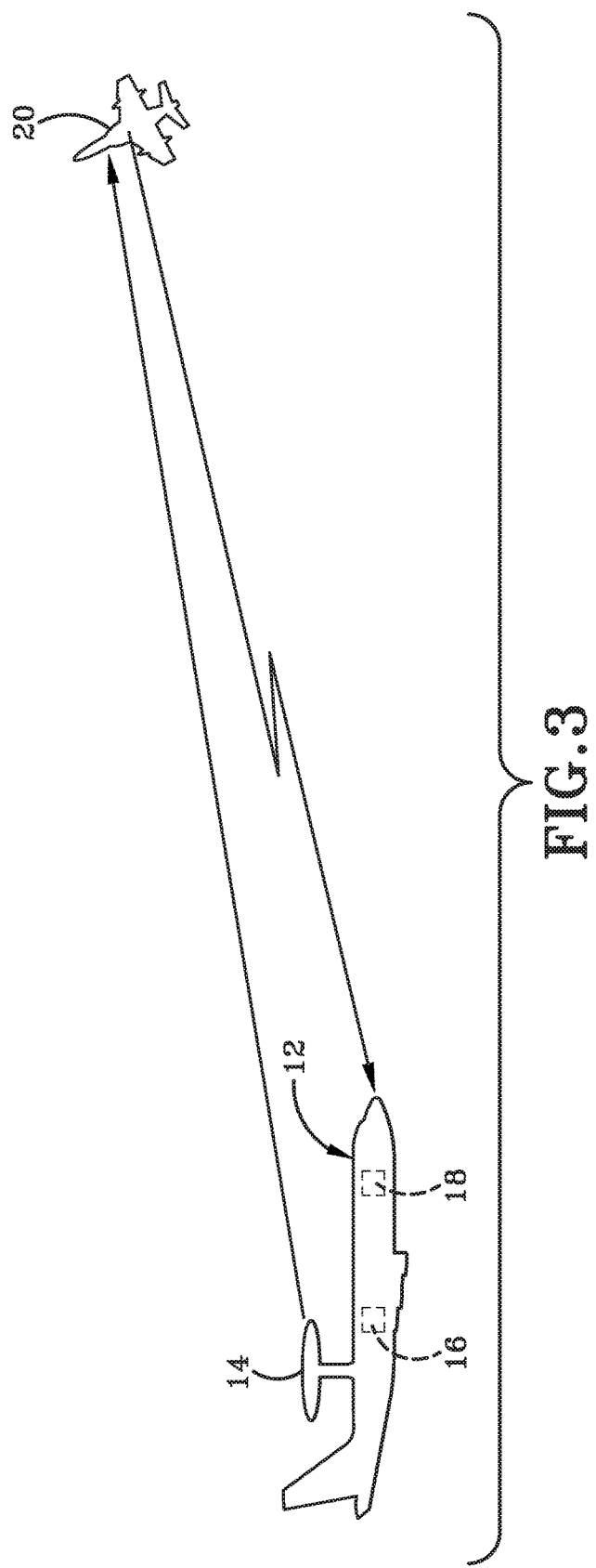
FIG. 3 is a schematic representation of the integrated data registration system including a self-reporting object.

In accordance with one aspect of the present disclosure, the DRKF may provide absolute geodetic alignment of an interface unit's sensor apertures. SROs, such as Link 16 PPLIs, received by the interface unit along with the interface unit's local navigation data may be used to derive measurements of the sensor registration bias errors when the interface unit's sensor aperture measurements are unambiguously associated with the SROs. FIG. 3 illustrates the geodetic sensor registration concept for an aircraft receiving an SRO or PPLI from another aircraft unit for which it also has a local sensor radar measurement for the SRO unit. In this example, the aircraft sensor registration errors are estimated using measurements obtained by computing range, bearing, and elevation based on the received SRO or PPLI position messages from another network participating unit (cooperating friendly units) and the aircraft's own navigation position data and then differencing the computed values with the corresponding aircraft's radar sensor measurement values as more fully described below. These differences in range, bearing, and elevation (navigation derived minus sensor measured) are used as measurements in the DRKF to estimate the local sensor registration bias errors for the aircraft.

Figure 4:
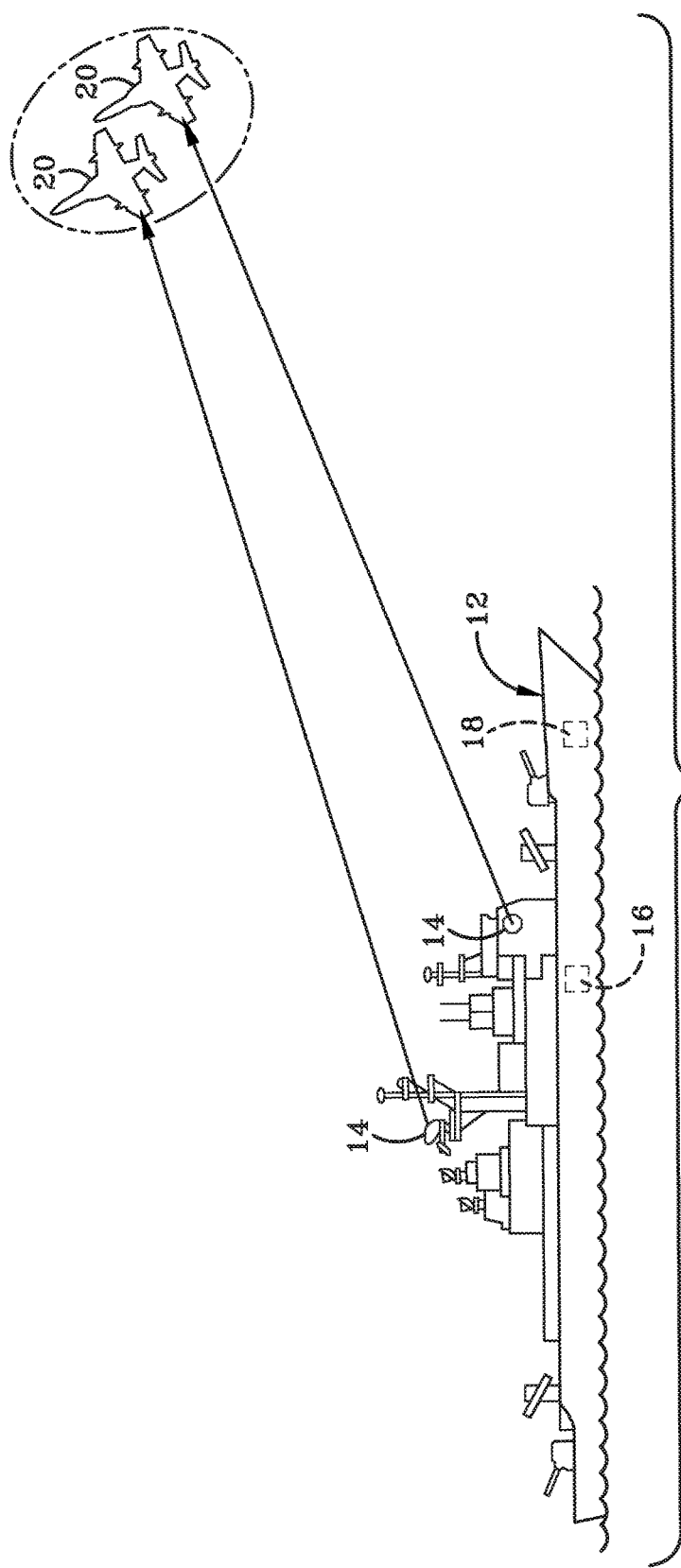
FIG. 4 is a schematic representation of the integrated data registration system including local-to-local sensor registration with common objects.

In accordance with one aspect of the present disclosure, multiple local sensor apertures within an interface unit that use the same local navigation system may have some targets within their respective FOVs that are in common. If one of these sensor apertures has superior sensor registration accuracy relative to the other, then it may serve as a reference to estimate the bias errors for the inferior sensor aperture. FIG. 4 illustrates the concept for two local unit apertures viewing the same common target. In this example, an interface unit's first and second sensor share a common inertial navigation system (INS) allowing the first sensor measurements to be transformed into the sensor coordinates of the second sensor to provide range, bearing, and elevation difference measurements for aligning the second sensor with the first sensor. With sufficient common objects all sensors within an interface unit may be aligned to reference sensor apertures having the higher accuracy sensor data.

Figure 5:
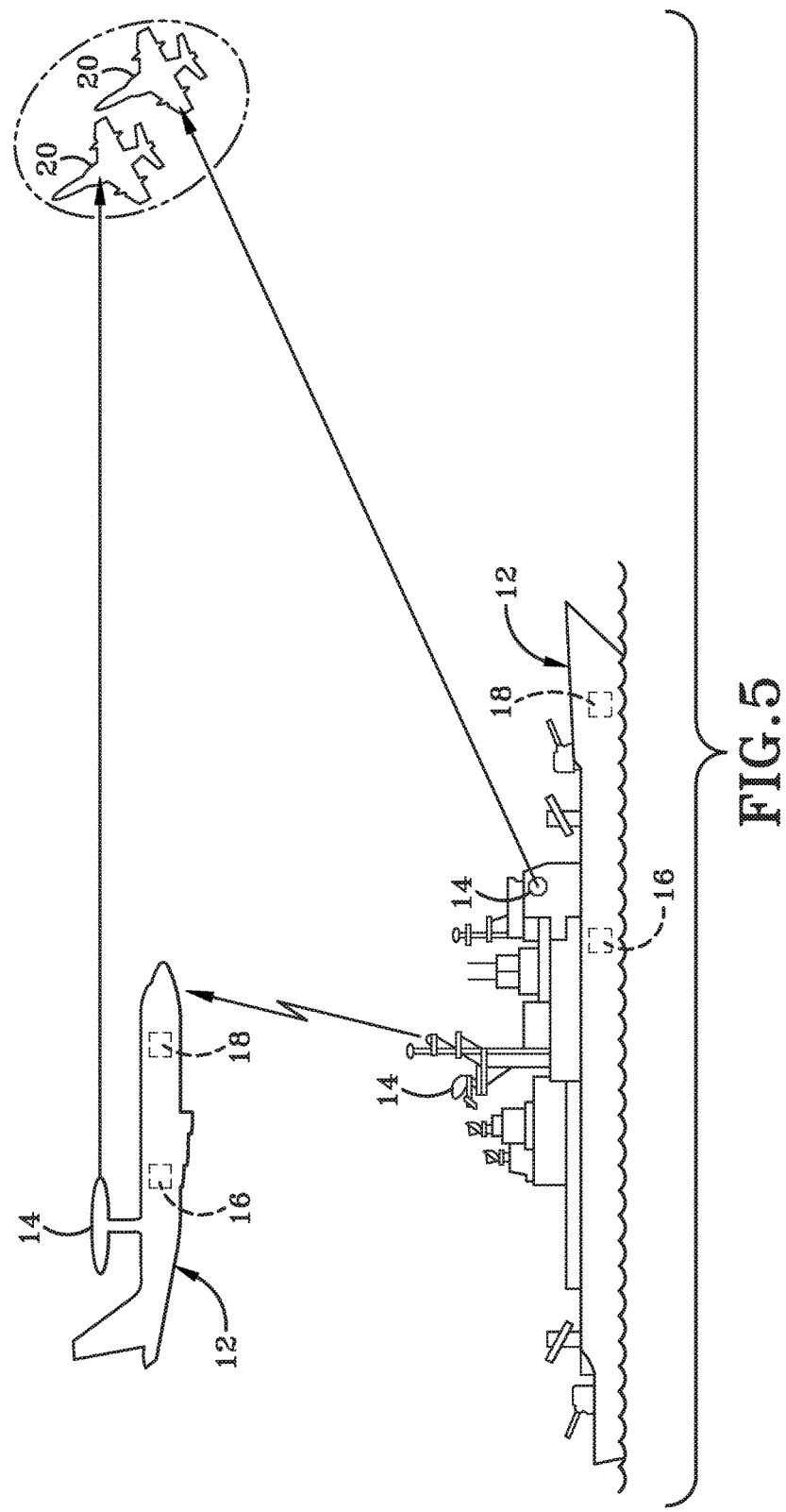
FIG. 5 is a schematic representation of the integrated data registration system including local-to-remote navigation registration and sensor registration with common objects.

In accordance with one aspect of the present disclosure, a local interface unit's sensor aperture with its local navigation system may have some targets in common with a remote interface unit. If the remote unit reports superior geodetic accuracy for the common target relative to the local interface unit's sensor accuracy, then the remote interface unit's target position may be used as a reference to estimate the navigation registration and sensor registration errors for the local interface unit's sensor system. FIG. 5 illustrates the concept for this local-to-remote common air object registration. In this example, the aircraft unit navigation registration and sensor registration bias errors may be estimated using the common air object position reported by the ship unit. With sufficient common objects between a local interface unit's sensor apertures and the associated common objects received from one or more remote interface units, the local sensor apertures may be aligned to the best available remote data. In this configuration it is important to note that for multiple sensor apertures the DRKF estimation of the navigation registration errors will be independent for each sensor aperture. These independent estimates of navigation registration errors are combined to create a composite navigation registration solution. The combined position bias error measurements for the NRKF may provide this function. If the NRKF estimates have small residual error based on the NRKF covariance, then the estimates may be accepted by the DRKF as known navigation registration position errors in its state vector and covariance matrix.

Figure 6:
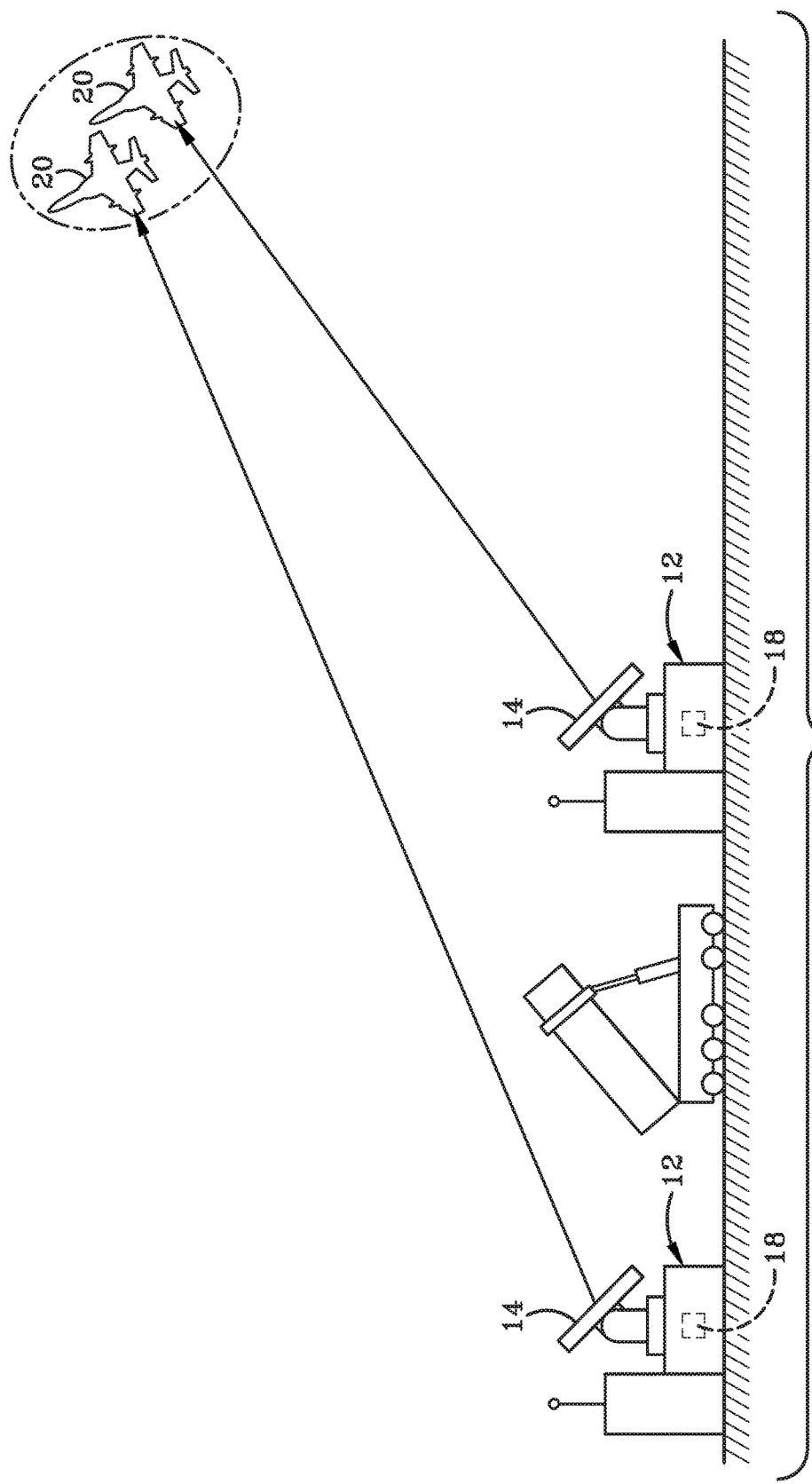
FIG. 6 is a schematic representation of the integrated data registration system including local-to-local navigation registration and sensor registration with independent navigation systems.
Figure 7:
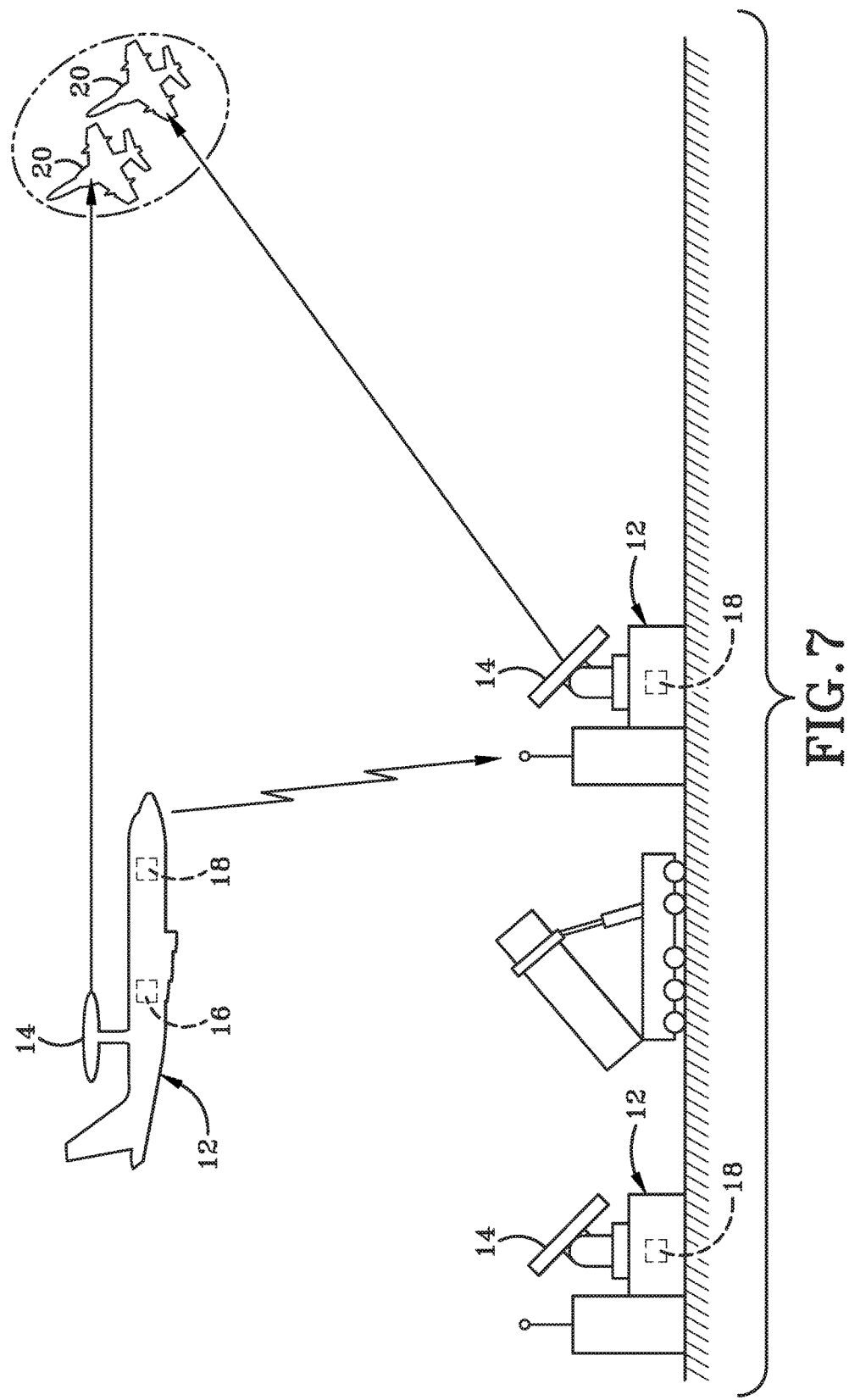
FIG. 7 is a schematic representation of the integrated data registration system including local-to-remote navigation registration and sensor registration with independent navigation systems.

In accordance with one aspect of the present disclosure, a local interface unit may have sensor apertures that are geographically separated with each having its own independent local navigation system, e.g., a Patriot weapon system. The local sensor apertures will all have separate GPS inputs of their respective positions. An interface unit's local sensor aperture may have objects in common with another of its local sensor apertures, or it may share a common target with a remote interface unit. Both types of common objects may be used for data registration. If a local interface unit's aperture reports superior accuracy for a target in common with another local interface unit aperture then the superior aperture's estimate of the target position may be used as a reference to register the other local sensor aperture as illustrated in FIG. 6. In this example, the navigation registration and sensor registration bias errors of the geographically separated local sensor apertures may be estimated using any common target positions derived from other apertures within the local interface unit. This is similar to the case in FIG. 4 except that each local sensor aperture has a separate independent navigation system with its unique navigation registration bias errors in contrast to the notion of a common navigation system. With sufficient common objects among the local interface unit's apertures, the local sensor apertures may be aligned to the best available local sensor aperture target data. If a remote interface unit reports superior geodetic accuracy for a target that is common to a local sensor aperture, as depicted in FIG. 7, then the remote object may be used as a reference to estimate the local aperture navigation registration and sensor registration bias errors. The estimation process for both cases in FIG. 6 and FIG. 7 is the same. The only distinction is whether the reference information is derived from another local interface unit sensor aperture or from a common target reported by a remote interface unit. These examples are also equivalent to the local-to-remote navigation registration and sensor registration case employing the common navigation system illustrated in FIG. 7 with the distinction that the navigation registration bias errors are unique to the local aperture and therefore do not require integration with other local sensor aperture navigation registration bias errors in the NRKF. Each of these measurement configurations utilize the DRKF which models fourteen error states based on the concatenation of the 11-state SRKF and the 3-state NRKF models.

In accordance with one aspect of the present disclosure, the system 10 may be implemented in a manner suitable for integration in a wide variety of military or commercial systems. In one example, the system 10 may utilize a collection of algorithms that execute the fundamental data registration processing required to estimate time registration, navigation registration, and sensor registration bias errors for a variety of host interface unit types using a variety of reference data sources as more fully described below. The system 10 capability may comprise five distinct functional areas: 1. data registration source selection and buffering; 2. measurement preprocessing comprising a. local common navigation registration preprocessing; b. geodetic SRO sensor registration preprocessing; c. local common air object sensor registration preprocessing (with common navigation systems); d. local common air object navigation registration and sensor registration preprocessing (with separate independent navigation systems) and e. local/remote common air object navigation registration and sensor registration preprocessing; 3. data registration filter preprocessing and screening; 4. three-state navigation registration Kalman filter (NRKF) and 5. 14-state data registration Kalman filter (DRKF).

In accordance with one aspect of the present disclosure, the host interface unit system may provide the necessary input data to the system 10 source selection and buffering processing. This input data may include all local navigation data (INS, GPS, Link-16, etc.), all Self-Reported Objects (SROs) received by communication systems (e.g., Link-16 PPLI, IFF Mode S, IFF Mode 5, etc.), all corrected and uncorrected local and remote sensor measurements for the Common Air Object (CAO) tracks, the local sensor measurements associated with the SRO tracks, and a variety of sensor and platform adaptation data which may provide interface unit-specific information on the local sensors and systems. This data may be assessed for quality and quantity and stored in buffers for subsequent processing. In one example, the buffering is necessary because the NRKF and DRKF may be run periodically on batches (or windows) of data. The selected and buffered data is then subjected to a variety of measurement preprocessing (e.g., interpolation, extrapolation), depending on the type of data available and thus the type of registration being performed.

In one example, there are five distinct types of data registration that can be activated, depending on the data available and the type of host system being registered. The type of data registration activated is determined automatically by the system 10 based on the data received from the host interface unit as more fully described below. The types of data registration may include: 1. local navigation registration bias error estimation; 2. local geodetic sensor registration bias error estimation; 3. local common air object sensor registration bias error estimation (where all local sensors share a common navigation system); 4. local common air object navigation and sensor registration bias error estimation (where each local aperture uses a unique and thus independent navigation system) and 5. local/remote common air object navigation and sensor registration bias error estimation (where the remote data is used as the reference source for aligning local data).

In one example, the preprocessed local navigation measurement data is passed directly to the NRKF which produces the navigation bias error corrections and an associated covariance matrix indicating the accuracy of the estimates. The preprocessed sensor measurement data is passed to logic that prepares and screens that data for use by the DRKF. The resulting DRKF measurement sets are then processed by the 14-state DRKF which produces the sensor bias error corrections and associated covariance matrix indicating the estimation accuracy. In one example, the NRKF and DRKF exchange their independently derived navigation bias correction estimates for use in their own processing to maintain consistency.

Figure 8:
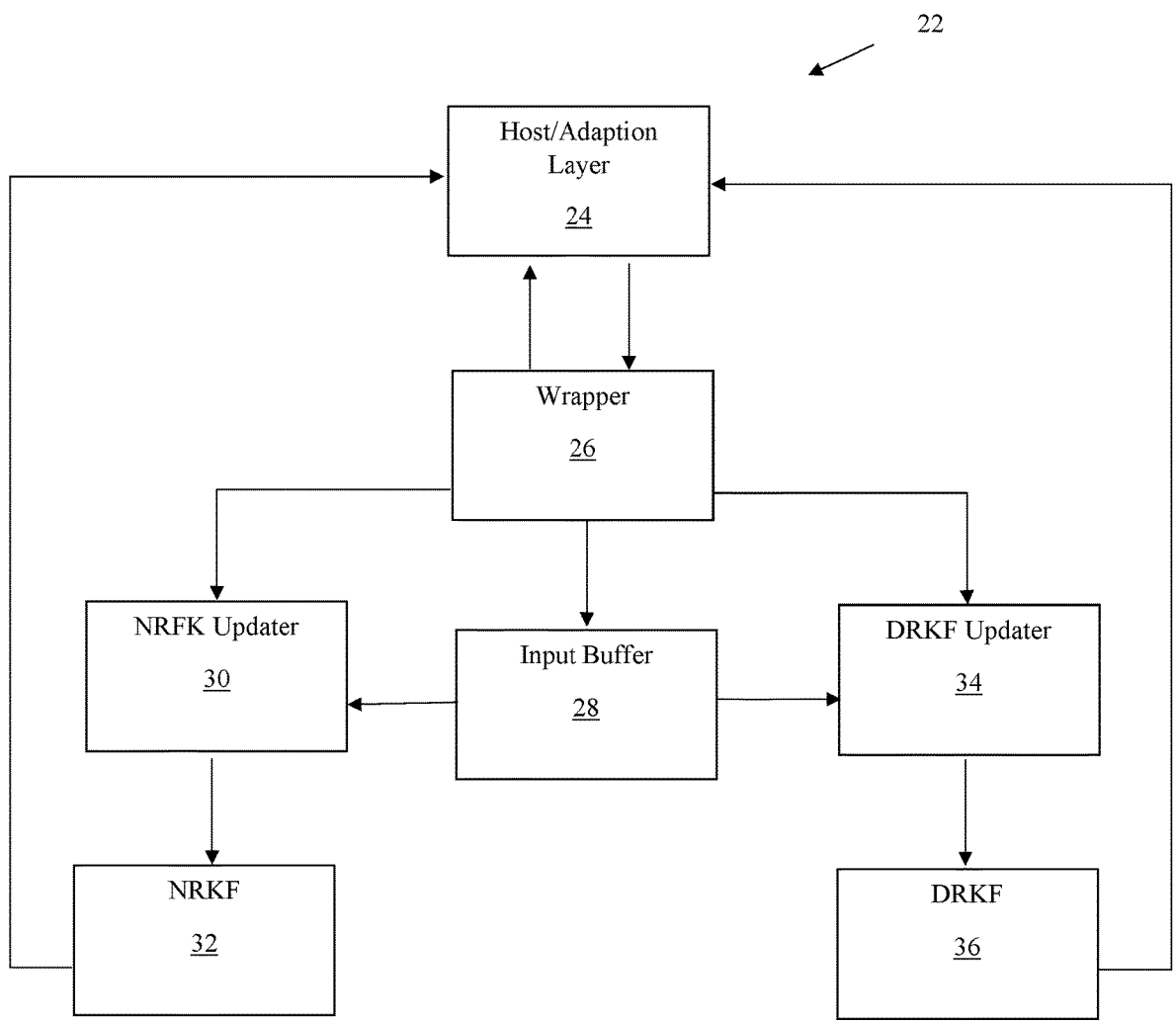
FIG. 8 is one exemplary architecture of the system of the present disclosure.

FIG. 8 illustrates a high-level design of the architecture 22 of the system 10 and its functionality. As depicted in FIG. 8, and in accordance with one embodiment of the present disclosure, the architecture 22 of the system 10 may include a host/adaptation layer 24, a wrapper 26, an input buffer 28, an NRFK updater 30, an NRKF 32, a DRKF updater 34 and a DRKF 36. Local Associated Measurement Reports (AMRs), CAO AMRs, SRO reports, hybrid navigation reports may be transmitted from the host/adaptation layer 24 to the wrapper 26. Local AMRs, CAO AMRs, SRO reports, hybrid navigation reports, reference navigation data, navigation error estimates and navigation corrections may be transmitted to the input buffer 28. Local AMRs, CAO AMRs, SRO reports, and corrected hybrid navigation reports may be transmitted to the DRKF updater 34. The DRKF updater 34 transmits observed biases to the DRKF 36 which transmits sensor corrections and navigation corrections to the host/adaptation layer 24. Hybrid navigation reports, reference navigation data and navigation error estimates are transmitted to the NRKF updater 30. The NRKF updater 30 transmits observed biases to the NRKF 32 which transmits navigation corrections to the host/adaptation layer 24. The wrapper 26 also transmits a start trigger and navigation corrections from the NRKF 32 to the DRKF updater 34 and a start trigger and navigation corrections from the DRKF 36 to the NRKF updater 30.

The above information has been provided as a broad representation of teachings of the present disclosure. More specific information and representations of the teachings of the present disclosure are provided in the following sections.

1. DATA REGISTRATION ERROR SOURCES. Data Registration is the process of an interface unit (IU) estimating its bias errors associated with its sensor target reports consisting of a range ($\rho$), bearing ($\theta_B$), elevation ($\theta_E$), and possibly range-rate ($\dot{\rho}$), to ensure that all target reports have zero-mean error with respect to World Geodetic System 1984 (WGS-84) geodetic coordinates. Data registration errors result from an IU's errors in navigation, sensor location, sensor alignment, and sensor measurements (including environmental effects). In addition, time registration error may result from the time-tag associated with the sensor measurement. The target report errors may be determined by examining the equation for the expression of a target in WGS-84 coordinates.

The navigation system for each IU provides position, velocity, and alignment in the common WGS-84 frame of reference (e-frame), which provides the stable element for transforming IU local sensor target reports into WGS-84 coordinates. The IU uses its navigation system as the reference for its track files, and for correlating remote tracks with local tracks. The degree of accuracy in registering targets depends directly upon navigation accuracy, principally position and alignment errors, and the sensor errors associated with measuring the target, i.e., range, bearing, and elevation errors, and sensor alignment errors relative to WGS-84. The following sections provide the equations describing target position, and the corresponding registration errors, developed in earth-referenced WGS-84 coordinates.

1.1 Geodetic (WGS-84) Target Equation. A target's position as measured by an IU's sensor, denoted ($\Delta\vec{r}_{tr}$), may be expressed in terms of range ($\rho$), bearing ($\theta_B$), and elevation ($\theta_E$) with respect to the IU's sensor frame coordinates (s-frame). Then, in order to represent this target report measurement in WGS-84 coordinates, the IU must transform the target measurement from the s-frame to the e-frame using the transformations $T_{b\tilde{s}}$, $T_{s\tilde{s}}$, $T_{bp}$, $T_{lp}$, and $T_{le}$. The target vector may be expressed as a relative position vector in the sensor (s-frame) as:

$$(\Delta\vec{r}_{tr})_s = \begin{pmatrix} \Delta r_{trxs} \\ \Delta r_{trys} \\ \Delta r_{trzs} \end{pmatrix}_s = \begin{pmatrix} \rho C_{\theta_B} C_{\theta_E} \\ \rho S_{\theta_B} C_{\theta_E} \\ \rho S_{\theta_E} \end{pmatrix}_s. \qquad \text{Eq. 1}$$

It is also assumed here that the sensor data can be physically aligned to the IU's body coordinates (b-frame) using the transformation $T_{bs} = T_{b\tilde{s}} T_{\tilde{s}s}$, with fixed surveyed angles for $\psi_x$, $\psi_y$, and $\psi_z$, and sensor misalignment angles, $\omega_x$, $\omega_y$, and $\omega_z$. While it is necessary to account for the fixed survey angles, the error analysis will focus on the misalignment angles. Therefore, the sensor data in the b-frame may be expressed as:

$$(\Delta\vec{r}_{tr})_b = \begin{pmatrix} \Delta r_{trxb} \\ \Delta r_{tryb} \\ \Delta r_{trzb} \end{pmatrix}_b = \qquad \text{Eq. 2}$$

$$T_{bs}\begin{pmatrix} \rho C_{\theta_B} C_{\theta_E} \\ \rho S_{\theta_B} C_{\theta_E} \\ \rho S_{\theta_E} \end{pmatrix}_s = T_{b\tilde{s}}\begin{pmatrix} 1 & -\varphi_z & \varphi_y \\ \varphi_z & 1 & -\varphi_x \\ -\varphi_y & \varphi_x & 1 \end{pmatrix}\begin{pmatrix} \rho C_{\theta_B} C_{\theta_E} \\ \rho S_{\theta_B} C_{\theta_E} \\ \rho S_{\theta_E} \end{pmatrix}_s.$$

The target vector in Eq. 2 may be expressed in the navigation p-frame, using the roll, pitch, and yaw transformation, $T_{bp}$, and the lever arm vector $(\vec{l})_b$ between the navigation system and the sensor aperture, such that:

$$(\Delta\vec{r}_{tr})_p = \begin{pmatrix} \Delta r_{trxp} \\ \Delta r_{tryp} \\ \Delta r_{trzp} \end{pmatrix}_p = T_{bp}^T\left\{\begin{pmatrix} \ell_x \\ \ell_y \\ \ell_z \end{pmatrix}_b + \begin{pmatrix} \Delta r_{trxb} \\ \Delta r_{tryb} \\ \Delta r_{trzb} \end{pmatrix}_b\right\}. \qquad \text{Eq. 3}$$

The estimation of the errors associated with Eq. 2 and Eq. 3 defines the Sensor Registration problem.

The complete expression of a target's location in the e-frame is written as:

$$(\vec{r}_{tr})_e = \begin{pmatrix} x_{etr} \\ y_{etr} \\ z_{etr} \end{pmatrix}_e = (\vec{r})_e + T_{le}^T T_{lp} T_{bp}^T\left\{(\vec{l})_b + T_{b\tilde{s}} T_{\tilde{s}s}(\Delta\vec{r}_{tr})_s\right\}. \qquad \text{Eq. 4}$$

This fundamental expression of a target's position, may be separated into two parts, a Sensor Registration part, and a Navigation Registration part. The Sensor Registration part is given by Eq. 2 and Eq. 3 as:

$$(\Delta \vec{r}_{tr})_p = T_{bp}^T\{(\vec{l})_b + T_{b\bar{s}}T_{\bar{s}s}(\Delta \vec{r}_{tr})_s\}, \quad \text{Eq. 5}$$

where $(\vec{l})_b$ is the lever arm between the sensor coordinates and the navigation coordinates, $T_{bs} = T_{b\bar{s}}T_{\bar{s}s}$ is the sensor misalignment transformation relative to the b-frame, $(\Delta \vec{r}_{tr})_s$ is the Cartesian representation of the sensor measurement in range, bearing, and elevation, and $T_{bp}$ is the b-frame attitude transformation in roll, pitch, and yaw. The Navigation Registration part relates the sensor part in Eq. 5 to the WGS-84 e-frame, and is written as:

$$(\vec{r}_{tr})_e = \begin{pmatrix} x_{etr} \\ y_{etr} \\ z_{etr} \end{pmatrix}_e = (\vec{r})_e + T_{le}^T T_{lp}(\Delta \vec{r}_{tr})_p, \quad \text{Eq. 6}$$

where $(\vec{r})_e$ is the IU's position vector expressed in the e-frame, $T_{lp}$ is the navigation misalignment transformation between the p-frame and the l-frame, and $T_{le}$ is the direction cosine transformation from the l-frame to the e-frame. Eq. 5 corresponds to the transformation of the sensor data into the navigation platform frame (p-frame). Eq. 6 corresponds to the transformation of the target position into the WGS-84 (e-frame) coordinates. This separation is conceptually and physically important to data registration, because navigation registration errors and sensor registration errors may be solved for as separate independent processes. The target position in the e-frame, from Eq. 6, has components given by:

$$\begin{pmatrix} x_{etr} \\ y_{etr} \\ z_{etr} \end{pmatrix}_e = \begin{pmatrix} (r_{ewtr} + h_{tr})C_{\lambda_{tr}}C_{\phi_{tr}} \\ (r_{ewtr} + h_{tr})C_{\lambda_{tr}}S_{\phi_{tr}} \\ [(1-e^2)r_{ewtr} + h_{tr}]S_{\lambda_{tr}} \end{pmatrix}_e, \quad \text{Eq. 7}$$

where the latitude $\lambda_{tr}$, longitude $\phi_{tr}$, and altitude $h_{tr}$ of the target may be determined using an iterative procedure. The geodetic position of the target is the format for distribution to other IU processes and for transmission as a "Target Track" message to other IU's on the data links. It is necessary to reference the target data to the geodetic navigation solution for transmission of geodetic "Target Track" messages in order to achieve accurate, inertially stable, WGS-84 geodetic data registration. The navigation system provides an accurate, stable reference, in three dimensions for position, velocity, and alignment, thereby achieving coherency in the local IU reference frames for navigation data, target measurement reports, and tracks.

1.2 Geodetic Target Registration Error. The expression for the geodetic target registration error may be derived using a first-order Taylor series expansion of Eq. 4 with respect to the dominant sources of navigation and sensor errors. The dominant navigation errors consist of: errors in position ($\lambda$, $\phi$, h), and errors in platform misalignment ($\theta_x$, $\theta_y$, $\theta_z$). The dominant sensor errors consist of: errors in sensor measurement ($\rho$, $\theta_B$, $\theta_E$) and errors in sensor alignment ($\varphi_x$, $\varphi_y$, $\varphi_z$). The error equations below denote estimated quantities using the symbol "^", and errors are defined as "true minus estimated" using the symbols "δ" or "ε". Thus, the target registration error is expressed as:

$$\delta(\vec{r}_{tr})_e = \delta(\vec{r})_e + T_{le}^T \begin{pmatrix} 0 & \Delta r_{trzp} & -\Delta r_{tryp} \\ -\Delta r_{trzp} & 0 & \Delta r_{trxp} \\ \Delta r_{tryp} & -\Delta r_{trxp} & 0 \end{pmatrix} \begin{pmatrix} \varepsilon\theta_x \\ \varepsilon\theta_y \\ \varepsilon\theta_z \end{pmatrix} + \left.\begin{matrix}\\ \\ \end{matrix}\right\} \text{Navigation Errors} \quad \text{Eq. 8}$$

$$T_{le}^T T_{lp} T_{bp}^T \begin{pmatrix} \varepsilon\ell_{xb} \\ \varepsilon\ell_{yb} \\ \varepsilon\ell_{zb} \end{pmatrix} + T_{le}^T T_{lp} T_{bp}^T T_{b\bar{s}} \begin{pmatrix} 0 & \Delta r_{trzs} & -\Delta r_{trys} \\ -\Delta r_{trzs} & 0 & \Delta r_{trxs} \\ \Delta r_{trys} & -\Delta r_{trxs} & 0 \end{pmatrix} \begin{pmatrix} \varepsilon\varphi_x \\ \varepsilon\varphi_y \\ \varepsilon\varphi_z \end{pmatrix} +$$

$$T_{le}^T T_{lp} T_{bp}^T T_{b\bar{s}} T_{\bar{s}s} \begin{pmatrix} C_{\theta_B}C_{\theta_E} & -\rho S_{\theta_B}C_{\theta_E} & -\rho C_{\theta_B}S_{\theta_E} \\ S_{\theta_B}C_{\theta_E} & \rho C_{\theta_B}C_{\theta_E} & -\rho S_{\theta_B}S_{\theta_E} \\ S_{\theta_E} & 0 & \rho C_{\theta_E} \end{pmatrix} \begin{pmatrix} \varepsilon\rho \\ \varepsilon\theta_B \\ \varepsilon\theta_E \end{pmatrix}, \left.\begin{matrix}\\ \\ \end{matrix}\right\} \text{Sensor Errors}$$

$$\text{where } \delta(\vec{r}_{tr})_e = \begin{pmatrix} \delta x_{etr} \\ \delta y_{etr} \\ \delta z_{etr} \end{pmatrix} = \begin{pmatrix} x_{etr} - \hat{x}_{etr} \\ y_{etr} - \hat{y}_{etr} \\ z_{etr} - \hat{z}_{etr} \end{pmatrix}. \quad \text{Eq. 9}$$

The Navigation Registration errors in Eq. 8 are defined as:

$$\delta(\vec{r})_e = \begin{pmatrix} \delta x_e \\ \delta y_e \\ \delta z_e \end{pmatrix} = \begin{pmatrix} x_e - \hat{x}_e \\ y_e - \hat{y}_e \\ z_e - \hat{z}_e \end{pmatrix}, \quad \text{Eq. 10}$$

$$\varepsilon\theta_x = \theta_x - \hat{\theta}_x, \varepsilon\theta_y = \theta_y - \hat{\theta}_y, \varepsilon\theta_z = \theta_z - \hat{\theta}_z, \quad \text{Eq. 11}$$

where the position error $\delta(\vec{r})_e$ may be rewritten in terms of errors in latitude, $\varepsilon\lambda$, longitude, $\varepsilon\phi$, and altitude, $\varepsilon h$, as:

$$\begin{pmatrix} \delta x_e \\ \delta y_e \\ \delta z_e \end{pmatrix} = \begin{pmatrix} -(r_{ew}+h)S_\lambda C_\phi & -(r_{ew}+h)C_\lambda S_\phi & C_\lambda C_\phi \\ -(r_{ew}+h)S_\lambda S_\phi & (r_{ew}+h)C_\lambda C_\phi & C_\lambda S_\phi \\ [(1-e^2)r_{ew}+h]C_\lambda & 0 & S_\lambda \end{pmatrix} \begin{pmatrix} \varepsilon\lambda \\ \varepsilon\phi \\ \varepsilon h \end{pmatrix}. \quad \text{Eq. 12}$$

Note, the second-order error terms in Eq. 12, e.g., errors in the east-west radius of curvature, $r_{ew}$, and the direction cosines, are considered insignificant.

The Sensor Registration errors in Eq. 8 are defined as:

$$\varepsilon\ell_x = \ell_x - \hat{\ell}_x, \varepsilon\ell_y = \ell_y - \hat{\ell}_y, \varepsilon\ell_z = \ell_z - \hat{\ell}_z, \quad \text{Eq. 13}$$

$$\varepsilon\varphi_x = \varphi_x - \hat{\varphi}_x, \varepsilon\varphi_y = \varphi_y - \hat{\varphi}_y, \varepsilon\varphi_z = \varphi_z - \hat{\varphi}_z, \quad \text{Eq. 14}$$

$$\varepsilon\rho = \rho - \hat{\rho}, \varepsilon\theta_B = \theta_B - \hat{\theta}_B, \varepsilon\theta_E = \theta_E - \hat{\theta}_E. \quad \text{Eq. 15}$$

The expression for target error from Eq. 8 and Eq. 12 may be rewritten as:

$$\delta(\vec{r}_{tr})_e = A\begin{pmatrix} \varepsilon\lambda \\ \varepsilon\phi \\ \varepsilon h \end{pmatrix} + T_{le}^T B\begin{pmatrix} \varepsilon\theta_x \\ \varepsilon\theta_y \\ \varepsilon\theta_z \end{pmatrix} + \qquad \text{Eq. 16}$$

$$C\begin{pmatrix} \varepsilon\ell_{xb} \\ \varepsilon\ell_{yb} \\ \varepsilon\ell_{zb} \end{pmatrix} + CT_{b\tilde{s}}D\begin{pmatrix} \varepsilon\varphi_x \\ \varepsilon\varphi_y \\ \varepsilon\varphi_z \end{pmatrix} + CT_{bs}F\begin{pmatrix} \varepsilon\rho \\ \varepsilon\theta_B \\ \varepsilon\theta_E \end{pmatrix},$$

where 
$$A = \begin{pmatrix} -(r_{ew}+h)S_\lambda C_\phi & -(r_{ew}+h)C_\lambda S_\phi & C_\lambda C_\phi \\ -(r_{ew}+h)S_\lambda S_\phi & (r_{ew}+h)C_\lambda C_\phi & C_\lambda S_\phi \\ [(1-e^2)r_{ew}+h]C_\lambda & 0 & S_\lambda \end{pmatrix}, \qquad \text{Eq. 17}$$

$$B = \begin{pmatrix} 0 & \Delta r_{trzp} & -\Delta r_{tryp} \\ -\Delta r_{trzp} & 0 & \Delta r_{trxp} \\ \Delta r_{tryp} & -\Delta r_{trxp} & 0 \end{pmatrix}, \qquad \text{Eq. 18}$$

$$C = T_{le}^T T_{lp} T_{bp}^T, \qquad \text{Eq. 19}$$

$$D = \begin{pmatrix} 0 & \Delta r_{trzs} & -\Delta r_{trys} \\ -\Delta r_{trzs} & 0 & \Delta r_{trxs} \\ \Delta r_{trys} & -\Delta r_{trxs} & 0 \end{pmatrix}, \text{ and} \qquad \text{Eq. 20}$$

$$F = \begin{pmatrix} C_{\theta_B}C_{\theta_E} & -\rho S_{\theta_B}C_{\theta_B} & -\rho C_{\theta_B}S_{\theta_E} \\ S_{\theta_B}C_{\theta_E} & \rho C_{\theta_B}C_{\theta_E} & -\rho S_{\theta_B}S_{\theta_E} \\ S_{\theta_E} & 0 & \rho C_{\theta_E} \end{pmatrix}. \qquad \text{Eq. 21}$$

In general, the INS platform misalignment angles $\theta_x$ and $\theta_y$ in Eq. 16 are small (typically, 0.01-0.1 milliradians), and may be ignored. However, for non-inertial navigation systems (e.g., Doppler), or low-grade INSs, this assumption may not be valid, and therefore require inclusion. The azimuth misalignment angle $\theta_z$ on the other hand can be significant, and typically should not be ignored. In general, the lever arm errors are considered insignificant. However, the residual sensor misalignment errors, $\varphi_x$, $\varphi_y$, and $\varphi_z$, in the transformation $T_{\tilde{s}s}$, are generally significant (Data Registration experimental data indicate several milliradians or larger) and should therefore be included. Using these assumptions the target registration error expressed in Eq. 16 may be reduced to the following expression:

$$\delta(\vec{r}_{tr})_e = \qquad \text{Eq. 22}$$

$$\begin{pmatrix} \delta x_{etr} \\ \delta y_{etr} \\ \delta z_{etr} \end{pmatrix}_e = A\begin{pmatrix} \varepsilon\lambda \\ \varepsilon\phi \\ \varepsilon h \end{pmatrix} + T_{le}^T b(\varepsilon\theta_z) + C\left\{ T_{b\tilde{s}}D\begin{pmatrix} \varepsilon\varphi_x \\ \varepsilon\varphi_y \\ \varepsilon\varphi_z \end{pmatrix} + T_{bs}F\begin{pmatrix} \varepsilon\rho \\ \varepsilon\theta_B \\ \varepsilon\theta_E \end{pmatrix} \right\},$$

where the vector b is given by:

$$b = \begin{pmatrix} -\Delta r_{tryp} \\ \Delta r_{trxp} \\ 0 \end{pmatrix}. \qquad \text{Eq. 23}$$

1.3 Target Registration Error Uncertainty. The target registration error covariance matrix is derived from Eq. 16, and may be used to determine the Track Quality ($T_Q$) metric of the track data. That is, track uncertainty is given by the expression:

$$\text{covariance}[\delta(\vec{r}_{tr})_e] = E\{\delta(\vec{r}_{tr})_e \delta(\vec{r}_{tr})_e^T\}, \qquad \text{Eq. 24}$$

where $E\{\cdot\}$ is the Expectation operator. Note: $T_Q$ is a Link 16 defined "Track Quality" with a range of 0-15, and is directly related to the trace of the target position error covariance in Eq. 24. Ignoring the lever arm errors, the expression for target error may be rewritten as:

$$\delta(\vec{r}_{tr})_e = A\begin{pmatrix} \varepsilon\lambda \\ \varepsilon\phi \\ \varepsilon h \end{pmatrix} + T_{le}^T B\begin{pmatrix} \varepsilon\theta_x \\ \varepsilon\theta_y \\ \varepsilon\theta_z \end{pmatrix} + CT_{b\tilde{s}}D\begin{pmatrix} \varepsilon\varphi_x \\ \varepsilon\varphi_y \\ \varepsilon\varphi_z \end{pmatrix} + CT_{bs}F\begin{pmatrix} \varepsilon\rho \\ \varepsilon\theta_B \\ \varepsilon\theta_E \end{pmatrix}. \qquad \text{Eq. 25}$$

Then the target error covariance may be written as:

$$E\{\delta(\vec{r}_{tr})_e \delta(\vec{r}_{tr})_e^T\} = AE\left\{\begin{pmatrix} \varepsilon\lambda \\ \varepsilon\phi \\ \varepsilon h \end{pmatrix}(\varepsilon\lambda \;\; \varepsilon\phi \;\; \varepsilon h)\right\}A^T + \qquad \text{Eq. 26}$$

$$T_{le}^T BE\left\{\begin{pmatrix} \varepsilon\theta_x \\ \varepsilon\theta_y \\ \varepsilon\theta_z \end{pmatrix}(\varepsilon\lambda \;\; \varepsilon\phi \;\; \varepsilon h)\right\}A^T +$$

$$CT_{b\tilde{s}}DE\left\{\begin{pmatrix} \varepsilon\varphi_x \\ \varepsilon\varphi_y \\ \varepsilon\varphi_z \end{pmatrix}(\varepsilon\lambda \;\; \varepsilon\phi \;\; \varepsilon h)\right\}A^T +$$

$$CT_{bs}FE\left\{\begin{pmatrix} \varepsilon\rho \\ \varepsilon\theta_B \\ \varepsilon\theta_E \end{pmatrix}(\varepsilon\lambda \;\; \varepsilon\phi \;\; \varepsilon h)\right\}A^T +$$

$$AE\left\{\begin{pmatrix} \varepsilon\lambda \\ \varepsilon\phi \\ \varepsilon h \end{pmatrix}(\varepsilon\theta_x \;\; \varepsilon\theta_y \;\; \varepsilon\theta_z)\right\}B^T T_{le} +$$

$$T_{le}^T BE\left\{\begin{pmatrix} \varepsilon\theta_x \\ \varepsilon\theta_y \\ \varepsilon\theta_z \end{pmatrix}(\varepsilon\theta_x \;\; \varepsilon\theta_y \;\; \varepsilon\theta_z)\right\}B^T T_{le} +$$

$$CT_{b\tilde{s}}DE\left\{\begin{pmatrix} \varepsilon\varphi_x \\ \varepsilon\varphi_y \\ \varepsilon\varphi_z \end{pmatrix}(\varepsilon\theta_x \;\; \varepsilon\theta_y \;\; \varepsilon\theta_z)\right\}B^T T_{le} +$$

$$CT_{bs}FE\left\{\begin{pmatrix} \varepsilon\rho \\ \varepsilon\theta_B \\ \varepsilon\theta_E \end{pmatrix}(\varepsilon\theta_x \;\; \varepsilon\theta_y \;\; \varepsilon\theta_z)\right\}B^T T_{le} +$$

$$AE\left\{\begin{pmatrix} \varepsilon\lambda \\ \varepsilon\phi \\ \varepsilon h \end{pmatrix}(\varepsilon\varphi_x \;\; \varepsilon\varphi_y \;\; \varepsilon\varphi_z)\right\}D^T T_{b\tilde{s}}^T C^T +$$

$$T_{le}^T BE\left\{\begin{pmatrix} \varepsilon\theta_x \\ \varepsilon\theta_y \\ \varepsilon\theta_z \end{pmatrix}(\varepsilon\varphi_x \;\; \varepsilon\varphi_y \;\; \varepsilon\varphi_z)\right\}D^T T_{b\tilde{s}}^T C^T +$$

$$CT_{b\tilde{s}}DE\left\{\begin{pmatrix} \varepsilon\varphi_x \\ \varepsilon\varphi_y \\ \varepsilon\varphi_z \end{pmatrix}(\varepsilon\varphi_x \;\; \varepsilon\varphi_y \;\; \varepsilon\varphi_z)\right\}D^T T_{b\tilde{s}}^T C^T +$$

$$CT_{bs}FE\left\{\begin{pmatrix} \varepsilon\rho \\ \varepsilon\theta_B \\ \varepsilon\theta_E \end{pmatrix}(\varepsilon\varphi_x \;\; \varepsilon\varphi_y \;\; \varepsilon\varphi_z)\right\}D^T T_{b\tilde{s}}^T C^T +$$

-continued $$AE\left\{\begin{pmatrix}\varepsilon\lambda\\\varepsilon\phi\\\varepsilon h\end{pmatrix}(\varepsilon\rho\ \ \varepsilon\theta_B\ \ \varepsilon\theta_E)\right\}F^T T_{bs}^T C^T +$$

$$T_{le}^T BE\left\{\begin{pmatrix}\varepsilon\theta_x\\\varepsilon\theta_y\\\varepsilon\theta_z\end{pmatrix}(\varepsilon\rho\ \ \varepsilon\theta_B\ \ \varepsilon\theta_E)\right\}F^T T_{bs}^T C^T +$$

$$CT_{b\tilde{s}}DE\left\{\begin{pmatrix}\varepsilon\varphi_x\\\varepsilon\varphi_y\\\varepsilon\varphi_z\end{pmatrix}(\varepsilon\rho\ \ \varepsilon\theta_B\ \ \varepsilon\theta_E)\right\}F^T T_{bs}^T C^T +$$

$$CT_{bs}FE\left\{\begin{pmatrix}\varepsilon\rho\\\varepsilon\theta_B\\\varepsilon\theta_E\end{pmatrix}(\varepsilon\rho\ \ \varepsilon\theta_B\ \ \varepsilon\theta_E)\right\}F^T T_{bs}^T C^T$$

Now, since the navigation registration errors and the sensor registration errors are physically independent processes, all expectation operations involving cross terms between navigation errors and sensor errors will be zero. Therefore, Eq. 26 reduces to:

$$E\left\{\delta(\vec{r}_{tr})_e \delta(\vec{r}_{tr})_e^T\right\} = AE\left\{\begin{pmatrix}\varepsilon\lambda\\\varepsilon\phi\\\varepsilon h\end{pmatrix}(\varepsilon\lambda\ \ \varepsilon\phi\ \ \varepsilon h)\right\}A^T +$$

$$T_{le}^T BE\left\{\begin{pmatrix}\varepsilon\theta_x\\\varepsilon\theta_y\\\varepsilon\theta_z\end{pmatrix}(\varepsilon\lambda\ \ \varepsilon\phi\ \ \varepsilon h)\right\}A^T +$$

$$AE\left\{\begin{pmatrix}\varepsilon\lambda\\\varepsilon\phi\\\varepsilon h\end{pmatrix}(\varepsilon\theta_x\ \ \varepsilon\theta_y\ \ \varepsilon\theta_z)\right\}B^T T_{le} +$$

$$T_{le}^T BE\left\{\begin{pmatrix}\varepsilon\theta_x\\\varepsilon\theta_y\\\varepsilon\theta_z\end{pmatrix}(\varepsilon\theta_x\ \ \varepsilon\theta_y\ \ \varepsilon\theta_z)\right\}B^T T_{le} +$$

$$CT_{b\tilde{s}}DE\left\{\begin{pmatrix}\varepsilon\varphi_x\\\varepsilon\varphi_y\\\varepsilon\varphi_z\end{pmatrix}(\varepsilon\varphi_x\ \ \varepsilon\varphi_y\ \ \varepsilon\varphi_z)\right\}D^T T_{b\tilde{s}}^T C^T +$$

$$CT_{bs}FE\left\{\begin{pmatrix}\varepsilon\rho\\\varepsilon\theta_B\\\varepsilon\theta_E\end{pmatrix}(\varepsilon\varphi_x\ \ \varepsilon\varphi_y\ \ \varepsilon\varphi_z)\right\}D^T T_{b\tilde{s}}^T C^T +$$

$$CT_{b\tilde{s}}DE\left\{\begin{pmatrix}\varepsilon\varphi_x\\\varepsilon\varphi_y\\\varepsilon\varphi_z\end{pmatrix}(\varepsilon\rho\ \ \varepsilon\theta_B\ \ \varepsilon\theta_E)\right\}F^T T_{bs}^T C^T +$$

$$CT_{bs}FE\left\{\begin{pmatrix}\varepsilon\rho\\\varepsilon\theta_B\\\varepsilon\theta_E\end{pmatrix}(\varepsilon\rho\ \ \varepsilon\theta_B\ \ \varepsilon\theta_E)\right\}F^T T_{bs}^T C^T$$

Eq. 27

The first two lines of Eq. 27 involve covariance information from the Navigation Registration Kalman Filter (NRKF) solution (i.e., representing errors from the hybrid navigation Kalman filter). The last two lines involve covariance information from the Sensor Registration Kalman Filter (SRKF) solution. The NRKF and SRKF covariance matrices account for a portion of the total target error covariance, i.e., the non-zero mean target error. In addition, a track manager tracking filter would use navigation and sensor registration "corrected" target report inputs to produce target tracks with overall target track error covariances. Also, time extrapolation of a target track will contribute error to the total target error covariance. Data registration errors deal with the biases in the estimates of target locations, which have a direct impact on other estimators such as tracking and correlation algorithms that depend on receiving unbiased inputs for proper operation.

2. SENSOR REGISTRATION IMPLEMENTATION. Sensor Registration is the process of estimating the sensor measurement and misalignment bias errors in: Eq. 4 for a target position (repeated below), to achieve an accurate unbiased or "zero-mean" representation of the target in the WGS-84 (e-frame).

$$(\vec{r}_{tr})_e = (\vec{r})_e + T_{le}^T T_{lp} T_{bp}^T\{(\vec{l})_b + T_{b\tilde{s}} T_{\tilde{s}s}(\Delta\vec{r}_{tr})_s\}$$ Eq. 28

Providing unbiased target report measurements to the Tracking Filter (or any estimation process) is a necessary condition for proper estimation of Track position and kinematics in the IUs Track Management functions. The IU's local relationship to WGS-84 coordinates is established through the IU's navigation systems, typically including the Inertial Navigation System (INS), the Global Positioning System (GPS), and the Link 16 terminal navigation. Typically, each IU will have multiple sensor apertures with unique lever arms and orientations relative to the INS (many IUs have dual INSs), and each of these sensor apertures requires its own Sensor Registration process to ensure that its data has "zero-mean" errors with respect to the WGS-84 reference frame.

The IU must perform the Sensor Registration process for each sensor aperture using its navigation solution and any available WGS-84 SRO positions (e.g., PPLIs, IFF Mode 5) that are accurate and can be unambiguously associated with the sensor reports for these SROs. This navigation derived information may be transformed into measurements for the SRKF. The equation for the SRKF measurement, expressed in the misaligned sensor frame (š-frame), may be written by rearranging Eq. 28 as:

$$T_{\tilde{s}s}(\Delta\vec{r}_{tr})_s = T_{bs}^T\{T_{bp}T_{lp}^T T_{le}[(\vec{r}_{tr})_e - (\vec{r})_e] - (\vec{l})_b\}.$$ Eq. 29

The SRKF estimates the errors in the terms, $T_{\tilde{s}s}$ and $(\Delta\vec{r}_{tr})_s$, from Eq. 29. That is, the sensor bias errors in the measurement ($\rho$, $\theta_B$, $\theta_E$), and the sensor bias errors in the alignment with respect to the vehicle body ($\varphi_x$, $\varphi_y$, $\varphi_z$). The SRKF utilizes an error model for each of these states, and a measurement equation to observe these errors. The Sensor Registration Kalman Filter (SRKF) is an optimal, minimum variance, estimator designed to converge to the sensor registration bias errors in relation to the WGS-84 earth reference frame as the number of SRO measurements increases within the sensor aperture's Field of View (FOV). Note that all navigation, SRO, and sensor information in the SRKF measurement process is assumed to be consistent with respect to a common time reference. Table 2.1 provides a detailed summary of the equations for an Extended Kalman filter which may be used to implement the SRKF process. The Extended Kalman filter is included here as a general form of the optimal minimum variance estimator. However, it is important to recognize that the Extended Kalman filter actually reduces to the classical Linear Kalman filter when the system model and measurement model are linear functions of the state vector. Assuming Gaussian random processes for the noise terms, then the Kalman filter is also the optimal minimum mean square error estimator in addition to the optimal minimum variance estimator.

TABLE 2.1

Summary of Continuous-Discrete Extended Kalman Filter

| | |
|---|---|
| SYSTEM MODEL | $\dot{\vec{x}}(t) = \vec{f}(\vec{x}(t), t) + \vec{w}(t); \vec{w}(t) \sim N(\vec{0}, Q(t))$ |
| MEASUREMENT MODEL | $\vec{z}_k = \vec{h}_k(\vec{x}(t_k)) + \vec{v}_k; k = 1, 2, \ldots; \vec{v}_k \sim N(\vec{0}, R_k)$ |
| Initial Conditions | $\vec{x}(0) \sim N(\vec{x}_0, P_0)$ |
| Other Assumptions | $E\{\vec{w}(t)\vec{v}_k^T\} = 0$ for all k and all t |
| State Estimate Propagation | $\dot{\hat{\vec{x}}}(t) = \vec{f}(\hat{\vec{x}}(t), t)$ or $\hat{\vec{x}}_k^- = \Phi_{k-1} \hat{\vec{x}}_{k-1}^+$ |
| Error Covariance Propagation | $\dot{P}(t) = F(\hat{\vec{x}}(t), t)P(t) + P(t)F^T(\hat{\vec{x}}(t), t) + Q(t)$, or $P_k^- = \Phi_{k-1} P_{k-1}^+ \Phi_{k-1}^T + Q_{k-1}; Q_{k-1} \to Q(t)(t_k - t_{k-1})$ |
| State Estimate Update | $\hat{\vec{x}}_k^+ = \hat{\vec{x}}_k^- + K_k[\vec{z}_k - \vec{h}_k(\hat{\vec{x}}_k^-)]$ |
| Error Covariance Update | $P_k^+ = [I - K_k H_k(\hat{\vec{x}}_k^-)]P_k^-[I - K_k H_k(\hat{\vec{x}}_k^-)]^T + K_k R_k K_k^T$ |
| Kalman Gain Matrix | $K_k = P_k^- H_k^T(\hat{\vec{x}}_k^-)[H_k(\hat{\vec{x}}_k^-)P_k^- H_k^T(\hat{\vec{x}}_k^-) + R_k]^{-1}$ |
| Definitions | $F(\hat{\vec{x}}(t), t) = \dfrac{\partial \vec{f}(\vec{x}(t), t)}{\partial \vec{x}(t)}\bigg|_{\vec{x}(t) = \hat{\vec{x}}(t)}; \Phi_{k-1} \to I + F(\hat{\vec{x}}(t_{k-1}), t_{k-1})\Delta T, \Delta T = t_k - t_{k-1}$ |
| | $H_k(\hat{\vec{x}}_k^-) = \dfrac{\partial \vec{h}_k(\vec{x}(t_k))}{\partial \vec{x}(t_k)}\bigg|_{\vec{x}(t_k) = \hat{\vec{x}}_k^-}$ |

The notation in Table 2.1 using a superscript (−) indicates a priori estimates and covariance, $\hat{\vec{x}}_k^-$ and $P_k^-$, respectively. Similarly a superscript (+) indicates a posteriori estimates and covariance, $\hat{\vec{x}}_k^+$ and $P_k^+$, respectively. The modeling and initial conditions for the SRKF are described in section 2.1. Section 2.2 presents the derivation of the SRKF measurement matrix, $H_k$, representing the measurement process from Eq. 29. This matrix is important because it describes the mapping of the sensor registration error states into the sensor measurement space of range, bearing, and elevation. All potential measurement update sources for the SRKF will require preprocessing to time align the SRO target position measurements (e.g., PPLI, GPS) with the corresponding sensor aperture measurements. In addition, the target geometry and SRO uncertainties must be considered prior to use in the SRKF. This preprocessing and screening of potential SRKF measurements is described in section 2.3. Section 2.4 describes the SRKF state and covariance Kalman filter Measurement Update process, and section 2.5 describes the SRKF state and covariance Kalman filter Time Propagation process of the estimator. Finally, section 2.6 defines the Sensor Registration correction process for all sensor measured target reports using the state and covariance output from the SRKF process. These corrections are to be applied to sensor target reports prior to distribution to a Tracking filter or other Track Management processes.

2.1 SRKF Modeling and Initialization. This section provides a general SRKF system error state model, and the initial error state vector, error covariance, and process noise spectral density matrix, corresponding to the Kalman filter description in Table 2.1. This model has been used with experimental data with excellent results. However, for specific sensor applications it may be necessary to specify unique modeling details for the SRKF.

2.1.1 SRKF Modeling. It should be noted that the minimum design requires the use of "bias" errors for the sensor error model states of the SRKF. If analysis of specific sensor data shows that the bias modeling assumption results in residual filter errors that significantly deviate from a "white noise" characteristic, then additional modeling parameters or states may be required for that specific sensor model, e.g., scale factor errors, Markoff processes. It is a straight forward extension of the expression for the target error in Eq. 16 to include additional states in the state vector model for the SRKF. Experimental results indicate that the sensor measurements may have dependencies that can be characterized using proportional scale factor terms. These scale factor terms may be included in the sensor measurement model as:

$$\rho_s = \rho(1 + sf_R), \quad \text{Eq. 30}$$

$$\theta_{B_s} = \theta_B(1 + sf_B), \quad \text{Eq. 31}$$

$$\theta_{E_s} = \theta_E(1 + sf_E), \quad \text{Eq. 32}$$

where $sf_R$, $sf_B$, and $sf_E$, are the range, bearing, and elevation scale factors, respectively. The sensor bearing measurement scale factor model in Eq. 31 may be used in applications involving a single face of a phased array sensor in which the Field of View (FOV) is limited, e.g., ±50 degrees. However, this model will result in a discontinuous estimate for a rotating sensor that has a full 0-360 degree FOV. This discontinuity occurs at the boundary transition from 359.99 degrees back to 0 degrees. If the sensor registration bearing error is expected to be continuous across the entire FOV of the sensor aperture, then another approach to modeling the bearing-dependent bearing scale factor error may be used. The model employs a Fourier series representation of the bearing scale factor error and is given by:

$$\theta_{B_s} = \theta_B + \sum_{i=1}^{n} sf_{Bx_i} \cdot \cos(i\theta_B) + sf_{By_i} \cdot \sin(i\theta_B), \quad \text{Eq. 33}$$

where the $sf_{Bxi}$ and $sf_{Byi}$ terms represent the scale factor constants to be estimated. The value of "n" should be selected based on experience with the specific sensor and the observability of the estimator. Small values of n (1 or 2) should be sufficient in most cases. In this example, n=1, which results in the following bearing-dependent bearing scale factor model:

$$\theta_{B_s} = \theta_B + sf_{Bx} \cdot \cos(\theta_B) + sf_{By} \cdot \sin(\theta_B). \quad \text{Eq. 34}$$

This model produces results equivalent to Eq. 31 in the case of a single face of a phased array sensor while also accommodating the rotating sensor. Therefore, the Fourier representation may be used as a generic bearing dependent bearing scale factor model for the SRKF. Analysis also indicates that the sensor bearing measurement error, $\varepsilon\theta_B$, and the sensor azimuth misalignment, $\varepsilon\varphi_z$, in Eq. 8 are not separable in the estimation process. Including both errors as states in the SRKF will result in corresponding state estimates that are linearly dependent with values based on the initial covariance and process noise for each state. Therefore, only one of these error states need be included in the SRKF state vector. Some sensors are capable of providing measurements of range-rate, $\dot{\rho}$. This measurement may be expressed as:

$$\dot{\rho}_s = \dot{\rho} + \rho_R, \quad \text{Eq. 35}$$

where a range-rate offset denoted, $\rho_R$, has been included for representation in the SRKF state vector. The previous development of the error equations associated with Data Registration did not consider Time Registration error. In the event that a sensor has time-tags for its measurement reports that are not accurately synchronized to UTC (USNO), the SRKF state vector may be augmented to include a time bias error, denoted $\varepsilon t$. Therefore, the SRKF 11-element state vector, derived from Eq. 16 and ignoring lever arm errors, may be written as, $\varepsilon\vec{x} = (\varepsilon\rho \; \varepsilon sf_R \; \varepsilon\rho_R \; \varepsilon sf_{Bx} \; \varepsilon sf_{By} \; \varepsilon\theta_E \; \varepsilon sf_E \; \varepsilon\varphi_x \; \varepsilon\varphi_y \; \varepsilon\varphi_z \; \varepsilon t)^T$. The behavior of the scale factor error states are also modeled as biases. Hence, the system function, $\vec{f}(\varepsilon\hat{\vec{x}}(t),t)$ reduces to the linear system matrix, $F(\varepsilon\hat{\vec{x}}(t),t)=F$, given by $$F = 0 = \begin{pmatrix} 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \end{pmatrix}. \quad \text{Eq. 36}$$

It should be noted, however, that if any of the SRKF error states are modeled as time varying errors, then the system matrix will contain non-zero elements. The State Transition Matrix, $\Phi(t_k, t_{k-1})$, corresponding to the linear system matrix F=0, is given by:

$$\Phi = I = \begin{pmatrix} 1 & 0 & 0 & 0 & 0 & 0 & 0 & 0 & 0 & 0 & 0 \\ 0 & 1 & 0 & 0 & 0 & 0 & 0 & 0 & 0 & 0 & 0 \\ 0 & 0 & 1 & 0 & 0 & 0 & 0 & 0 & 0 & 0 & 0 \\ 0 & 0 & 0 & 1 & 0 & 0 & 0 & 0 & 0 & 0 & 0 \\ 0 & 0 & 0 & 0 & 1 & 0 & 0 & 0 & 0 & 0 & 0 \\ 0 & 0 & 0 & 0 & 0 & 1 & 0 & 0 & 0 & 0 & 0 \\ 0 & 0 & 0 & 0 & 0 & 0 & 1 & 0 & 0 & 0 & 0 \\ 0 & 0 & 0 & 0 & 0 & 0 & 0 & 1 & 0 & 0 & 0 \\ 0 & 0 & 0 & 0 & 0 & 0 & 0 & 0 & 1 & 0 & 0 \\ 0 & 0 & 0 & 0 & 0 & 0 & 0 & 0 & 0 & 1 & 0 \\ 0 & 0 & 0 & 0 & 0 & 0 & 0 & 0 & 0 & 0 & 1 \end{pmatrix}. \quad \text{Eq. 37}$$

2.1.2 SRKF Initialization. The initial state estimate for the SRKF may be set to a non-zero vector based upon last known estimates, $\varepsilon\hat{\vec{x}}$, and corresponding full covariance matrix, P, that may have been saved from prior SRKF estimation or from an external input provided by the host system. However, the default approach is to initialize the state estimate to zero, i.e., $$\varepsilon\hat{\vec{x}}(0) = \begin{pmatrix} \varepsilon\rho(0) \\ \varepsilon sf_R(0) \\ \varepsilon\rho_R(0) \\ \varepsilon sf_{Bx}(0) \\ \varepsilon sf_{By}(0) \\ \varepsilon\theta_E(0) \\ \varepsilon sf_E(0) \\ \varepsilon\varphi_x(0) \\ \varepsilon\varphi_y(0) \\ \varepsilon\varphi_z(0) \\ \varepsilon t(0) \end{pmatrix} = \begin{pmatrix} 0 \\ 0 \\ 0 \\ 0 \\ 0 \\ 0 \\ 0 \\ 0 \\ 0 \\ 0 \\ 0 \end{pmatrix}. \quad \text{Eq. 38}$$

The corresponding initial covariance matrix, P(0), will be a diagonal matrix (unless using a previously saved covariance, P) with diagonal elements representing the initial variances for each element of the initial state vector in Eq. 38. These default initial variances (as distinct from a previously saved covariance, P) should be selected conservatively to ensure that they in fact bound the potential error in the initial state estimate in Eq. 38 for the specific sensor type. These default initial variances will also serve as upper bounds for rejecting spurious measurements as defined in section 2.3.6.

$$P(0) = \begin{pmatrix} \sigma^2_{\varepsilon\rho} & 0 & 0 & 0 & 0 & 0 & 0 & 0 & 0 & 0 & 0 \\ 0 & \sigma^2_{\varepsilon sf_R} & 0 & 0 & 0 & 0 & 0 & 0 & 0 & 0 & 0 \\ 0 & 0 & \sigma^2_{\varepsilon\rho_R} & 0 & 0 & 0 & 0 & 0 & 0 & 0 & 0 \\ 0 & 0 & 0 & \sigma^2_{\varepsilon sf_{Bx}} & 0 & 0 & 0 & 0 & 0 & 0 & 0 \\ 0 & 0 & 0 & 0 & \sigma^2_{\varepsilon sf_{By}} & 0 & 0 & 0 & 0 & 0 & 0 \\ 0 & 0 & 0 & 0 & 0 & \sigma^2_{\varepsilon\theta_E} & 0 & 0 & 0 & 0 & 0 \\ 0 & 0 & 0 & 0 & 0 & 0 & \sigma^2_{\varepsilon sf_E} & 0 & 0 & 0 & 0 \\ 0 & 0 & 0 & 0 & 0 & 0 & 0 & \sigma^2_{\varepsilon\varphi_x} & 0 & 0 & 0 \\ 0 & 0 & 0 & 0 & 0 & 0 & 0 & 0 & \sigma^2_{\varepsilon\varphi_y} & 0 & 0 \\ 0 & 0 & 0 & 0 & 0 & 0 & 0 & 0 & 0 & \sigma^2_{\varepsilon\varphi_z} & 0 \\ 0 & 0 & 0 & 0 & 0 & 0 & 0 & 0 & 0 & 0 & \sigma^2_{\varepsilon t} \end{pmatrix} \quad \text{Eq. 39}$$

The process noise spectral density matrix, Q(t), is intended to account for unmodeled errors in the SRKF state model, which is defined by the system function, $\vec{f}(\varepsilon\hat{\vec{x}}(t),t)$, or in this case, the linear system matrix, $F(\varepsilon\hat{\vec{x}}(t),t)=F$. It is important that Q(t) be non-zero, to ensure that the SRKF is both a controllable and stable Kalman filter which depends upon a symmetric positive-definite Q(t). In general the terms in this matrix depend on the specific sensor. Note that a large value for an element in Q implies a larger uncertainty or variability in the modeling of the corresponding state element. Specific values for the elements of Q(t) should be selected using experimental results and data for each specific sensor type and installation.

$$Q(t) = \begin{pmatrix} q_{\varepsilon\rho} & 0 & 0 & 0 & 0 & 0 & 0 & 0 & 0 & 0 & 0 \\ 0 & q_{\varepsilon sf_R} & 0 & 0 & 0 & 0 & 0 & 0 & 0 & 0 & 0 \\ 0 & 0 & q_{\varepsilon\rho_R} & 0 & 0 & 0 & 0 & 0 & 0 & 0 & 0 \\ 0 & 0 & 0 & q_{\varepsilon sf_{Bx}} & 0 & 0 & 0 & 0 & 0 & 0 & 0 \\ 0 & 0 & 0 & 0 & q_{\varepsilon sf_{By}} & 0 & 0 & 0 & 0 & 0 & 0 \\ 0 & 0 & 0 & 0 & 0 & q_{\varepsilon\theta_E} & 0 & 0 & 0 & 0 & 0 \\ 0 & 0 & 0 & 0 & 0 & 0 & q_{\varepsilon sf_E} & 0 & 0 & 0 & 0 \\ 0 & 0 & 0 & 0 & 0 & 0 & 0 & q_{\varepsilon\varphi_x} & 0 & 0 & 0 \\ 0 & 0 & 0 & 0 & 0 & 0 & 0 & 0 & q_{\varepsilon\varphi_y} & 0 & 0 \\ 0 & 0 & 0 & 0 & 0 & 0 & 0 & 0 & 0 & q_{\varepsilon\varphi_z} & 0 \\ 0 & 0 & 0 & 0 & 0 & 0 & 0 & 0 & 0 & 0 & q_{\varepsilon t} \end{pmatrix} \quad \text{Eq. 40}$$

2.2 SRKF Measurement Process. The SRKF measurement process is based on Eq. 29, which may be expressed in rectangular (x, y, z) coordinates, or in spherical ($\rho$, $\theta_B$, $\theta_E$) coordinates. Data Registration experiments have shown that spherical coordinates are preferable since these are the coordinates of the actual sensor measurements, and the SRKF exhibits better observability performance in spherical coordinates. The Kalman filter measurement equation is based on the model (see Table 2.1):

$$\vec{z} = \vec{h}(\vec{x}), \quad \text{Eq. 41}$$

where in this case, $$\vec{z} = \begin{pmatrix} x \\ y \\ z \end{pmatrix}_{\bar{s}} = T_{b\bar{s}}^T \{T_{bp} T_{lp}^T T_{le}[(\vec{r}_{tr})_e - (\vec{r})_e] - (\vec{l})_b\}, \text{ and} \quad \text{Eq. 42}$$

$$\vec{h}(\vec{x}) = \begin{pmatrix} x_s \\ y_s \\ z_s \end{pmatrix}_{\bar{s}} = T_{\bar{s}s}(\Delta\vec{r}_{tr})_s. \quad \text{Eq. 43}$$

The predicted measurement, i.e., sensor measurement, is given by:

$$\vec{h}(\vec{x}) = \begin{pmatrix} x_s \\ y_s \\ z_s \end{pmatrix}_{\bar{s}} = \begin{pmatrix} 1 & -\varphi_z & \varphi_y \\ \varphi_z & 1 & -\varphi_x \\ -\varphi_y & \varphi_x & 1 \end{pmatrix} \begin{pmatrix} \rho C_{\theta_B} C_{\theta_E} \\ \rho S_{\theta_B} C_{\theta_E} \\ \rho S_{\theta_E} \end{pmatrix}_s. \quad \text{Eq. 44}$$

The corresponding Kalman filter input measurement error equation is given by:

$$\delta\vec{z} = \vec{z} - \hat{\vec{h}}(\hat{\vec{x}}) = H\varepsilon\vec{x}, \quad \text{Eq. 45}$$

where:

$$H = \left. \frac{\partial \vec{h}(\vec{x})}{\partial \vec{x}^T} \right|_{\vec{x}=\hat{\vec{x}} \text{ or } \varepsilon\hat{\vec{x}}=\vec{x}-\hat{\vec{x}}}. \quad \text{Eq. 46}$$

Note that $\delta\vec{z}$ is the measurement, and the corresponding measurement innovation is $\vec{v} = \delta\vec{z} - H\varepsilon\vec{x}$. The measurement vector $\vec{z}$ in Eq. 41 may be expressed in spherical coordinates in the ($\bar{s}$-frame) as:

$$\vec{z} = \begin{pmatrix} \rho \\ \theta_B \\ \theta_E \end{pmatrix}_{\bar{s}},$$

Eq. 47
where the relationship to rectangular coordinates is given by:

$$\rho = \sqrt{x^2 + y^2 + z^2},\qquad\text{Eq. 48}$$

$$\theta_B = \tan^{-1}\left(\frac{y}{x}\right),\text{ and}\qquad\text{Eq. 49}$$

$$\theta_E = \tan^{-1}\left(\frac{z}{\sqrt{x^2+y^2}}\right).\qquad\text{Eq. 50}$$

The sensor measurement of the target in the (š-frame) may be directly available from the sensor in spherical coordinates as $(\rho_s, \theta_{B_s}, \theta_{E_s})^T$, or may be determined from the rectangular representation using:

$$\rho_s = \sqrt{x_s^2 + y_s^2 + z_s^2},\qquad\text{Eq. 51}$$

$$\theta_{B_s} = \tan^{-1}\left(\frac{y_s}{x_s}\right),\text{ and}\qquad\text{Eq. 52}$$

$$\theta_{E_s} = \tan^{-1}\left(\frac{z_s}{\sqrt{x_s^2+y_s^2}}\right).\qquad\text{Eq. 53}$$

Then the Kalman filter error measurement, $\delta\vec{z}$, is simply the difference of the vectors, $$\delta\vec{z} = \begin{pmatrix}\delta\rho \\ \delta\theta_B \\ \delta\theta_E\end{pmatrix}_{\tilde{s}} = \begin{pmatrix}\rho \\ \theta_B \\ \theta_E\end{pmatrix}_{\tilde{s}} - \begin{pmatrix}\rho_s \\ \theta_{B_s} \\ \theta_{E_s}\end{pmatrix}_{\tilde{s}}.\qquad\text{Eq. 54}$$

From Eq. 43, $$\vec{h}(\vec{x}) = T_{\tilde{s}s}(\Delta\vec{r}_{tr})_s,\qquad\text{Eq. 55}$$

Where:

$$(\Delta\vec{r}_{tr})_s = \begin{pmatrix}x_s \\ y_s \\ z_s\end{pmatrix}_s.\qquad\text{Eq. 56}$$

Relating the small angle rotations ($\varphi_x$, $\varphi_y$, $\varphi_z$) in the transformation $T_{\tilde{s}s}$ to corresponding variations in rectangular coordinates Eq. 55 becomes:

$$\vec{h}(\vec{x}) = \begin{pmatrix}x_s \\ y_s \\ z_s\end{pmatrix}_{\tilde{s}} = \begin{pmatrix}x_s \\ y_s \\ z_s\end{pmatrix}_s + \begin{pmatrix}\Delta x_s \\ \Delta y_s \\ \Delta z_s\end{pmatrix},\qquad\text{Eq. 57}$$

where:

$$\Delta x_s = -\varphi_z y_s + \varphi_y z_s,\qquad\text{Eq. 58}$$

$$\Delta y_s = \varphi_z x_s - \varphi_x z_s,\text{ and}\qquad\text{Eq. 59}$$

$$\Delta z_s = \varphi_x y_s - \varphi_y x_s.\qquad\text{Eq. 60}$$

Then, spherical-rectangular relationships may be used to write the differential relationships for Eq. 58-Eq. 60. The differential in range, denoted $d\rho$, may be expressed in terms of differentials in x, y, and z as:

$$d\rho = \frac{1}{\rho}[x\,dx + y\,dy + z\,dz].\qquad\text{Eq. 61}$$

Making the following substitutions, $$dx = \Delta x_s = -\varphi_z y_s + \varphi_y z_s,\qquad\text{Eq. 62}$$

$$dy = \Delta y_s = \varphi_z x_s - \varphi_x z_s,\qquad\text{Eq. 63}$$

$$dz = \Delta z_s = \varphi_x y_s - \varphi_y x_s,\qquad\text{Eq. 64}$$

Then Eq. 61 may be rewritten as:

$$d\rho = \frac{1}{\rho_s}[(y_s z_s - y_s z_s)\varphi_x + (x_s z_s - x_s z_s)\varphi_y + (x_s y_s - x_s y_s)\varphi_z] = 0.\qquad\text{Eq. 65}$$

The differential in bearing, denoted $d\theta_B$, may be expressed in terms of differentials in x, y, and z as:

$$d\theta_B = \frac{1}{r_s^2}[-x_s z_s \varphi_x - y_s z_s \varphi_y + (x_s^2 + y_s^2)\varphi_z]$$
$$= -C_{\theta_B}\tan\theta_E \varphi_x - S_{\theta_B}\tan\theta_E \varphi_y + \varphi_z,\qquad\text{Eq. 66}$$

where:

$$r_s = \sqrt{x_s^2 + y_s^2}.\qquad\text{Eq. 67}$$

The differential in elevation, denoted $d\theta_E$, may be expressed in terms of differentials in x, y, and z as:

$$d\theta_E = \frac{1}{r_s \rho_s^2}[y_s \rho_s^2 \varphi_x - x_s + \rho_s^2 \varphi_y]$$
$$= S_{\theta_B}\varphi_x - C_{\theta_B}\varphi_y.\qquad\text{Eq. 68}$$

If a Time Registration time bias error is relevant for the sensor measurements, then the differential relationship between the measurement vector, $\delta\vec{z}$, and the time bias error, $\varepsilon t$, must be established. The derivative of range with respect to time is given by:

$$\dot{\rho} = \frac{d\rho}{dt}\text{ or }d\rho = \dot{\rho}\,dt.\qquad\text{Eq. 69}$$

Similarly the derivative of bearing with respect to time is given by:

$$\dot{\theta}_B = \frac{d\theta_B}{dt}\text{ or }d\theta_B = \dot{\theta}_B\,dt,\qquad\text{Eq. 70}$$

and the derivative of elevation with respect to time is given by:

$$\dot{\theta}_E = \frac{d\theta_E}{dt}\text{ or }d\theta_E = \dot{\theta}_E\,dt.\qquad\text{Eq. 71}$$

If a sensor provides a measurement of range-rate, $\dot{\rho}_s$, then the Kalman filter measurement equation, Eq. 54, would be augmented as:

$$\delta \vec{z} = \begin{pmatrix} \delta\rho \\ \delta\theta_B \\ \delta\theta_E \\ \delta\rho_R \end{pmatrix}_{\bar{s}} = \begin{pmatrix} \rho \\ \theta_B \\ \theta_E \\ \dot{\rho} \end{pmatrix}_{\bar{s}} - \begin{pmatrix} \rho_s \\ \theta_{B_s} \\ \theta_{E_s} \\ \dot{\rho}_s \end{pmatrix}_{\bar{s}}. \qquad \text{Eq. 72}$$

Now, considering the system state vector to be, $(\vec{x}) = (\rho \; sf_R \; \dot{\rho} \; sf_{Bx}, \; sf_{By}, \; \theta_E \; sf_E \; \varphi_x \; \varphi_y \; \varphi_z \; t)^T$, the SRKF measurement equation is written in terms of the error states as:

$$\delta \vec{z} = \begin{pmatrix} \delta\rho \\ \delta\theta_B \\ \delta\theta_E \\ \delta\rho_R \end{pmatrix}_{\bar{s}} = H\varepsilon\vec{x}, \text{ and } \vec{v} = \delta\vec{z} - H\varepsilon\vec{x} \qquad \text{Eq. 73}$$

where:

$$H = [H_1 \vdots H_2 \vdots H_3], \qquad \text{Eq. 74}$$

$$\varepsilon\vec{x} = (\varepsilon\rho\varepsilon sf_R \varepsilon\dot{\rho}_R \varepsilon sf_{Bx} \varepsilon sf_{By} \varepsilon\theta_E \varepsilon sf_E \varepsilon\varphi_x \varepsilon\varphi_y \varepsilon\varphi_z \varepsilon t)^T. \qquad \text{Eq. 75}$$

The sub-matrix $H_1$ is a 4×7 matrix derived from Eq. 30, Eq. 32, Eq. 34, and Eq. 35 using a first-order Taylor series expansion resulting in the following error equations, $$\varepsilon\rho_s = \varepsilon\rho + \rho \cdot \varepsilon sf_R, \qquad \text{Eq. 76}$$

$$\varepsilon\theta_{B_s} = \cos(\theta_B) \cdot \varepsilon sf_{Bx} + \sin(\theta_B) \cdot \varepsilon sf_{By}, \qquad \text{Eq. 77}$$

$$\varepsilon\theta_{E_s} = \varepsilon\theta_E + \theta_E \cdot \varepsilon sf_E, \text{ and} \qquad \text{Eq. 78}$$

$$\varepsilon\dot{\rho}_s = \varepsilon\dot{\rho}_R. \qquad \text{Eq. 79}$$

Note that the sensor measurement bearing error, $\varepsilon\theta_B$, may be combined with the sensor azimuth misalignment, $\varepsilon\varphi_z$ since they are not separable in the estimation process and will therefore be accounted for in $H_2$. Then, $H_1$ may be written as:

$$H_1 = \begin{pmatrix} 1 & \rho & 0 & 0 & 0 & 0 & 0 \\ 0 & 0 & 0 & C_{\theta_B} & S_{\theta_B} & 0 & 0 \\ 0 & 0 & 0 & 0 & 0 & 1 & \theta_E \\ 0 & 0 & 1 & 0 & 0 & 0 & 0 \end{pmatrix}. \qquad \text{Eq. 80}$$

The sub-matrix $H_2$ is a 4×3 matrix developed directly from Eq. 65-Eq. 68 as:

$$H_2 = \begin{pmatrix} 0 & 0 & 0 \\ -C_{\theta_B}T_{\theta_E} & -S_{\theta_B}T_{\theta_E} & 1 \\ S_{\theta_B} & -C_{\theta_B} & 0 \\ 0 & 0 & 0 \end{pmatrix}, \qquad \text{Eq. 81}$$

where $T_{\theta_E} = \tan(\theta_E)$. The sub-matrix $H_3$ is a 4×1 matrix corresponding to the time bias error, $\varepsilon t$, and is derived from Eq. 69-Eq. 71 as:

$$H_3 = \begin{pmatrix} \dot{\rho} \\ \dot{\theta}_B \\ \dot{\theta}_E \\ 0 \end{pmatrix}. \qquad \text{Eq. 82}$$

Finally the complete SRKF measurement matrix, H, for spherical coordinates is the 4×11 matrix $$H = \begin{pmatrix} 1 & \rho & 0 & 0 & 0 & 0 & 0 & 0 & 0 & 0 & \dot{\rho} \\ 0 & 0 & 0 & C_{\theta_B} & S_{\theta_B} & 0 & 0 & -C_{\theta_B}T_{\theta_E} & -S_{\theta_B}T_{\theta_E} & 1 & \dot{\theta}_B \\ 0 & 0 & 0 & 0 & 0 & 1 & \theta_E & S_{\theta_B} & -C_{\theta_B} & 0 & \dot{\theta}_E \\ 0 & 0 & 1 & 0 & 0 & 0 & 0 & 0 & 0 & 0 & 0 \end{pmatrix}. \qquad \text{Eq. 83}$$

The SRKF "H-matrix" defines the relationship between the error state vector and the sensor registration measurements. This mapping also relates the SRKF state estimates to sensor registration measurement corrections in range ($\delta\rho$), bearing ($\delta\theta_B$), elevation ($\delta\theta_E$), and range-rate ($\delta\rho_R$) which are dependent on the sensor measured target range ($\rho$), bearing ($\theta_B$), and elevation ($\theta_E$).

2.3 SRKF Measurement Preprocessing and Screening.

Measurement preprocessing refers to the extraction, testing, and selection of received SROs, local IU navigation, and local IU sensor measurements, as potential "Measurement Data Sets" for input to the SRKF according to each individual sensor aperture. An SRKF "Measurement Data Set" includes all of the information required to compute the SRKF error measurement components of Eq. 42 and Eq. 43. These input data are generally asynchronous and require time alignment prior to computing the SRKF measurement.

The SRKF will process all measurements within an "SRKF Cycle" and provide the updated estimates and covariance at the end of each cycle. Each SRKF measurement update will coincide with its sensor measurement time-tag, denoted $t_k$. Each sensor measurement has associated received SRO messages with time-tags, denoted $t_l$. Local navigation data is generally available at a high rate from the IU's local navigation system with time-tags, denoted $t_n$. The first step requires the SRO message data at times, $\{t_l\}$, to be time aligned with the sensor measurement times, $\{t_k\}$. This is accomplished using cubic spline interpolation polynomials for each position component in the SRO message. Next, the local navigation data at times, $\{t_n\}$, are extrapolated to the received and interpolated SRO data times, $\{t_l\}$ and $\{t_k\}$, respectively. This results in the geodetic measurement data at the union of times $\{t_l\}$ and $\{t_k\}$ over the SRKF Cycle. The third step is to determine range, bearing, and elevation between the local navigation data and the SRO source evaluating and Eq. 42 at times $\{t_l\}$ and $\{t_k\}$. The range, bearing, and elevation data is then transformed to the sensor aperture and interpolated using cubic spline polynomials over the SRKF Cycle to produce the range, bearing, elevation, and corresponding estimates of their respective rates, at the SRO times, $\{t_l\}$, and sensor measurement times, $\{t_k\}$. Finally in the fifth step, the resulting SRKF measurements, $\delta\vec{z}_k$, are computed according to Eq. 72 at the desired sensor measurement times, $\{t_k\}$.

The SRKF must accommodate the general case where multiple SRO sources may be associated with sensor measurements from a sensor aperture over an SRKF Cycle. In addition, multiple apertures may have SRO sources in common. Therefore, the input data must be sorted according to each sensor aperture, and its corresponding SROs and sensor measurements must be sorted according to each associated SRO source.

The following sections describe the specific preprocessing and screening required for input measurements to the SRKF. It is essential that all information in and Eq. 42 and Eq. 43 be aligned in time such that any time offsets between systems, (e.g., sensor time, navigation time, Link 16 time) be known with an accuracy of ±2 millisecond (msec) to ensure that the introduction of time errors associated with the dynamic data are minimal.

2.3.1 Sensor Measurement-to-SRO Track Association. The SRKF has been designed to align the local sensor aperture measurements with received SRO reports and local navigation data. SRO reports, e.g., Link 16 PPLIs, are received periodically and provide a geodetic reference for the alignment of the sensor aperture, and therefore, the associated local tracks. Implicit in the development of the SRKF estimates is the need to identify which sensor aperture measurements correspond to which received SRO reports to ensure unambiguous inputs for the SRKF. Normal correlation processes may be sufficient when the sensor alignment to the SROs has been achieved. However, prior to this alignment, e.g., after initialization, the correlation process must function in the presence of whatever biases exist in the sensor, local navigation, and SRO data. Therefore, this correlation process may be more robust than conventional algorithms which presume alignment has already been achieved. The goal of the correlation process is to provide as many valid correlated SRO/sensor report pairs as possible over a wide range of sensors and sensor accuracies.

In general, each sensor aperture has its own local track filter which associates its local aperture measurements with a local track to form a measurement-to-track association which is identified by a local track number called the "Local Track Number" (LTN). These local aperture measurements are passed to the Common (or Global) Track Management function of the IU where they will then be associated with a "Common Track Number" (CTN) for processing as an update in the IU's common track filter which integrates measurements from all of the local sensor apertures. In addition, each SRO will have an identifier indicating the source of the report which may be denoted by a Source Track Number (STN). The IU's Track Management function will establish the track-to-track correlations which relate the STN to an existing common track with its respective CTN.

The selection of SRKF measurement data is based on the correct (unambiguous) correlation of sensor measurement track LTNs and common track CTNs with any corresponding received SRO message STNs. The sensor aperture's measurement should be correctly associated with the received SRO STN to produce the correct [STN, LTN, CTN] association match. If this association is uncertain, then the information may not be acceptable for further processing, and is typically discarded. (NOTE: It is assumed that the Common Track Manager or Data Registration processes perform the association/correlation function for [STN, LTN, CTN].)

2.3.2 Sensor Measurement Preprocessing and Screening. The "uncorrected" sensor Associated Measurement Reports (AMRs), expressed in the s-frame, should be extracted if the report's Local Track Number (LTN) has been associated with a received SRO Source Track Number (STN) where they both can be associated with the same Common Track Number (CTN).

2.3.3 SRO Preprocessing and Screening. Each received SRO message that has been associated with local sensor AMRs should have its data extracted and processed to determine if its position accuracy is sufficient relative to the desired angular accuracy. If the SRO data is acceptable, then the SRO data with times, $\{t_j\}$, must be time aligned with the sensor AMR times, $\{t_k\}$, using cubic spline interpolation polynomials.

2.3.4 Navigation Preprocessing and Screening. The local IU hybrid navigation data at times, $\{t_n\}$, may be selected as close as possible to the received SRO times, $\{t_j\}$, and the sensor AMR times, $\{t_k\}$, and the data extracted and processed to align the local navigation data with the SRO data from the previous section 2.3.3.

2.3.5 SRKF Measurement Preprocessing and Screening. The processing in sections 2.3.3 and 2.3.4 has provided the SRO and local hybrid navigation data at the union of the SRO times, $\{t_j\}$, and the sensor AMR times, $\{t_k\}$. The processing included in this section develops the geodetic measurement vector, $\vec{z}_{k'}$, and its corresponding covariance, $R_{Z_{k'}}$, at times, $\{t_{k'}\}=\{t_j\}\cup\{t_k\}$. The measurement vector, $\vec{z}_{k'}$, is converted to range, bearing, and elevation with respect to the sensor aperture $\tilde{s}$-frame coordinates. Then cubic spline interpolation polynomials are used to determine the corresponding range-rate, bearing-rate, and elevation-rate required for time bias estimation and range-rate bias estimation.

2.3.6 SRKF Error Measurement Preprocessing and Screening. The geodetic measurement data that was saved and buffered in section 2.3.5, consisting of range, bearing, elevation, and range-rate data for the received SRO messages, shall be compared with the corresponding sensor AMR data that was buffered in section 2.3.2, to create the SRKF measurement vector, $\delta\vec{z}_{k'}$, at times, $\{t_k\}$, as defined in Eq. 72.

2.4 SRKF Measurement Update. The SRKF Measurement Update process is based on a recursive set of equations for both the error state vector and corresponding covariance matrix (see Table 2.1). The Kalman filter measurement update is designed to provide an unbiased, minimum variance, consistent estimate and error covariance using available measurements based on linear (or nonlinear) combinations of the error state vector. The SRKF state vector, $\varepsilon\hat{\vec{x}}$, is defined as an 11-element vector with an initial value given by Eq. 38. That is:

$$\varepsilon\hat{\vec{x}} = \begin{pmatrix} \varepsilon\hat{x}_1 \\ \varepsilon\hat{x}_2 \\ \varepsilon\hat{x}_3 \\ \varepsilon\hat{x}_4 \\ \varepsilon\hat{x}_5 \\ \varepsilon\hat{x}_6 \\ \varepsilon\hat{x}_7 \\ \varepsilon\hat{x}_8 \\ \varepsilon\hat{x}_9 \\ \varepsilon\hat{x}_{10} \\ \varepsilon\hat{x}_{11} \end{pmatrix} = \begin{pmatrix} \varepsilon\hat{\rho} \\ \varepsilon\hat{s}f_R \\ \varepsilon\hat{\rho}_R \\ \varepsilon\hat{s}f_{Bx} \\ \varepsilon\hat{s}f_{By} \\ \varepsilon\hat{\theta}_E \\ \varepsilon\hat{s}f_E \\ \varepsilon\hat{\varphi}_x \\ \varepsilon\hat{\varphi}_y \\ \varepsilon\hat{\varphi}_z \\ \varepsilon\hat{t} \end{pmatrix}. \qquad \text{Eq. 84}$$

The SRKF error covariance matrix, P, is defined as an 11×11 positive definite symmetric matrix with an initial value given by Eq. 39, and representing the uncertainty in the state estimate in Eq. 84.

2.4.1 SRKF Measurement Innovation

The Kalman filter measurement innovation, at time=$t_k$, is given by the linear Eq. 73 as:

$$\vec{v}_k = \begin{pmatrix} v_1 \\ v_2 \\ v_3 \\ v_4 \end{pmatrix}_k = \delta \vec{z}_k - H_k \varepsilon \hat{\vec{x}}_k^-. \qquad \text{Eq. 85}$$

The SRKF error measurement was determined in section 2.3.6, as:

$$\delta \vec{z}_k = \begin{pmatrix} \delta \rho \\ \delta \theta_B \\ \delta \theta_E \\ \delta \rho_R \end{pmatrix}_k = \begin{pmatrix} \rho \\ \theta_B \\ \theta_E \\ \dot{\rho} \end{pmatrix}_k - \begin{pmatrix} \rho_s \\ \theta_{B_s} \\ \theta_{E_s} \\ \dot{\rho}_s \end{pmatrix}_k, \qquad \text{Eq. 86}$$

where all data is coordinated in the $\bar{s}$-frame, and $k$ denotes the sensor measurement time, $t_k$.

The SRKF predicted (a priori) error measurement is based on the H-matrix from Eq. 83 and the current error state estimate, at time=$t_k$, given by:

$$H_k \varepsilon \hat{\vec{x}}_k^- = \qquad \text{Eq. 87}$$

$$\begin{pmatrix} 1 & \rho & 0 & 0 & 0 & 0 & 0 & 0 & 0 & 0 & \dot{\rho} \\ 0 & 0 & 0 & C_{\theta_B} & S_{\theta_B} & 0 & 0 & -C_{\theta_B}T_{\theta_E} & -S_{\theta_B}T_{\theta_E} & 1 & \dot{\theta}_B \\ 0 & 0 & 0 & 0 & 0 & 1 & \theta_E & S_{\theta_B} & -C_{\theta_B} & 0 & \dot{\theta}_E \\ 0 & 0 & 1 & 0 & 0 & 0 & 0 & 0 & 0 & 0 & 0 \end{pmatrix}_k$$

$$\begin{pmatrix} \varepsilon \hat{x}_1^- \\ \varepsilon \hat{x}_2^- \\ \varepsilon \hat{x}_3^- \\ \varepsilon \hat{x}_4^- \\ \varepsilon \hat{x}_5^- \\ \varepsilon \hat{x}_6^- \\ \varepsilon \hat{x}_7^- \\ \varepsilon \hat{x}_8^- \\ \varepsilon \hat{x}_9^- \\ \varepsilon \hat{x}_{10}^- \\ \varepsilon \hat{x}_{11}^- \end{pmatrix}_k$$

The navigation derived values are used in the H-matrix rather than the sensor measurement values since they are considered to be "nominal truth" and less noisy. Also, the rate terms in the last column are available from the cubic spline polynomials used for interpolating SRO/Navigation data. In addition this addresses the case of lower dimension measurements, such as poor elevation sensor measurements due to a "low-elevation" environment, or the case of the 2-dimensional sensors.

2.4.2 SRKF Measurement Innovation Testing. It is preferable to ensure that the SRKF estimation process not be perturbed by erroneous measurements. Accepting and processing measurement outliers would likely have a significant impact on sensor registration errors, and thus have an adverse effect on the Track Manager functions. In order to guard against poor measurements, and to monitor SRKF performance for consistency, each measurement innovation component in $\vec{v}_k$ from Eq. 85 may be compared with its corresponding diagonal element in the measurement innovation covariance, denoted $P_\upsilon$. The Kalman filter measurement innovation in Eq. 85 has a measurement innovation covariance matrix, at time=$t_k$, given by:

$$P_\upsilon = \begin{pmatrix} P_{\upsilon 11} & P_{\upsilon 12} & P_{\upsilon 13} & P_{\upsilon 14} \\ P_{\upsilon 12} & P_{\upsilon 22} & P_{\upsilon 23} & P_{\upsilon 24} \\ P_{\upsilon 13} & P_{\upsilon 23} & P_{\upsilon 33} & P_{\upsilon 34} \\ P_{\upsilon 14} & P_{\upsilon 24} & P_{\upsilon 34} & P_{\upsilon 34} \end{pmatrix} = H_k P_k^- H_k^T + R_k, \qquad \text{Eq. 88}$$

where, $H_k$, is the same matrix as in Eq. 87, and the measurement noise matrix, $R_k$, corresponds to the error measurement $\delta \vec{z}_k$, as specified in section 2.3.6.

2.4.3 SRKF Kalman Gain. The Kalman filter gain matrix, $K_k$, at time=$t_k$, is a 11×4 matrix, defined in Table 2.1, as:

$$K_k = P_k^- H_k^T [P_\upsilon]^{-1},$$

where $$P_\upsilon = H_k P_k^- H_k^T + R_k. \qquad \text{Eq. 89}$$

This Kalman gain matrix is associated with the 4×1 measurement innovation vector in Eq. 85.

2.4.4. SRKF State Update. The SRKF state vector, $\varepsilon \hat{\vec{x}}_k^-$, at time=$t_k$, may be updated using the measurement innovation vector and Kalman gain matrix in accordance with Table 2.1, as:

$$\varepsilon \hat{\vec{x}}_k^+ = \varepsilon \hat{\vec{x}}_k^- + K_k [\vec{v}_k],$$

where $$\vec{v}_k = \delta \vec{z}_k - H_k \varepsilon \hat{\vec{x}}_k^-. \qquad \text{Eq. 90}$$

2.4.5 SRKF Covariance Update. The SRKF 11×11 covariance matrix, $P_k^-$, at time=$t_k$, may be updated using the Kalman gain computed in Eq. 89, as:

$$P_k^+ = [I - K_k H_k] P_k^- [I - K_k H_k]^T + K_k R_k K_k^T. \qquad \text{Eq. 91}$$

2.5 SRKF Propagation. The propagation of the SRKF state vector and covariance to either the next measurement update, or some other instant in time will be addressed in this section. One system model for the SRKF is based on the 11×11 linear system matrix, F=0, representing bias states. This corresponds to an 11×11 state transition matrix, $\Phi$=I, which is used to propagate both the state vector and the covariance matrix over the time interval, $(t_k, t_{k+1})$. However, if a sensor requires a system model with state elements that are not characterized by all biases, then the case where F≠0 and $\Phi$≠I may be allowed.

2.5.1. SRKF State Propagation. The updated (a posteriori) state vector, $\varepsilon \hat{\vec{x}}_k^+$, at time=$t_k$, shall be propagated to time=$t_{k+1}$, as defined in Table 2.1, $$\varepsilon \hat{\vec{x}}_{k+1}^- = \Phi_k \varepsilon \hat{\vec{x}}_k^+. \qquad \text{Eq. 92}$$

2.5.2 SRKF Covariance Propagation. The updated (a posteriori) covariance matrix, $P_k^+$, at time=$t_k$, shall be propagated to time=$t_{k+1}$, as defined in Table 2.1, $$P_{k+1}^- = \Phi_k P_k^+ \Phi_k^T + Q_k, \qquad \text{Eq. 93}$$

where:

$$Q_k \approx Q(t) \cdot \Delta T, \ \Delta T = t_{k+1} - t_k. \qquad \text{Eq. 94}$$

2.6 SRKF Target Measurement Report Registration.

The SRKF state vector, $\varepsilon\hat{\vec{x}}_k$, may be used to correct all sensor target Measurement Reports as a function of each target's measured range ($\rho_s$), bearing ($\theta_{Bs}$), and elevation ($\theta_{Es}$). The corresponding covariance matrix, $P_k$, may be used to quantify the uncertainty of the sensor registration corrections with respect to WGS-84. These corrections may be applied to the sensor target Measurement Reports prior to providing the measurements to a Target Tracker and other Track Management functions. This ensures that all inputs are registered in WGS-84 prior to the initiation and maintenance of a track, and prior to correlation functions. It may be very difficult, if not impractical to correct the tracker output or track files as a post process since each target measurement correction is dependent upon target range, bearing, and elevation. It is important to note that the input to the SRKF requires sensor aperture uncorrected AMRs. That is, the SRKF corrections must not be applied to the sensor AMR inputs to the SRKF. A distinction exists between "corrected" target report inputs for Track Management functions and the "uncorrected" AMR inputs for the SRKF function. If this distinction is not maintained, the estimates of the SRKF will become unstable. However, it should be noted that atmospheric refraction corrections may be applied to the "uncorrected" AMR inputs to the SRKF. In fact, as mentioned previously, that type of correction is desirable prior to providing the AMRs to the SRKF.

2.6.1 SRKF Target Measurement Report Correction.

Sensor registration corrections in range ($\delta\rho$), bearing ($\delta\theta_B$), elevation ($\delta\theta_E$), range-rate ($\delta\rho_R$), and time ($\delta t$) for each target Measurement Report are based on a linear combination of the SRKF state estimates. This linear relationship depends on the sensor measured target range ($\rho_s$), bearing ($\theta_{Bs}$), and elevation ($\theta_{Es}$), as previously derived in Eq. 4.46 and Eq. 83, and expressed using terms for the SRKF "H-matrix". A fifth row has been added to the SRKF "H-matrix" to incorporate a correction for the estimated time bias, $\varepsilon t$, in the sensor Measurement Report time-tag. Therefore, the specific sensor registration corrections for a specific target Measurement Report are written as:

$$\begin{pmatrix} \delta\rho \\ \delta\theta_B \\ \delta\theta_E \\ \delta\rho_R \\ \delta t \end{pmatrix}_s = \hat{H}\varepsilon\hat{\vec{x}} = \begin{pmatrix} 1 & \rho_s & 0 & 0 & 0 & 0 & 0 & 0 & 0 & 0 \\ 0 & 0 & 0 & C_{\theta_{Bs}} & S_{\theta_{Bs}} & 0 & 0 & -C_{\theta_{Bs}}T_{\theta_{Es}} & -S_{\theta_{Bs}}T_{\theta_{Es}} & 1 & 0 \\ 0 & 0 & 0 & 0 & 0 & 1 & \theta_{Es} & S_{\theta_{Bs}} & -C_{\theta_{Bs}} & 0 & 0 \\ 0 & 0 & 1 & 0 & 0 & 0 & 0 & 0 & 0 & 0 & 0 \\ 0 & 0 & 0 & 0 & 0 & 0 & 0 & 0 & 0 & 0 & -1 \end{pmatrix} \begin{pmatrix} \varepsilon\hat{\rho} \\ \varepsilon\hat{s}f_R \\ \varepsilon\hat{\rho}_R \\ \varepsilon\hat{s}f_{Bx} \\ \varepsilon\hat{s}f_{By} \\ \varepsilon\hat{\theta}_E \\ \varepsilon\hat{s}f_E \\ \varepsilon\hat{\varphi}_x \\ \varepsilon\hat{\varphi}_y \\ \varepsilon\hat{\varphi}_z \\ \varepsilon\hat{t} \end{pmatrix} \quad \text{Eq. 95}$$

This is an important point in that the corrections are not simply estimated and then applied uniformly to every target Measurement Report within the aperture's FOV. The application of these corrections to the "uncorrected" sensor target measurement report is derived from the SRKF input measurement Eq. 86. The "corrected" sensor target measurement report is determined by $$\begin{pmatrix} \rho \\ \theta_B \\ \theta_E \\ \dot{\rho} \\ t \end{pmatrix}_s = \begin{pmatrix} \rho_s \\ \theta_{Bs} \\ \theta_{Es} \\ \dot{\rho}_s \\ t_s \end{pmatrix}_{\bar{s}} + \begin{pmatrix} \delta\rho \\ \delta\theta_B \\ \delta\theta_E \\ \delta\rho_R \\ \delta t \end{pmatrix}_{\bar{s}}. \quad \text{Eq. 96}$$

The corrections for time bias and range-rate bias are independent of the other states and may be treated separately.

2.6.2 SRKF Target Measurement Report Covariance.

The corresponding 5×5 covariance matrix, representing the uncertainty in the corrections applied to a target Measurement Report using Eq. 95, is also target dependent, and may be written as $$E\left\{\begin{pmatrix} \delta\rho \\ \delta\theta_B \\ \delta\theta_E \\ \delta\rho_R \\ \delta t \end{pmatrix} (\delta\rho \quad \delta\theta_B \quad \delta\theta_E \quad \delta\rho_R \quad \delta t)\right\}_{\bar{s}} = \hat{H}E\{(\varepsilon\hat{\vec{x}}_k)(\varepsilon\hat{\vec{x}}_k)\}\hat{H}^T = \hat{H}P_k\hat{H}^T, \quad \text{Eq. 97}$$

where $P_k$ is the SRKF covariance matrix, and $\hat{H}$ is the same target dependent matrix from Eq. 95.

3. NAVIGATION REGISTRATION IMPLEMENTATION.

Navigation Registration is defined as the process of estimating the local navigation position and misalignment residual errors in Eq. 4 (repeated below), to achieve an accurate unbiased or "zero-mean" representation of the local navigation contribution to target error relative to the WGS-84 (e-frame).

$$(\vec{r}_{tr})_e = (\vec{r})_e + T_{le}^T T_{lp} T_{bp}^T \{(\vec{r})_b + T_{b\bar{s}} T_{\bar{s}s} (\Delta\vec{r}_{tr})_s\} \quad \text{Eq. 98}$$

The Navigation Registration portion of Eq. 98 may be expressed in the WGS-84 e-frame as $$(\vec{r}_{tr})_e = \begin{pmatrix} x_{etr} \\ y_{etr} \\ z_{etr} \end{pmatrix}_e = (\vec{r})_e + T_{le}^T T_{lp} (\Delta\vec{r}_{tr})_p, \quad \text{Eq. 99}$$

where $(\vec{r})_e$ is the IU's position vector in the e-frame, $T_{lp}$ is the navigation misalignment transformation with respect to the l-frame, and $T_{le}$ is the direction cosine transformation from the l-frame to the e-frame. The local vector, $(\Delta \vec{r}_{tr})_p$, represents the local sensor target measurement data expressed in the navigation platform frame (p-frame). The dominant navigation errors in Eq. 99 consist of errors in position ($\lambda$, $\phi$, h), and errors in platform misalignment ($\theta_x$, $\theta_y$, $\theta_z$). The corresponding target error equation was provided in Eq. 8, which has the following navigation error contributions:

$$(\delta\vec{r}_{tr})_e = \begin{pmatrix} \delta x_{etr} \\ \delta y_{etr} \\ \delta z_{etr} \end{pmatrix}_e = (\delta\vec{r})_e + T_{le}^T \begin{pmatrix} 0 & \Delta r_{trzp} & -\Delta r_{tryp} \\ -\Delta r_{trzp} & 0 & \Delta r_{trxp} \\ \Delta r_{tryp} & -\Delta r_{trxp} & 0 \end{pmatrix} \begin{pmatrix} \varepsilon\theta_x \\ \varepsilon\theta_y \\ \varepsilon\theta_z \end{pmatrix}, \quad \text{Eq. 100}$$

where the navigation registration position errors are defined as:

$$(\delta\vec{r})_e = \begin{pmatrix} \delta x_e \\ \delta y_e \\ \delta z_e \end{pmatrix} = \begin{pmatrix} x_e - \hat{x}_e \\ y_e - \hat{y}_e \\ z_e - \hat{z}_e \end{pmatrix}, \quad \text{Eq. 101}$$

and the misalignment angle errors in the transformation $T_{lp}$ are defined as:

$$\varepsilon\theta_x = \theta_x - \hat{\theta}_x, \; \varepsilon\theta_y = \theta_y - \hat{\theta}_y, \; \varepsilon\theta_z = \theta_z - \hat{\theta}_z. \quad \text{Eq. 102}$$

The position error $(\delta\vec{r})_e$ in Eq. 100 may be expressed in the local level (n-frame) coordinates by simply pre-multiplying Eq. 101 by the transformation $T_{ne}$ which results in the linear position errors, north position error, $\delta r_n$, west position error, $\delta r_w$, and vertical (up) position error, $\delta r_z$, as:

$$\begin{pmatrix} \delta r_n \\ \delta r_w \\ \delta r_z \end{pmatrix}_n = \begin{pmatrix} -S_\lambda C_\phi & -S_\lambda S_\phi & C_\lambda \\ S_\phi & -C_\phi & 0 \\ C_\lambda C_\phi & C_\lambda S_\phi & S_\lambda \end{pmatrix} \begin{pmatrix} \delta x_e \\ \delta y_e \\ \delta z_e \end{pmatrix}_e. \quad \text{Eq. 103}$$

The position error $(\delta\vec{r})_e$ in Eq. 100 may also be rewritten (see Eq. 12) in terms of errors in latitude, $\varepsilon\lambda$, longitude, $\varepsilon\phi$, and altitude, $\varepsilon h$, as:

$$\begin{pmatrix} \delta x_e \\ \delta y_e \\ \delta z_e \end{pmatrix}_e = \begin{pmatrix} -(r_{ew}+h)S_\lambda C_\phi & -(r_{ew}+h)C_\lambda S_\phi & C_\lambda C_\phi \\ -(r_{ew}+h)S_\lambda S_\phi & (r_{ew}+h)C_\lambda C_\phi & C_\lambda S_\phi \\ [(1-e^2)r_{ew}+h]C_\lambda & 0 & S_\lambda \end{pmatrix} \begin{pmatrix} \varepsilon\lambda \\ \varepsilon\phi \\ \varepsilon h \end{pmatrix}. \quad \text{Eq. 104}$$

Note, the second-order error terms in Eq. 104, e.g., errors in $r_{ew}$ and the direction cosines, are considered insignificant. If Eq. 103 and Eq. 104 are combined, the relationship between the linear position errors and the geodetic angular position errors may be obtained as:

$$\begin{pmatrix} \delta r_n \\ \delta r_w \\ \delta r_z \end{pmatrix}_n = \begin{pmatrix} (r_{ew}+h)-e^2 r_{ew} C_\lambda^2 & 0 & 0 \\ 0 & -(r_{ew}+h)C_\lambda & 0 \\ -e^2 r_{ew} S_\lambda C_\lambda & 0 & 1 \end{pmatrix} \begin{pmatrix} \varepsilon\lambda \\ \varepsilon\phi \\ \varepsilon h \end{pmatrix}. \quad \text{Eq. 105}$$

The "$e^2 r_{ew}$" terms in Eq. 105 result in approximately 20 feet of position error when the latitude error is 1 nm (6,076 feet) at a latitude of 45 degrees which is 0.3% of the error. In general these terms may be ignored resulting in the following position error approximations:

$$\delta r_n \cong (r_{ew}+h)\cdot\varepsilon\lambda,$$

$$\delta r_w \cong -(r_{ew}+h)C_\lambda \cdot \varepsilon\phi, \text{ and}$$

$$\delta r_z \cong \varepsilon h. \quad \text{Eq. 106}$$

Recall that the altitude error may be defined based on altitude above the WGS-84 ellipsoid, or as an altitude above Mean-Sea-Level (MSL) which is approximately the same reference as the WGS-84 geoid. Most navigation systems navigate using the MSL altitude so care must be taken in how the altitude and its corresponding error are expressed.

3.1 NRKF Modeling and Initialization. In general it is expected that a tightly coupled GPS/INS hybrid navigation solution along with the integrated Link 16 navigation solution will yield the optimal minimum variance estimates of the local navigation registration solution, and any residual navigation errors should be insignificant. However, it is reasonable to consider the cases that might result in larger residual navigation registration errors. This might occur if the GPS/INS host integration is not tightly coupled. For example, if GPS position updates are used infrequently in the host hybrid Kalman filter, the solution may converge slowly resulting in significant deviations in position between the GPS and the INS. Another concern is the case when the integration of Link 16 navigation within the host local GPS/INS is not completed resulting in position deviations. Finally the case of GPS vulnerability may result in situations where GPS becomes degraded or unavailable. Therefore, given the local sources of navigation data available to the IU it is desirable to consider comparisons of the position estimates provided by the INS, GPS, and Link 16 as possible measurements for the navigation registration errors modeled in the NRKF. Specifically the NRKF would estimate as states in the Kalman filter the position errors in latitude, $\varepsilon\lambda$, longitude, $\varepsilon\phi$, and altitude, $\varepsilon h$. The local level INS misalignment errors, $\varepsilon\theta_x$ and $\varepsilon\theta_y$, in Eq. 100 have a negligible impact on target error and the azimuth misalignment, $\varepsilon\theta_z$, is not separable from the sensor registration azimuth error discussed in section 2.1. Therefore, the NRKF will include three position error states for navigation registration to account for residual local hybrid INS position errors. The three navigation registration position error states will augment the sensor registration error state vector (11 states) developed in section 4 resulting in a 14-element error state vector for the DRKF which will be discussed in section 6. Another consideration for future development may be to include residual velocity errors and possibly residual acceleration errors in the model for navigation registration. This may be particularly useful in the case where an independent reference velocity measurement is available for comparison with the local hybrid navigation velocity. Three residual velocity error states could be added to the three residual position error states in both the NRKF and the DRKF to model these errors.

The NRKF may also receive direct measurements of the local hybrid navigation position errors. These measurements might be provided by an external source, or they might be derived directly from DRKF estimates of navigation registration errors associated with one or more sensor apertures. The direct measurements provided by the DRKF are the result of processing CAO measurements which would be subject to Geometric Dilution Of Precision (GDOP) constraints. That is, the observability of the NR errors are directly related to the geometric distribution of the CAO sources available in the DRKF estimation process. These direct measurements are primarily useful during conditions when GPS and Link 16 navigation position data is either degraded or unavailable for the NRKF processing. Contributions from multiple CAO sources and from multiple sensor apertures should generally improve the GDOP and thereby the observability of the NR errors using these direct measurements.

This section provides a general system error model for navigation registration position errors, including the initial error state vector, error covariance, and process noise spectral density matrix, corresponding to the Kalman filter description in Table 2.1. The parameters of this model may be varied according to the specific characteristics of the host hybrid GPS/INS navigation system. This section will also treat the three navigation error states as independent of the eleven error states for sensor registration. Section 6 will address the combined fourteen error states of the DRKF for measurement processing involving the combination of both navigation registration errors and sensor registration errors.

3.1.1 NRKF Modeling. The geodetic angular position errors, latitude error, $\varepsilon\lambda$, and longitude error, $\varepsilon\phi$, may be chosen to be modeled since these are global representations of position and standard WGS-84 outputs of all navigation systems. This angular representation does create a minor limitation in the polar regions due to the convergence of the lines of longitude to a singularity at the poles. However, the mathematical representation will still be valid within close proximity to the poles (±89.5 degrees). The altitude error, $\varepsilon h$, is a linear error.

The minimum design requires the use of bias errors for the navigation registration position error model of the NRKF. Analysis of specific navigation systems may show that the bias model assumption may result in residual estimation errors that are not characterized by "white noise". In this case, a first-order Gauss-Markoff error model may provide better performance. The Markoff model is an exponentially correlated random process representation which may easily be adapted to a random bias model as the Markoff time constant approaches infinity. Therefore the navigation registration position errors may be expressed using the first-order Gauss-Markoff differential equations as follows. The geodetic latitude residual position error is modeled as:

$$\dot{\varepsilon\lambda} = -\frac{1}{\tau_{\varepsilon\lambda}} \cdot \varepsilon\lambda + w_{\varepsilon\lambda},$$

where $w_{\varepsilon\lambda} \sim N(0, q_{\varepsilon\lambda})$ uncorrelated Gaussian distributed white noise, $$E\{\sigma_{\varepsilon\lambda}^2\} = q_{\varepsilon\lambda} \cdot \tau_{\varepsilon\lambda}/2, \qquad \text{Eq. 107}$$

$\tau_{\varepsilon\lambda}$-latitude error Markoff time constant.
The geodetic longitude residual position error is modeled as:

$$\dot{\varepsilon\phi} = -\frac{1}{\tau_{\varepsilon\phi}} \cdot \varepsilon\phi + w_{\varepsilon\phi},$$

where $w_{\varepsilon\phi} \sim N(0, q_{\varepsilon\phi})$ uncorrelated Gaussian distributed white noise, $$E\{\sigma_{\varepsilon\phi}^2\} = q_{\varepsilon\phi} \cdot \tau_{\varepsilon\phi}/2, \qquad \text{Eq. 108}$$

$\tau_{\varepsilon\phi}$-longitude error Markoff time constant.
The residual altitude error may also be modeled using the Markoff process whether the altitude is ellipsoid or geoid (MSL). The difference between the two altitudes is an offset that is essentially constant over relatively large geographical regions but does vary as a function of position in a global sense. Therefore the altitude residual position error is modeled as:

$$\dot{\varepsilon h} = -\frac{1}{\tau_{\varepsilon h}} \cdot \varepsilon h + w_{\varepsilon h},$$

where $w_{\varepsilon h} \sim N(0, q_{\varepsilon h})$ uncorrelated Gaussian distributed white noise, $$E\{\sigma_{\varepsilon h}^2\} = q_{\varepsilon h} \cdot \tau_{\varepsilon h}/2, \qquad \text{Eq. 109}$$

$\tau_{\varepsilon h}$-altitude error Markoff time constant.
It is likely that the latitude and longitude residual position error model parameters, the time constants, $\tau_{\varepsilon\lambda}$ and $\tau_{\varepsilon\phi}$, and the mean square values, $\sigma_{\varepsilon\lambda}^2$ and $\sigma_{\varepsilon\phi}^2$, will use the same values based on the host hybrid navigation system performance. The vertical or altitude residual error model parameters, $\tau_{\varepsilon h}$ and $\sigma_{\varepsilon h}^2$, will be dependent on the host navigation vertical channel and the vehicle dynamics, e.g., ship, aircraft, ground unit. The NRKF 3-element state vector may be written as, $\varepsilon\vec{x} = (\varepsilon\lambda \ \varepsilon\phi \ \varepsilon h)^T$. The system function, $\vec{f}(\varepsilon\hat{\vec{x}}(t),t)$, reduces to the linear system matrix, $F(\varepsilon\vec{x}(t),t) = F$, given by $$F = \begin{pmatrix} -\frac{1}{\tau_{\varepsilon\lambda}} & 0 & 0 \\ 0 & -\frac{1}{\tau_{\varepsilon\phi}} & 0 \\ 0 & 0 & -\frac{1}{\tau_{\varepsilon h}} \end{pmatrix}. \qquad \text{Eq. 110}$$

The State Transition Matrix, $\Phi(t_k, t_{k-1})$, corresponding to the linear system matrix F, is given by:

$$\Phi(\Delta t) = \begin{pmatrix} e^{-\Delta t/\tau_{\varepsilon\lambda}} & 0 & 0 \\ 0 & e^{-\Delta t/\tau_{\varepsilon\phi}} & 0 \\ 0 & 0 & e^{-\Delta t/\tau_{\varepsilon h}} \end{pmatrix}, \qquad \text{Eq. 111}$$

where $\Delta t = t_k - t_{k-1}$.

3.1.2 NRKF Initialization. The initial state estimate for the NRKF navigation registration residual position errors may be set to a non-zero vector based upon last known estimates, $\varepsilon\hat{\vec{x}}$, and its corresponding covariance matrix, P, that were saved from prior estimation if those estimates were relatively recent (i.e., within the last 10 minutes). However, due to the availability of high-rate local navigation data, the default and conservative approach is to initialize the state estimate to zero, $$\hat{\varepsilon x}(0) = \begin{pmatrix} \varepsilon\lambda(0) \\ \varepsilon\phi(0) \\ \varepsilon h(0) \end{pmatrix} = \begin{pmatrix} 0 \\ 0 \\ 0 \end{pmatrix}. \qquad \text{Eq. 112}$$

Another alternative might be to select the initial values as the difference between GPS position and the hybrid INS position. However, this will also result from the first measurement update provided to the NRKF after initialization. The NRKF initial covariance matrix, P(0), will be a diagonal matrix (unless using a previously saved covariance, P) with diagonal elements representing the initial variances for each element of the initial state vector in Eq. 112. These default initial variances should be selected conservatively to ensure that they in fact bound the potential error in the initial state estimate. If the states are initialized to zero in Eq. 112, then a logical choice for P(0) would be to use the position covariance provided by the host hybrid INS. If the states are initialized using GPS, then the GPS position variances should be used to initialize the navigation registration error covariance matrix.

$$P(0) = \begin{pmatrix} \sigma_{\varepsilon\lambda}^2 & 0 & 0 \\ 0 & \sigma_{\varepsilon\phi}^2 & 0 \\ 0 & 0 & \sigma_{\varepsilon h}^2 \end{pmatrix}. \qquad \text{Eq. 113}$$

The process noise spectral density matrix, Q(t), is intended to account for unmodeled errors in the state model, which is defined by the system function, $\vec{f}(\hat{\varepsilon\vec{x}}(t),t)$, or in the case of the Markoff model, the linear system matrix, $F(\hat{\varepsilon\vec{x}})(t),t)=F$. It is important that Q(t) be non-zero to ensure that the estimator is both controllable and stable. Furthermore, in the case of the first-order Gauss-Markoff model, it is also necessary that the spectral density be related to the expected mean square error as $q(t)=2\cdot\sigma^2/\tau$. In general the selection of the spectral density, q, (or mean square error, $\sigma^2$) depends on the specific host hybrid INS implementation. Note that larger values for q imply larger uncertainty in the unmodeled residual position error. Physically, the process noise spectral density in this case represents the residual velocity error that integrates into the residual position error over time. This error characteristic is generally dynamic based on the specific host application, e.g., ship, aircraft, fixed ground site.

$$Q(t) = \begin{pmatrix} q_{\varepsilon\lambda} & 0 & 0 \\ 0 & q_{\varepsilon\phi} & 0 \\ 0 & 0 & q_{\varepsilon h} \end{pmatrix} = \begin{pmatrix} \frac{2\sigma_{\varepsilon\lambda}^2}{\tau_{\varepsilon\lambda}} & 0 & 0 \\ 0 & \frac{2\sigma_{\varepsilon\phi}^2}{\tau_{\varepsilon\phi}} & 0 \\ 0 & 0 & \frac{2\sigma_{\varepsilon h}^2}{\tau_{\varepsilon h}} \end{pmatrix}. \qquad \text{Eq. 114}$$

The discrete-time representation of the process noise covariance is given by:

$$Q_{k-1} = \int_{t_{k-1}}^{t_k} \Phi(t_k, \alpha) Q(\alpha) \Phi^T(t_k, \alpha) d\alpha \qquad \text{Eq. 115}$$

where $\Phi(t_k, t_{k-1})$ is the state transition matrix
Table 2.1 uses the following first-order approximation for $Q_{k-1} \rightarrow Q(t)\cdot\Delta t$, where $\Delta t = t_k - t_{k-1}$. The first-order Markoff has an exact form derived from Eq. 115 that may be used for the process noise covariance. Therefore, each modeled Markoff state will have a process noise covariance given by:

$$q_{k-1} = \frac{q\tau}{2}[1 - e^{-2\Delta t/\tau}] = \sigma^2[1 - e^{-2\Delta t/\tau}]. \qquad \text{Eq. 116}$$

Then the process noise covariance matrix corresponding to Eq. 114 is given by:

$$Q_{k-1} = \begin{pmatrix} q_{\varepsilon\lambda} & 0 & 0 \\ 0 & q_{\varepsilon\phi} & 0 \\ 0 & 0 & q_{\varepsilon h} \end{pmatrix}_{t_{k-1}} = \qquad \text{Eq. 117}$$

$$\begin{pmatrix} \sigma_{\varepsilon\lambda}^2[1 - e^{-2\Delta t/\tau_{\varepsilon\lambda}}] & 0 & 0 \\ 0 & \sigma_{\varepsilon\phi}^2[1 - e^{-2\Delta t/\tau_{\varepsilon\phi}}] & 0 \\ 0 & 0 & \sigma_{\varepsilon h}^2[1 - e^{-2\Delta t/\tau_{\varepsilon h}}] \end{pmatrix},$$

where $\Delta t = (t_k - t_{k-1})$.

Typically each host hybrid navigation system will have dynamic uncertainties for its navigation position errors. The NRKF process noise spectral density in Eq. 114 or Eq. 117 should be adaptively adjusted according to the position uncertainties of the local hybrid navigation system.

3.2 NRKF Measurement Process. The NRKF measurement process is based on the target equation, Eq. 98, and specifically the navigation position error as expressed in Eq. 101. There are two classes of measurements associated with Eq. 98. The first is a position measurement based on the direct comparison of the local hybrid INS position with an alternate source such as GPS or Link 16 position. In this case the measurements provide a direct observation of the navigation registration position errors. The second measurement class is based on a comparison of target positions derived from two separate sensor apertures that may be from two local sensors or from a local and a remote sensor. In this case the measurements include the combination of navigation and sensor registration errors. This case is referred to as the Common Air Object (CAO) or Mutual Target measurement which will be addressed later in section 4. The first class of measurement involving observations of navigation registration residual position errors based on GPS or Link 16 as references are represented by Eq. 101. Since navigation systems provide as outputs the geodetic latitude, $\lambda$, longitude, $\phi$, and altitude, h, the corresponding position measurement errors may be written directly in terms of the model state vector errors in section 3.1.1 as:

$$\delta\vec{z} = \begin{pmatrix} \delta\lambda \\ \delta\phi \\ \delta h \end{pmatrix} = \begin{pmatrix} \lambda \\ \phi \\ h \end{pmatrix} - \begin{pmatrix} \hat{\lambda} \\ \hat{\phi} \\ \hat{h} \end{pmatrix}, \qquad \text{Eq. 118}$$

where $(\lambda\ \phi\ h)^T$—GPS or Link 16 position, and $(\hat{\lambda}\ \hat{\phi}\ \hat{h})^T$—Local Hybrid INS position.

The measurement equation for the Kalman filter is based on the model (see Table 2.1)

$$\vec{z} = \vec{h}(\vec{x}),$$ Eq. 119 where in the case of Eq. 119:

$$\vec{z} = \begin{pmatrix} \lambda \\ \phi \\ h \end{pmatrix}, \text{ and}$$ Eq. 120

$$\vec{h}(\vec{x}) = \begin{pmatrix} \hat{\lambda} \\ \hat{\phi} \\ \hat{h} \end{pmatrix}.$$

When the NRKF receives estimates of the local hybrid navigation position errors from another source, for example the DRKF, the Kalman filter input measurements are provided directly as:

$$\delta\vec{z} = \begin{pmatrix} \delta\lambda \\ \delta\phi \\ \delta h \end{pmatrix} = \begin{pmatrix} \varepsilon\lambda \\ \varepsilon\phi \\ \varepsilon h \end{pmatrix},$$ Eq. 121 where
$(\varepsilon\lambda \ \varepsilon\phi \ \varepsilon h)^T$—DRKF error estimates.

The Kalman filter input measurement, relative to the modeled error states, $\varepsilon\vec{x} = (\varepsilon\lambda, \varepsilon\phi, \varepsilon h)^T$, is given by:

$$\delta\vec{z} = \vec{z} - \vec{h}(\hat{\vec{x}}) = H\varepsilon\vec{x},$$ Eq. 122 where $$H = \frac{\partial \vec{h}(\vec{x})}{\partial \vec{x}^T}\bigg|_{\vec{x}=\hat{\vec{x}} \text{ or } \varepsilon\vec{x}=\vec{x}-\hat{\vec{x}}}.$$ Eq. 122

The NRKF measurement innovation corresponding to the error measurement $\delta\vec{z}$ is given by:

$$\vec{v} = \delta\vec{z} - H\varepsilon\vec{x},$$ Eq. 123 where $$H = \begin{pmatrix} 1 & 0 & 0 \\ 0 & 1 & 0 \\ 0 & 0 & 1 \end{pmatrix}.$$ Eq. 123

The NRKF "H-matrix" defines the relationship between the error state vector and the navigation registration measurements. It also relates the NRKF navigation registration error estimates to the navigation registration corrections to be applied to the local hybrid navigation position.

3.3 NRKF Measurement Preprocessing and Screening. Measurement preprocessing refers to the extraction, testing, and selection of local GPS position data, local Link 16 position data, DRKF position error estimates, and local IU hybrid navigation data, as potential "Navigation Registration Measurement Data Sets" for input to the NRKF. These data may be from a single common navigation system or they may be independently associated with each individual sensor aperture. A NRKF "Navigation Registration Measurement Data Set" includes all of the information required to compute the NRKF error measurement components of Eq. 119 or Eq. 122. These input data are generally asynchronous and have various receive latencies which require buffering and time alignment prior to computing NRKF measurements. The NRKF will process all measurements within a "NRKF Cycle" and provide as output the updated estimates and covariance at the end of each cycle.

The NRKF in estimating residual navigation errors in the local hybrid navigation data may monitor the local hybrid navigation data for discrete step changes in the position data based upon updates to the local hybrid navigation system or for changes in the source of the local hybrid navigation data from one system to another, e.g., INS 1 to INS 2. These discontinuities may be detected and removed from the NRKF and DRKF estimation processes when they occur. Hence the NRKF may employ a reset to the NRKF error estimates and covariance whenever these updates occur. These resets will remove the specific amount of the local hybrid position update or reinitialize the error state and covariance, and will coincide with the time of the local hybrid navigation update data or system change, respectively, with time-tags, denoted $t_k = t_n$. One step includes the acceptance of a position reset based on local hybrid navigation system position update or change, valid at time $\{t_k\}$, and requires no time alignment.

The normal NRKF position error measurement updates may coincide with a GPS position measurement time-tag, a Link 16 position measurement time-tag, or a direct DRKF position error measurement time-tag, denoted $t_k$. Each GPS position measurement has associated time-tags, denoted $t_g$. Each Link 16 position measurement has associated time-tags, denoted $t_l$. Since the DRKF position error measurement is a direct measurement it requires no time alignment and will be valid at the end of each DRKF cycle having time-tags, denoted $t_k$. Therefore, all navigation registration position error measurements will have time tags, $t_k = t_g$, $t_k = t_l$, or, $t_k = t_k$.

Local hybrid navigation data is generally available at a high rate from the IU's local navigation system with time-tags, denoted $t_n$. The time alignment of the position error measurement data is achieved by interpolating (extrapolation may be sufficient) the local hybrid navigation data to the time of either the GPS position measurement or the time of the Link 16 position measurement. Another step may be the use of GPS as a position measurement. The buffered local navigation data at times, $\{t_n\}$, are interpolated or extrapolated to the time of the GPS position measurement, $\{t_g\}$. This results in the geodetic position measurement data set at time $\{t_k = t_g\}$ within a NRKF Cycle. Another step may be the use of Link 16 as a position measurement. The buffered local navigation data at times, $\{t_n\}$, are interpolated or extrapolated to the time of the Link 16 position measurement, $\{t_l\}$. This results in the geodetic position measurement data set at time $\{t_k = t_l\}$ within a NRKF Cycle. Another step involves the computation of the NRKF measurement according to Eq. 121 based on either the GPS or the Link 16 position measurement. Another step includes the acceptance of a position error measurement directly from an external source or from the DRKF, valid at time $\{t_k\}$, and requires no time alignment. Typically, if GPS or Link 16 data is of reasonable quality and available to the NRKF, the direct position error measurements from the DRKF are not expected to provide much value. However, when both GPS and Link 16 are not available then DRKF position error measurements from multiple apertures may result in suitable contributions to the NRKF estimation process.

The measurement data may be assumed to be referenced to the common Data Reference Point (DRP) of the IU which is normally the reference point for the local hybrid navigation data. If the reference point is another location, e.g., the sensor aperture, then the measurement data may be transformed to that reference point. Also, the NRKF expects to receive "uncorrected" local hybrid navigation data as an input. That is, the host should not apply NRKF corrections to the local hybrid navigation data it supplies to the NRKF algorithm. The resulting NRKF measurements, $\delta \vec{z}_k$, are computed according to Eq. 121 or Eq. 122 at the desired measurement times, $\{t_k\}$.

Another observation type that is necessary for the NRKF involves a "covariance-only" update to address the situation when GPS, Link 16, and DRKF measurement updates are unavailable for extended periods of time. This condition might result in the increase of the NRKF covariance beyond a reasonable value that should be bounded in the upper sense by the IU's local hybrid navigation position covariance. When this occurs, the NRKF may perform a "covariance measurement update" based on the IU's local hybrid navigation position uncertainty to ensure that the NRKF estimation uncertainty remains bounded by the IU's navigation uncertainty. This type of NRKF update will not affect the state estimates because the Kalman filter innovations will be explicitly set to zero for this measurement update. The NRKF state estimates for this situation may be near zero due to the absence of good independent reference position measurements.

The NRKF may accommodate the general case where multiple navigation sources may exist within the local system, such as, geographically separated sensor apertures with their own independent navigation data. In this case, the input data must be sorted according to each sensor aperture, and the navigation registration estimates will be unique to each aperture.

These navigation registration measurements and resets must also be interleaved in a monotonically increasing time order to ensure that all measurements are processed in a time order sequence without the need to propagate the estimates and covariance in a reverse or negative sense. The following sections describe the specific preprocessing and screening required for navigation registration input measurements and resets for the NRKF. It is preferable that all information in Eq. 120 be transformed to the correct reference point and time aligned such that any time offsets between systems, (e.g., GPS time, Link 16 time, local hybrid navigation time) be known with an accuracy of ±2 milliseconds (msec) to ensure that time errors associated with the dynamic data are minimal.

3.3.1 Hybrid Navigation Preprocessing and Screening. The local IU hybrid navigation data should contain "uncorrected" position data relative to the NRKF estimated residual position errors provided to the IU as an output of IDR. The local IU hybrid navigation data at times, $\{t_n\}$, may be monitored to detect when the source of the local hybrid navigation data has changed, for example, from INS #1 to INS #2. This event shall initiate a reset of the NRKF and DRKF navigation position error states and covariance. The local IU hybrid navigation data at times, $\{t_n\}$, may be monitored to detect when hybrid position updates have occurred in the host Kalman filter which will require corresponding NRKF and DRKF resets to the error states and covariance. The local IU hybrid navigation data at times, $\{t_n\}$, shall be buffered for use with potential NRKF measurement updates from the GPS data at times, $\{t_g\}$, and the Link 16 data at times, $\{t_l\}$.

3.3.2 GPS Measurement Preprocessing and Screening. GPS measurement data may be available from the host IU navigation system at either the 1 Hz rate in the "GPS Background PVT" message or at a higher rate of nominally 20-50 Hz in the "GPS Foreground PVT" message. Either message may be used and should have its data extracted and and processed to determine if the GPS data is acceptable, then the local hybrid INS data with times, $\{t_n\}$, will be time aligned with the GPS data at times, $\{t_g\}$, to produce position error measurements at times, $\{t_k=t_g\}$, by extrapolating the local hybrid INS data.

3.3.3 Link 16 Measurement Preprocessing and Screening. Link 16 position measurement data may be available from the Link 16 terminal navigation output message at a nominal rate of 4-20 Hz. Link 16 navigation position corrections in the output message may be applied to the terminal INS input data it receives from the host to produce the terminal's estimated position. The terminal navigation data should have its data extracted and processed to determine if the Link 16 data is acceptable, then the local hybrid INS data with times, $\{t_n\}$, will be time aligned with the Link 16 data with times, $\{t_l\}$, to produce position error measurements at times, $\{t_k=t_l\}$, by extrapolating or interpolating the local hybrid INS data.

Compute the Link 16 error measurement, $\delta \vec{z}_k$, and covariance, $R_k$, at time $\{t_l\}$. This processing addresses computing the error measurement $$\delta \vec{z}_k = \vec{z}_k - \vec{h}(\hat{\vec{x}}_k) = \begin{pmatrix} \delta \lambda \\ \delta \phi \\ \delta h \end{pmatrix} = \begin{pmatrix} \lambda_l \\ \phi_l \\ h_{le} \end{pmatrix} - \begin{pmatrix} \hat{\lambda} \\ \hat{\phi} \\ \hat{h} \end{pmatrix},\quad \text{Eq. 124}$$

where
$(\hat{\lambda}\ \hat{\phi}\ \hat{h})^T = (\lambda\ \phi\ h_e)^T$ extrapolated local hybrid navigation position.

The characterization of the measurement uncertainty quantifies the expected accuracy of the error measurement in Eq. 125 for the NRKF. Note in Eq. 125 that the error measurement is composed of the difference between the Link 16 Position and the Local Hybrid Position. Since the residual position error is being estimated in the Local Hybrid Position, the measurement noise will simply be the error covariance associated with the Link 16 Position, $R_{z_k}$.

3.3.4 Direct Position Error Measurement Preprocessing and Screening. External or DRKF estimates of the navigation registration position errors may be available as direct Kalman filter error measurement data. This data is available from the DRKF at the end of each of its filter cycles, e.g., once per minute, and should have its data extracted and processed if both the GPS and the Link 16 position measurements are not available from sections 3.3.2 and 3.3.3, respectively. Additionally, the DRKF NR estimates may be the result of CAO measurement updates and not simply the result of the NRKF estimates used as a priori initial conditions at the beginning of the latest DRKF cycle. If the direct position error estimates are independent, and acceptable based on its covariance, then the measurements shall be saved for subsequent processing in the NRKF. This is the principle mechanism for the DRKF navigation registration estimates derived from CAO observations to be integrated with the other NRKF estimates.

3.3.5 NRKF Measurement Screening. The GPS, Link 16, and DRKF potential measurements that were previously processed in sections 3.3.2, 3.3.3, and 3.3.4 will now be compared with the current NRKF estimates to determine if the measurements should be processed by the NRKF as measurement updates.

3.4 NRKF Measurement Update. The NRKF Measurement Update process is based on a recursive set of equations for both the error state vector and corresponding covariance matrix (see Table 2.1). The Kalman filter measurement update is designed to provide an unbiased, minimum variance, consistent estimate and error covariance using available measurements based on linear (or nonlinear) combinations of the error state vector. The NRKF state vector, $\vec{\varepsilon\hat{x}}$, is defined as a 3-element vector with an initial value given by Eq. 112. That is, $$\vec{\varepsilon\hat{x}} = \begin{pmatrix} \varepsilon\hat{x}_1 \\ \varepsilon\hat{x}_2 \\ \varepsilon\hat{x}_3 \end{pmatrix} = \begin{pmatrix} \varepsilon\hat{\lambda} \\ \varepsilon\hat{\phi} \\ \varepsilon\hat{h} \end{pmatrix}. \qquad \text{Eq. 125}$$

The NRKF error covariance matrix, P, is defined as a 3×3 positive definite symmetric matrix with an initial value given by Eq. 113, and representing the uncertainty in the state estimate in Eq. 126.

3.4.1 NRKF Measurement Innovation.

The Kalman filter measurement innovation, at time=$t_k$, is given by the linear Eq. 124 as $$\vec{v}_k = \begin{pmatrix} v_1 \\ v_2 \\ v_3 \end{pmatrix}_k = \delta\vec{z}_k - H_k \vec{\varepsilon\hat{x}}_k^-. \qquad \text{Eq. 126}$$

The NRKF error measurement was determined in section 3.3, as:

$$\delta\vec{z}_k = \begin{pmatrix} \delta\lambda \\ \delta\phi \\ \delta h \end{pmatrix} = \begin{pmatrix} \lambda_I \\ \phi_I \\ h_{Ie} \end{pmatrix}_k - \begin{pmatrix} \hat{\lambda} \\ \hat{\phi} \\ \hat{h} \end{pmatrix}_k, \qquad \text{Eq. 127}$$

for GPS ($i = g$) or Link 16 ($i = l$)

or $$\delta\vec{z}_k = \begin{pmatrix} \delta\lambda \\ \delta\phi \\ \delta h \end{pmatrix}_k = \begin{pmatrix} \varepsilon\lambda \\ \varepsilon\phi \\ \varepsilon h \end{pmatrix}_k,$$

for external or DRKF position errors, or $$\delta\vec{z}_k = \begin{pmatrix} \delta\lambda \\ \delta\phi \\ \delta h \end{pmatrix}_k = \begin{pmatrix} 0 \\ 0 \\ 0 \end{pmatrix}_k,$$

for "zero innovation" – covariance update, where all data is coordinatized in the DRP l-frame, and k denotes the measurement time, $t_k$.

The NRKF predicted (a priori) error measurement is based on the H-matrix from Eq. 124 for GPS, Link 16, and DRKF measurement updates, and will use the current error state estimate, at time=$t_k$.

$$H_k \vec{\varepsilon\hat{x}}_k^- = \begin{pmatrix} 1 & 0 & 0 \\ 0 & 1 & 0 \\ 0 & 0 & 1 \end{pmatrix}_k \begin{pmatrix} \varepsilon\hat{x}_1 \\ \varepsilon\hat{x}_2 \\ \varepsilon\hat{x}_3 \end{pmatrix}_k, \text{ for GPS, Link 16,} \qquad \text{Eq. 128}$$

or DRKF updates, or $$H_k \vec{\varepsilon\hat{x}}_k^- = \begin{pmatrix} 0 \\ 0 \\ 0 \end{pmatrix},$$

for "zero innovation" – covariance updates.

3.4.2 NRKF Measurement Innovation Testing. The NRKF estimation process may be protected from perturbations due to erroneous measurements or rapid changes (step changes) in the residual navigation errors that may result when the host local hybrid navigation system performs a position update of significant magnitude. In order to guard against this and to monitor NRKF performance for consistency, each measurement innovation component in $\vec{v}_k$ from Eq. 127 may be compared with its corresponding diagonal element in the measurement innovation covariance, denoted $P_v$. Note that this testing only applies to the GPS, Link 16, and DRKF measurement types, and does not apply to the "zero innovation"-covariance measurement update. The Kalman filter measurement innovation in Eq. 127 has a measurement innovation covariance matrix, at time=$t_k$, given by $$P_v = \begin{pmatrix} P_{v11} & P_{v12} & P_{v13} \\ P_{v12} & P_{v22} & P_{v23} \\ P_{v13} & P_{v23} & P_{v33} \end{pmatrix} = H_k P_k^- H_k^T + R_k, \qquad \text{Eq. 129}$$

where, $H_k$, is the same matrix as in Eq. 128, and the measurement noise matrix, $R_k$, corresponds to the error measurement $\delta\vec{z}_k$, as specified in section 3.3.

3.4.3 NRKF Kalman Gain. The Kalman filter gain matrix, $K_k$, at time=$t_k$, is a 3×3 matrix, defined in Table 2.1, as:

$$K_k = P_k^- H_k^T [P_v]^{-1},$$

where $$P_v = H_k P_k^- H_k^T + R_k. \qquad \text{Eq. 130}$$

This Kalman gain matrix is associated with the 3×1 measurement innovation vector in Eq. 126.

3.4.4 NRKF State Update. The NRKF state vector, $\vec{\varepsilon\hat{x}}_k^-$, at time=$t_k$, shall be updated using the measurement innovation and Kalman gain in accordance with Table 2.1, as $$\vec{\varepsilon\hat{x}}_k^+ = \vec{\varepsilon\hat{x}}_k^- + K_k [\vec{v}_k],$$

where $$\vec{v}_k = \delta\vec{z}_k - H_k \vec{\varepsilon\hat{x}}_k^-. \qquad \text{Eq. 131}$$

3.4.5 NRKF Covariance Update. The NRKF 3×3 covariance matrix, $P_k^-$, at time=$t_k$, may be updated using the Kalman gain computed in Eq. 131 as:

$$P_k^+ = [I - K_k H_k] P_k^- [I - K_k H_k]^T + K_k R_k K_k^T \qquad \text{Eq. 132}$$

3.4.6 NRKF Performance Monitoring. The health of the NRKF depends on the integrity of various inputs, and may be monitored to ensure proper performance in an operational environment.

3.5 NRKF Propagation. The propagation of the NRKF state vector and covariance to either the next measurement update, or some other instant in time will be addressed in this section. The system model for the NRKF is based on the 3×3 linear system matrix, F, defined in Eq. 110. This corresponds to the 3×3 state transition matrix, Φ, defined in Eq. 111 which is used to propagate both the state vector and the covariance matrix over the time interval, $(t_k, t_{k+1})$.

3.5.1 NRKF State Propagation. The updated (a posteriori) state vector, $\varepsilon\hat{\vec{x}}_k^+$, at time=$t_k$, may be propagated to time=$t_{k+1}$, as defined in Table 2.1, $$\varepsilon\hat{\vec{x}}_{k+1}^- = \Phi_k \varepsilon\hat{\vec{x}}_k^+. \qquad \text{Eq. 133}$$

3.5.2 NRKF Covariance Propagation. The updated (a posteriori) covariance matrix, $P_k^+$, at time=$t_k$, may be propagated to time=$t_{k+1}$, as defined in Table 2.1, $$P_{k+1}^- = \Phi_k P_k^+ \Phi_k^T + Q_k, \qquad \text{Eq. 134}$$

where $Q_k$ was defined in Eq. 117 as:

$$Q_k = \begin{pmatrix} \sigma_{\varepsilon\lambda}^2[1 - e^{-2\Delta t/\tau_{\varepsilon\lambda}}] & 0 & 0 \\ 0 & \sigma_{\varepsilon\phi}^2[1 - e^{-2\Delta t/\tau_{\varepsilon\phi}}] & 0 \\ 0 & 0 & \sigma_{\varepsilon h}^2[1 - e^{-2\Delta t/\tau_{\varepsilon h}}] \end{pmatrix}, \qquad \text{Eq. 135}$$

where $\Delta t = (t_{k+1} - t_k)$.

The NRKF process noise mean-square error parameters in Eq. 135 should be adaptively adjusted according to the position uncertainties of the local hybrid navigation system.

3.6 NRKF Navigation Registration Corrections. The NRKF state vector, $\varepsilon\hat{\vec{x}}_k$, may be used to provide the "corrected" local hybrid navigation position required for the SRKF processing of SROs in section 2 and for output to the host system. The corresponding NRKF covariance matrix, $P_k$, may be used to quantify the residual accuracy of the "corrected" local hybrid navigation position. These residual position corrections are applied to the "uncorrected" local hybrid navigation position data to ensure that the "corrected" local hybrid navigation position has minimal error (minimum variance) with respect to WGS-84. It is important to note that the input to the NRKF may require raw, uncorrected, local hybrid navigation data. That is, the NRKF corrections may not be applied to the local hybrid navigation inputs supplied to the NRKF in section 3.3.1. A distinction exists between "corrected" and "uncorrected" local hybrid navigation position. If this distinction is not maintained, the estimation process of the NRKF may become unstable. In general, if the host implementation of the local hybrid navigation system includes the integration of both GPS and Link 16 navigation, the NRKF estimates of residual position error should tend to be zero, and the covariance should be equivalent to the local hybrid navigation covariance.

3.6.1 NRKF Position Correction. Navigation registration position corrections for latitude ($\delta\lambda$), longitude ($\delta\phi$), and altitude ($\delta h$) to be applied to the "uncorrected" local hybrid navigation latitude ($\hat{\lambda}$) longitude ($\hat{\phi}$), and altitude ($\hat{h}$), respectively, are derived from the NRKF state estimates using the NRKF measurement relationships in Eq. 127 and Eq. 128. The corrections are given by:

$$\begin{pmatrix} \delta\lambda \\ \delta\phi \\ \delta h \end{pmatrix} = H\varepsilon\hat{\vec{x}} = \begin{pmatrix} 1 & 0 & 0 \\ 0 & 1 & 0 \\ 0 & 0 & 1 \end{pmatrix} \begin{pmatrix} \varepsilon\hat{x}_1 \\ \varepsilon\hat{x}_2 \\ \varepsilon\hat{x}_3 \end{pmatrix} = \begin{pmatrix} \varepsilon\hat{\lambda} \\ \varepsilon\hat{\phi} \\ \varepsilon\hat{h} \end{pmatrix}. \qquad \text{Eq. 136}$$

The application of these corrections to the "uncorrected" local hybrid navigation position to produce the "corrected" local hybrid navigation position is given by:

$$\begin{pmatrix} \lambda \\ \phi \\ h \end{pmatrix} = \begin{pmatrix} \hat{\lambda} \\ \hat{\phi} \\ \hat{h} \end{pmatrix} + \begin{pmatrix} \delta\lambda \\ \delta\phi \\ \delta h \end{pmatrix}. \qquad \text{Eq. 137}$$

3.6.2 NRKF Position Error Covariance. The corresponding 3×3 error covariance matrix, representing the position uncertainty in the corrections and thereby in Eq. 138, is given by:

$$E\left\{\begin{pmatrix} \delta\lambda \\ \delta\phi \\ \delta h \end{pmatrix} (\delta\lambda \; \delta\phi \; \delta h)\right\} = HE\{(\varepsilon\hat{\vec{x}})(\varepsilon\hat{\vec{x}})^T\} H^T = P_k, \qquad \text{Eq. 138}$$

where $P_k$ is the NRKF covariance matrix from Eq. 132.

4. INTEGRATED DATA REGISTRATION IMPLEMENTATION. Integrated Data Registration is defined herein as the process of estimating the combined local navigation registration errors and the corresponding sensor registration errors for a local IU sensor aperture. This is accomplished using a Kalman filter that concatenates the model for Sensor Registration (SR) derived in section 2 with the model for Navigation Registration (NR) derived in section 3. This integrated Kalman filter will be denoted as the Data Registration Kalman Filter (DRKF) and is the subject of this section. In addition to the Self-Reported Object (SRO) geodetic measurements derived for the SRKF in section 2 and the navigation registration estimates derived for the NRKF in section 3, the DRKF will incorporate measurements derived from "Common Air Objects (CAOs)" which are actually mutual targets shared by multiple sensor apertures. In fact the mutual targets may be any common object not just "air" objects. A common object is any unambiguous target that is shared between other local sensor apertures or remote units and the local sensor aperture for which the DRKF is estimating its errors. There are three distinct categories for these CAO measurement types that are addressed in this section.

Local-to-Local SR using Common Objects (with common navigation) where multiple sensor apertures within a local IU that utilize the same hybrid navigation system may have some targets in common. If one of these sensor apertures has superior sensor registration performance relative to the other then it may serve as a reference to estimate the SR errors of the inferior sensor aperture. FIG. 4 illustrates the concept for two local apertures viewing the same common target. In this case, both sensors share a common navigation system which permits measurements of a first sensor to be transformed into sensor coordinates of a second sensor to provide reference measurements for aligning the second sensor with the first sensor. With sufficient common objects all sensors within an IU may be aligned to the reference sensor apertures having the highest quality sensor registration.

Local-to-Remote NR & SR using Common Objects (with common navigation) where a local sensor aperture with its local navigation system may have some targets in common with a remote IU. If the remote IU reports superior geodetic accuracy for the common target relative to the local IU sensor aperture, then the remote target position may be used as a reference to estimate the NR and SR errors for the local sensor aperture. FIG. 5, illustrates the concept for this local-to-remote common object registration. In this example, the aircraft navigation registration and sensor registration errors may be estimated using the common object position reported by the ship. With sufficient common objects between a local IU's apertures and the associated common objects received from one or more remote units, the local sensor apertures may be aligned to the best available remote data. In this configuration it is important to note that for multiple sensor apertures the DRKF estimation of the NR errors will be independent for each sensor aperture. These independent estimates of NR errors must be combined to create a composite NR solution. The direct position error measurements for the NRKF provide this function. If the NRKF estimates are considered to have small residual error based on the NRKF covariance, then the estimates may be accepted by the DRKF as known navigation registration position error quantities in its state vector and covariance matrix.

Local-to-Local or Local-to-Remote NR & SR using Common Objects (with independent local navigation sources) where a local IU may have sensor apertures that are geographically separated with independent local navigation systems, e.g., a ground-based system. The local sensor apertures, for example with the ground-based system, will all have separate GPS surveys of their respective positions. A local sensor aperture may have objects in common with another local sensor aperture, or it may share a common target with a remote IU. Both types of common objects may be used for registration. If a local aperture reports superior geodetic accuracy for a target in common with another local aperture then the superior aperture's estimate of the target position may be used as a reference to estimate the NR and SR errors of the other local sensor aperture as illustrated in FIG. 6. This is similar to the case in FIG. 4 except that each local sensor aperture has independent navigation registration errors in contrast to the common navigation system. With sufficient common objects among the local IU apertures, the local sensor apertures may be aligned to the best available local sensor aperture data. If a remote IU reports superior geodetic accuracy for a target that is common to a local sensor aperture, as depicted in FIG. 7, then the remote object may be used as a reference to estimate the local aperture NR and SR errors. The estimation process for both cases is the same. The only distinction is whether the reference information is derived from another local sensor aperture or from a common target reported by a remote IU. In fact, these cases are also equivalent to the Local-to-Remote NR and SR case with the common navigation system illustrated in FIG. 6 with the distinction that the NR errors are unique to the local aperture and therefore do not require integration with other local sensor aperture NR errors in a common NRKF. That is, a separate NRKF and DRKF will exist for each local sensor aperture that has its own independent navigation reference.

Each of these configurations will utilize the DRKF which models fourteen error states based on the concatenation of the SRKF and NRKF models. The measurements are again derived from the fundamental target equation (Eq. 4) which is repeated below as:

$$(\vec{r}_{tr})_e = (\vec{r})_e + T_{le}^T T_{lp} T_{bp}^T \{(\vec{l})_b + T_{bs} T_{\bar{s}s} (\Delta \vec{r}_{tr})_s\}. \quad \text{Eq. 139}$$

Section 4 covers the specific details of the processing for the CAO observations. The SRKF and NRKF measurements and their respective processing are also applicable to the DRKF as they were defined in sections 2 and 3, respectively. All of these measurement types from sections 2, 3, and 4 are integrated within the DRKF implementation. A hierarchy may be implemented to select among all of the measurement types to provide the optimal performance for estimating both the navigation registration and the sensor registration errors modeled in the DRKF.

Table 2.1 provides a detailed summary of the implementation equations for the DRKF. The modeling and initial conditions for the DRKF are described in section 4.1 which are derived from the combination of the descriptions provided for the SRKF in section 2.1 and the NRKF in section3.1. Section 4.2 provides the derivation of the DRKF measurement matrix, $H_k$, for each of the new CAO measurement types described above. All potential measurement update sources for the DRKF may require preprocessing to time align the CAO data with the local sensor aperture measurements. In addition, the target accuracy of the CAO measurements must be determined to be superior to the local aperture accuracy prior to use as a DRKF update. This preprocessing and screening of each potential CAO measurement type is described in section 4.3. Section 4.4 describes the DRKF state and covariance Kalman filter measurement update process for each CAO type, and section 4.5 describes the DRKF state and covariance Kalman filter time propagation process. Finally, section 4.6 defines the DRKF NR & SR correction processes using the estimated state and covariance output from the DRKF.

4.1 DRKF Modeling and Initialization. This section provides a general DRKF system error state model, and the initial error state vector, error covariance, and process noise spectral density matrix, corresponding to the Kalman filter description in Table 2.1. The DRKF error model is the result of concatenating the SRKF and NRKF error models from sections 2.1 and 3.1, respectively.

4.1.1 DRKF Modeling. The DRKF 14-element state vector may comprise the SRKF 11-element state vector combined with the NRKF 3-element state vector which is written as:

$$\varepsilon \vec{x} = \begin{bmatrix} \varepsilon x_1 \\ \varepsilon x_2 \\ \varepsilon x_3 \\ \varepsilon x_4 \\ \varepsilon x_5 \\ \varepsilon x_6 \\ \varepsilon x_7 \\ \varepsilon x_8 \\ \varepsilon x_9 \\ \varepsilon x_{10} \\ \varepsilon x_{11} \\ \cdots \\ \varepsilon x_{12} \\ \varepsilon x_{13} \\ \varepsilon x_{14} \end{bmatrix} = \begin{bmatrix} \varepsilon \rho \\ \varepsilon sf_R \\ \varepsilon \rho_R \\ \varepsilon sf_{B_x} \\ \varepsilon sf_{B_y} \\ \varepsilon \theta_E \\ \varepsilon sf_E \\ \varepsilon \varphi_x \\ \varepsilon \varphi_y \\ \varepsilon \varphi_z \\ \varepsilon t \\ \cdots \\ \varepsilon \lambda \\ \varepsilon \phi \\ \varepsilon h \end{bmatrix} \begin{matrix} \\ \\ \\ \\ \\ \\ \end{matrix} \text{SRKF States} \\ \begin{matrix} \\ \\ \end{matrix} \text{NRKF States} \qquad \text{Eq. 140}$$

The behavior of the SRKF error states are all modeled as biases, and the NRKF error states are all modeled as 1st-order Gauss Markoff processes. Hence, the system function, $\vec{f}(\varepsilon\hat{\vec{x}}(t),t)$ reduces to the linear system matrix, $F(\varepsilon\hat{\vec{x}}(t),t)=F$, given by:

$$F = \begin{pmatrix} F_{SRKF_{(11\times11)}} & \vdots & 0_{(11\times3)} \\ \ldots & \vdots & \ldots \\ 0_{(3\times11)} & \vdots & F_{NRKF_{(3\times3)}} \end{pmatrix} = \quad \text{Eq. 141}$$

$$\begin{pmatrix} 0_{(11\times11)} & \vdots & 0_{(11\times1)} & 0_{(11\times1)} & 0_{(11\times1)} \\ \ldots & \vdots & \ldots & \ldots & \ldots \\ 0_{(1\times11)} & \vdots & -1/\tau_{\varepsilon\lambda} & 0 & 0 \\ 0_{(1\times11)} & \vdots & 0 & -1/\tau_{\varepsilon\phi} & 0 \\ 0_{(1\times11)} & \vdots & 0 & 0 & -1/\tau_{\varepsilon h} \end{pmatrix}.$$

Note that $F_{SRKF}$ is given by Eq. 36, and $F_{NRKF}$ is given by Eq. 110. The State Transition Matrix, $\Phi(t_k,t_{k-1})$, corresponding to the linear system matrix F, is given by:

$$\Phi(\Delta t) = \begin{pmatrix} \Phi_{SRKF_{(11\times11)}} & \vdots & 0_{(11\times3)} \\ \ldots & \vdots & \ldots \\ 0_{(3\times11)} & \vdots & \Phi_{NRKF_{(3\times3)}} \end{pmatrix} = \quad \text{Eq. 142}$$

$$\begin{pmatrix} I_{(11\times11)} & \vdots & 0_{(11\times1)} & 0_{(11\times1)} & 0_{(11\times1)} \\ \ldots & \vdots & \ldots & \ldots & \ldots \\ 0_{(1\times11)} & \vdots & e^{-\Delta t/\tau_{\varepsilon\lambda}} & 0 & 0 \\ 0_{(1\times11)} & \vdots & 0 & e^{-\Delta t/\tau_{\varepsilon\phi}} & 0 \\ 0_{(1\times11)} & \vdots & 0 & 0 & e^{-\Delta t/\tau_{\varepsilon h}} \end{pmatrix},$$

where $\Delta t = t_k - t_{k-1}$.

Note that $\Phi_{SRKF}$ is given by Eq. 37, and $\Phi_{NRKF}$ is given by Eq. 111.

4.1.2 DRKF Initialization. The initial state estimate vector, initial covariance matrix, and process noise spectral density matrix for the DRKF may be initialized according to the SRKF and NRKF criteria specified in sections 2.1.2 and 3.1.2, respectively. The initial state estimate for the DRKF errors may be set to a non-zero vector based upon last known estimates, $\varepsilon\hat{\vec{x}}$, and its corresponding covariance matrix, P, that were saved from prior estimation. However, the default and conservative approach is to initialize the state estimate to zero, $$\varepsilon\hat{\vec{x}}(0) = \begin{pmatrix} \varepsilon\rho(0) \\ \varepsilon sf_R(0) \\ \varepsilon\rho_R(0) \\ \varepsilon sf_{Bx}(0) \\ \varepsilon sf_{By}(0) \\ \varepsilon\theta_E(0) \\ \varepsilon sf_E(0) \\ \varepsilon\varphi_x(0) \\ \varepsilon\varphi_y(0) \\ \varepsilon\varphi_z(0) \\ \varepsilon t(0) \\ \varepsilon\lambda(0) \\ \varepsilon\phi(0) \\ \varepsilon h(0) \end{pmatrix} = \begin{pmatrix} 0 \\ 0 \\ 0 \\ 0 \\ 0 \\ 0 \\ 0 \\ 0 \\ 0 \\ 0 \\ 0 \\ 0 \\ 0 \\ 0 \end{pmatrix}. \quad \text{Eq. 143}$$

The DRKF initial covariance matrix, P(0), will be a diagonal matrix (unless using a previously saved covariance, P) with diagonal elements representing the initial variances for each element of the initial state vector in Eq. 143. These default initial variances (as distinct from a previously saved covariance, P) should be selected to ensure that they in fact bound the potential error in the initial state estimate for the specific sensor type and navigation system. If the navigation error states are initialized to zero in Eq. 143, then a logical choice for P(0) would be to use the position covariance provided by the host hybrid INS.

$$P(0) = \begin{pmatrix} P_{SRKF}(0)_{(11\times11)} & \vdots & 0_{(11\times3)} \\ \ldots & \vdots & \ldots \\ 0_{(3\times11)} & \vdots & P_{NRKF}(0)_{(3\times3)} \end{pmatrix} = \quad \text{Eq. 144}$$

$$\begin{pmatrix} \sigma^2_{\varepsilon\rho} & 0 & 0 & 0 & 0 & 0 & 0 & 0 & 0 & 0 & 0 & 0 & 0 & 0 \\ 0 & \sigma^2_{\varepsilon sf_R} & 0 & 0 & 0 & 0 & 0 & 0 & 0 & 0 & 0 & 0 & 0 & 0 \\ 0 & 0 & \sigma^2_{\varepsilon\rho_R} & 0 & 0 & 0 & 0 & 0 & 0 & 0 & 0 & 0 & 0 & 0 \\ 0 & 0 & 0 & \sigma^2_{\varepsilon sf_{Bx}} & 0 & 0 & 0 & 0 & 0 & 0 & 0 & 0 & 0 & 0 \\ 0 & 0 & 0 & 0 & \sigma^2_{\varepsilon sf_{By}} & 0 & 0 & 0 & 0 & 0 & 0 & 0 & 0 & 0 \\ 0 & 0 & 0 & 0 & 0 & \sigma^2_{\varepsilon\theta_E} & 0 & 0 & 0 & 0 & 0 & 0 & 0 & 0 \\ 0 & 0 & 0 & 0 & 0 & 0 & \sigma^2_{\varepsilon sf_E} & 0 & 0 & 0 & 0 & 0 & 0 & 0 \\ 0 & 0 & 0 & 0 & 0 & 0 & 0 & \sigma^2_{\varepsilon\varphi_x} & 0 & 0 & 0 & 0 & 0 & 0 \\ 0 & 0 & 0 & 0 & 0 & 0 & 0 & 0 & \sigma^2_{\varepsilon\varphi_y} & 0 & 0 & 0 & 0 & 0 \\ 0 & 0 & 0 & 0 & 0 & 0 & 0 & 0 & 0 & \sigma^2_{\varepsilon\varphi_z} & 0 & 0 & 0 & 0 \\ 0 & 0 & 0 & 0 & 0 & 0 & 0 & 0 & 0 & 0 & \sigma^2_{\varepsilon t} & 0 & 0 & 0 \\ 0 & 0 & 0 & 0 & 0 & 0 & 0 & 0 & 0 & 0 & 0 & \sigma^2_{\varepsilon\lambda} & 0 & 0 \\ 0 & 0 & 0 & 0 & 0 & 0 & 0 & 0 & 0 & 0 & 0 & 0 & \sigma^2_{\varepsilon\phi} & 0 \\ 0 & 0 & 0 & 0 & 0 & 0 & 0 & 0 & 0 & 0 & 0 & 0 & 0 & \sigma^2_{\varepsilon h} \end{pmatrix}.$$

Note that $P_{SRKF}(0)$ is given by Eq. 39, and $P_{NRKF}(0)$ is given by Eq. 113. The desired navigation registration initial states for the integrated architecture when the NRKF has established a posteriori estimates following initialization is to use the current NRKF state estimates and covariance to initialize the DRKF NR states and covariance at the beginning of each DRKF cycle. This initialization would reflect the current difference between GPS or Link 16 position and the local hybrid INS position, as well as any other accumulated a priori knowledge of the NR errors. The benefit of using the NRKF for this initialization is that convergence of the DRKF combined error states and covariance would be more rapid having a reduced transient period by using better a priori estimates. Therefore, each new estimation cycle (nominally every 60 seconds) the DRKF should reinitialize its NR states and covariance using the NRKF estimates and covariance at the corresponding time to avoid erroneous estimation of NR errors when using CAO observations.

$$\varepsilon\hat{x} = \begin{bmatrix} \varepsilon\rho(0) \\ \varepsilon sf_R(0) \\ \varepsilon\rho_R(0) \\ \varepsilon sf_{Bx}(0) \\ \varepsilon sf_{By}(0) \\ \varepsilon\theta_E(0) \\ \varepsilon sf_E(0) \\ \varepsilon\varphi_x(0) \\ \varepsilon\varphi_y(0) \\ \varepsilon\varphi_z(0) \\ \varepsilon t(0) \\ \varepsilon\lambda(0) \\ \varepsilon\phi(0) \\ \varepsilon h(0) \end{bmatrix} = \begin{bmatrix} 0 \\ 0 \\ 0 \\ 0 \\ 0 \\ 0 \\ 0 \\ 0 \\ 0 \\ 0 \\ 0 \\ \varepsilon\hat{\lambda} \\ \varepsilon\hat{\phi} \\ \varepsilon\hat{h} \end{bmatrix} \Bigg\} \text{NRKF States}$$

Eq. 145

When the navigation states are initialized each DRKF cycle using NRKF estimates, then the NRKF position error covariance will be used to initialize the navigation registration error covariance elements as defined in Eq. 146.

$$P(0) = \begin{bmatrix} P_{SRKF}(0)_{(11\times11)} & \vdots & (0)_{(11\times3)} \\ \cdots & \vdots & \cdots & \cdots & \cdots \\ & \vdots & P_{NRKF_{11}} & P_{NRKF_{12}} & P_{NRKF_{13}} \\ 0_{(3\times11)} & \vdots & P_{NRKF_{12}} & P_{NRKF_{22}} & P_{NRKF_{23}} \\ & \vdots & P_{NRKF_{13}} & P_{NRKF_{23}} & P_{NRKF_{33}} \end{bmatrix} \Bigg\} \begin{matrix} \text{NRKF} \\ \text{Covariance} \end{matrix}$$

Eq. 146

The process noise spectral density matrix, $Q(t)$, is intended to account for unmodeled errors in the state model defined by the system function, $\vec{f}(\varepsilon\hat{\vec{x}}(t),t)$, or in the case of the SRKF and NRKF, the linear system matrix, $F(\varepsilon\hat{\vec{x}})(t),t)=F$. It is important that $Q(t)$ be non-zero and symmetric positive-definite to ensure that the estimator is both controllable and stable. Furthermore, in the case of the first-order Gauss-Markoff model used in the NRKF, it is also preferable that the spectral density be related to the desired mean square error as $q(t)=2\cdot\sigma^2/\tau$. In general the selection of the spectral density, q, (or mean square error, $\sigma^2$) depends on the specific host sensor type and hybrid INS implementation. Specific values should be selected using experimental results and data from tests for each specific sensor and navigation system. Note that larger values for q imply larger uncertainty in the unmodeled errors. Physically, the process noise spectral density represents the rate of change of unmodeled uncertainty that will integrate into the error covariance over time.

$$Q(t) = Q = \begin{pmatrix} Q_{SRKF(11\times11)} & \vdots & 0_{(11\times3)} \\ \cdots & \vdots & \cdots \\ 0_{(3\times11)} & \vdots & Q_{NRKF(3\times3)} \end{pmatrix} =$$

Eq. 147

$$\begin{pmatrix} q_{\varepsilon\rho} & 0 & 0 & 0 & 0 & 0 & 0 & 0 & 0 & 0 & 0 & 0 & 0 & 0 \\ 0 & q_{\varepsilon sf_R} & 0 & 0 & 0 & 0 & 0 & 0 & 0 & 0 & 0 & 0 & 0 & 0 \\ 0 & 0 & q_{\varepsilon\rho_R} & 0 & 0 & 0 & 0 & 0 & 0 & 0 & 0 & 0 & 0 & 0 \\ 0 & 0 & 0 & q_{\varepsilon sf_{Bx}} & 0 & 0 & 0 & 0 & 0 & 0 & 0 & 0 & 0 & 0 \\ 0 & 0 & 0 & 0 & q_{\varepsilon sf_{By}} & 0 & 0 & 0 & 0 & 0 & 0 & 0 & 0 & 0 \\ 0 & 0 & 0 & 0 & 0 & q_{\varepsilon\theta_E} & 0 & 0 & 0 & 0 & 0 & 0 & 0 & 0 \\ 0 & 0 & 0 & 0 & 0 & 0 & q_{\varepsilon sf_E} & 0 & 0 & 0 & 0 & 0 & 0 & 0 \\ 0 & 0 & 0 & 0 & 0 & 0 & 0 & q_{\varepsilon\varphi_x} & 0 & 0 & 0 & 0 & 0 & 0 \\ 0 & 0 & 0 & 0 & 0 & 0 & 0 & 0 & q_{\varepsilon\varphi_y} & 0 & 0 & 0 & 0 & 0 \\ 0 & 0 & 0 & 0 & 0 & 0 & 0 & 0 & 0 & q_{\varepsilon\varphi_z} & 0 & 0 & 0 & 0 \\ 0 & 0 & 0 & 0 & 0 & 0 & 0 & 0 & 0 & 0 & q_{\varepsilon t} & 0 & 0 & 0 \\ 0 & 0 & 0 & 0 & 0 & 0 & 0 & 0 & 0 & 0 & 0 & q_{\varepsilon\lambda} & 0 & 0 \\ 0 & 0 & 0 & 0 & 0 & 0 & 0 & 0 & 0 & 0 & 0 & 0 & q_{\varepsilon\phi} & 0 \\ 0 & 0 & 0 & 0 & 0 & 0 & 0 & 0 & 0 & 0 & 0 & 0 & 0 & q_{\varepsilon h} \end{pmatrix}.$$

Note that $Q_{SRKF}$ is given by Eq. 40, and $Q_{NRKF}$ is given by Eq. 114 and repeated below as:

$$Q_{NRKF} = \begin{pmatrix} q_{\varepsilon\lambda} & 0 & 0 \\ 0 & q_{\varepsilon\phi} & 0 \\ 0 & 0 & q_{\varepsilon h} \end{pmatrix} = \begin{pmatrix} \frac{2\sigma_{\varepsilon\lambda}^2}{\tau_{\varepsilon\lambda}} & 0 & 0 \\ 0 & \frac{2\sigma_{\varepsilon\phi}^2}{\tau_{\varepsilon\phi}} & 0 \\ 0 & 0 & \frac{2\sigma_{\varepsilon h}^2}{\tau_{\varepsilon h}} \end{pmatrix}. \qquad \text{Eq. 148}$$

The discrete-time representation of the process noise covariance is given by:

$$Q_{k-1} = \int_{t_{k-1}}^{t_k} \Phi(t_k, \alpha) Q(\alpha) \Phi^T(t_k, \alpha) d\alpha \qquad \text{Eq. 149}$$

where $\Phi(t_k, t_{k-1})$ is the state transition matrix

Table 2.1 uses the following first-order approximation for $Q_{k-1} \rightarrow Q(t) \cdot \Delta t$, where $\Delta t = t_k - t_{k-1}$. The first-order Markoff error states have an exact form derived from Eq. 149 that will be used for the process noise covariance. Therefore, each modeled Markoff state will have a process noise covariance given by:

$$q_{k-1} = \frac{q\tau}{2}[1 - e^{-2\Delta t/\tau}] = \sigma^2[1 - e^{-2\Delta t/\tau}]. \qquad \text{Eq. 150}$$

Then the discrete-time Process Noise Covariance Matrix, $Q_{k-1}$, corresponding to the time interval $(t_k, t_{k-1})$, is given as:

$$Q_{k-1} = \begin{pmatrix} Q_{SRKF(11 \times 11)} \cdot \Delta t & \vdots & 0_{(11 \times 1)} & 0_{(11 \times 1)} & 0_{(11 \times 1)} \\ \ldots & \vdots & \ldots & \ldots & \ldots \\ 0_{(1 \times 11)} & \vdots & \sigma_{\varepsilon\lambda}^2[1-e^{-2\Delta t/\tau_{\varepsilon\lambda}}] & 0 & 0 \\ 0_{(1 \times 11)} & \vdots & 0 & \sigma_{\varepsilon\phi}^2[1-e^{-2\Delta t/\tau_{\varepsilon\phi}}] & 0 \\ 0_{(1 \times 11)} & \vdots & 0 & 0 & \sigma_{\varepsilon h}^2[1-e^{-2\Delta t/\tau_{\varepsilon h}}] \end{pmatrix}, \qquad \text{Eq. 151}$$

where $\Delta t = t_k - t_{k-1}$.

4.2 DRKF Measurement Processes. This section covers the details for the processing of the CAO observations. The SRKF measurements and their respective processing are also applicable to the DRKF as they were defined in sections 2.2. All of the measurement types from this section and section 2 shall be integrated within the DRKF implementation. Recall from Table 2.1 that the Kalman filter measurement model is given as:

$$\vec{z} = \vec{h}(\vec{x}). \qquad \text{Eq. 152}$$

Each of the CAO measurement types will be derived from the fundamental target equation given by:

$$(\vec{r}_{tr})_e = (\vec{r})_e + T_{le}^T T_{lp} T_{bp}^T \{(\vec{l})_b + T_{b\tilde{s}} T_{\tilde{s}s}(\Delta \vec{r}_{tr})_s\}, \qquad \text{Eq. 153}$$

and will have its representation in the form of Eq. 152.

4.2.1 Local-to-Local SR Measurements using Common Objects (with common navigation). FIG. 4 illustrates the concept of a local IU with multiple sensor apertures observing common objects and referenced to a single common navigation system. The first sensor provides the reference measurements of the common object which will be used to align the second sensor. The difference in the target location between these two sensors may be written as a measurement of the target error for the second sensor, i.e., $$(\delta \vec{r}_{tr})_e = (\vec{r}_{tr})_e - (\hat{\vec{r}}_{tr})_e. \qquad \text{Eq. 154}$$

Now if each sensor's target equation is substituted into Eq. 154 and both sensors share the same local navigation system, the measurement model for the Kalman filter may be derived as:

$$\vec{z} = \begin{pmatrix} x \\ y \\ z \end{pmatrix}_{\tilde{s}_2} = T_{b\tilde{s}_2}^T \left[ T_{b\tilde{s}_1} T_{\tilde{s}_1 s_1}(\Delta \vec{r}_{tr_1})_{s_1} + (\vec{l}_1)_b - (\vec{l}_2)_b \right], \qquad \text{Eq. 155}$$

and $$\vec{h}(\vec{x}) = \begin{pmatrix} x_s \\ y_s \\ z_s \end{pmatrix}_{\tilde{s}_2} = T_{\tilde{s}_2 s_2}(\Delta \vec{r}_{tr_2})_{s_2}. \qquad \text{Eq. 156}$$

The measurement $\vec{z}$ in Eq. 155 represents the common object measurement from the firsts sensor expressed in the $s_1$-frame transformed into the coordinate frame of the second sensor, denoted as the $s_2$-frame. The common object measurement $\vec{h}(\vec{x})$ from the second sensor in Eq. 156 is expressed in the $s_2$-frame and represents the sensor which will estimate its sensor registration errors. These equations result in the same form as the SRKF SRO measurement model defined by Eq. 42 and Eq. 43. The corresponding Kalman filter input measurement error equation is given by:

$$\delta \vec{z} = \vec{z} - \vec{h}(\hat{\vec{x}}) = H \varepsilon \vec{x}, \qquad \text{Eq. 157}$$

where $$H = \left. \frac{\partial \vec{h}(\vec{x})}{\partial \vec{x}^T} \right|_{\vec{x} = \hat{\vec{x}} \text{ or } \varepsilon \vec{x} = \vec{x} - \hat{\vec{x}}}. \qquad \text{Eq. 158}$$

The measurement vector $\vec{z}$ in Eq. 155 may be expressed in spherical coordinates in the ($\tilde{s}_2$-frame) as:

$$\vec{z} = \begin{pmatrix} \rho \\ \theta_B \\ \theta_E \end{pmatrix}_{\tilde{s}_2}, \qquad \text{Eq. 159}$$

where the relationship to rectangular coordinates is given by:

$$\rho = \sqrt{x^2 + y^2 + z^2}, \qquad \text{Eq. 160}$$

$$\theta_B = \tan^{-1}\left(\frac{y}{x}\right), \text{ and} \qquad \text{Eq. 161}$$

$$\theta_E = \tan^{-1}\left(\frac{z}{\sqrt{x^2 + y^2}}\right). \qquad \text{Eq. 162}$$

The sensor 2 measurement of the target in the ($\tilde{s}_2$-frame) may be directly available from the sensor in spherical coordinates as $(\rho_s \; \theta_{B_s} \; \theta_{E_s})^T$, or may be determined from the rectangular representation using:

$$\rho_s = \sqrt{x_s^2 + y_s^2 + z_s^2}, \qquad \text{Eq. 163}$$

$$\theta_{B_s} = \tan^{-1}\left(\frac{y_s}{x_s}\right), \text{ and} \qquad \text{Eq. 164}$$

$$\theta_{E_s} = \tan^{-1}\left(\frac{z_s}{\sqrt{x_s^2 + y_s^2}}\right). \qquad \text{Eq. 165}$$

Then the Kalman filter error measurement, $\delta\vec{z}$, is simply the difference of the vectors, $$\delta\vec{z} = \begin{pmatrix} \delta\rho \\ \delta\theta_B \\ \delta\theta_E \end{pmatrix}_{\tilde{s}_2} = \begin{pmatrix} \rho \\ \theta_B \\ \theta_E \end{pmatrix}_{\tilde{s}_2} - \begin{pmatrix} \rho_s \\ \theta_{B_s} \\ \theta_{E_s} \end{pmatrix}_{\tilde{s}_2}. \qquad \text{Eq. 166}$$

If a sensor provides a measurement of range-rate, $\dot{\rho}_s$, then the Kalman filter measurement equation, Eq. 166, would be augmented as $$\delta\vec{z} = \begin{pmatrix} \delta\rho \\ \delta\theta_B \\ \delta\theta_E \\ \delta\rho_R \end{pmatrix}_{\tilde{s}} = \begin{pmatrix} \rho \\ \theta_B \\ \theta_E \\ \dot{\rho} \end{pmatrix}_{\tilde{s}} - \begin{pmatrix} \rho_s \\ \theta_{B_s} \\ \theta_{E_s} \\ \dot{\rho}_s \end{pmatrix}_{\tilde{s}}. \qquad \text{Eq. 167}$$

Given the combined NR and SR system state vector as, ($\vec{x}$)=$(\rho \; sf_R \; \dot{\rho} \; sf_{Bx} \; sf_{By} \; \theta_E \; sf_E \; \varphi_x \; \varphi_y \; \varphi_z \; t \; \lambda \; \phi \; h)^T$, the DRKF measurement equation is written in terms of the error states as:

$$\delta\vec{z} = \begin{pmatrix} \delta\rho \\ \delta\theta_B \\ \delta\theta_E \\ \delta\rho_R \end{pmatrix}_{\tilde{s}} = H\varepsilon\vec{x}, \text{ and } \vec{v} = \delta\vec{z} - H\varepsilon\vec{x} \qquad \text{Eq. 168}$$

where $$H=[H_1 \vdots H_2 \vdots H_3 \vdots H_4], \qquad \text{Eq. 169}$$

$$\varepsilon\vec{x}=(\varepsilon\rho\varepsilon sf_R\varepsilon\rho_R\varepsilon sf_{Bx}\varepsilon sf_{By}\varepsilon\theta_E\varepsilon sf_E\varepsilon\varphi_x\varepsilon\varphi_y\varepsilon\varphi_z\varepsilon t\varepsilon\lambda\varepsilon\phi\varepsilon h)^T. \qquad \text{Eq. 170}$$

The H-matrix components are derived using first-order Taylor series expansions with respect to the system state vector. Since the measurement defined in Eq. 155 and Eq. 156 is the same form as the SRKF measurement, the sub-matrices $H_1$, $H_2$, and $H_3$ are identical to the corresponding sub-matrices defined for the SRKF in section 2.2, Eq. 80-Eq. 83. Then, the sub-matrix $H_1$ is a 4×7 matrix written as:

$$H_1 = \begin{pmatrix} 1 & \rho & 0 & 0 & 0 & 0 & 0 \\ 0 & 0 & 0 & C_{\theta_B} & S_{\theta_E} & 0 & 0 \\ 0 & 0 & 0 & 0 & 0 & 1 & \theta_{Ew} \\ 0 & 0 & 1 & 0 & 0 & 0 & 0 \end{pmatrix}. \qquad \text{Eq. 171}$$

The sub-matrix $H_2$ is a 4×3 matrix written as, $$H_2 = \begin{pmatrix} 0 & 0 & 0 \\ -C_{\theta_B}T_{\theta_E} & -S_{\theta_B}T_{\theta_E} & 1 \\ S_{\theta_B} & -C_{\theta_B} & 0 \\ 0 & 0 & 0 \end{pmatrix}, \qquad \text{Eq. 172}$$

where $T_{\theta_E}=\tan(\theta_E)$.

The sub-matrix $H_3$ is a 4×1 matrix corresponding to the time bias error, $\varepsilon t$, and is written as, $$H_3 = \begin{pmatrix} \dot{\rho} \\ \dot{\theta}_B \\ \dot{\theta}_E \\ 0 \end{pmatrix}. \qquad \text{Eq. 173}$$

Since the navigation system is common to both sensors the navigation position errors cancel with one another in Eq. 155 and Eq. 156 resulting in a 4×3 $H_4$ sub-matrix with all zeros, i.e., $$H_4 = \begin{pmatrix} 0 & 0 & 0 \\ 0 & 0 & 0 \\ 0 & 0 & 0 \\ 0 & 0 & 0 \end{pmatrix}. \qquad \text{Eq. 174}$$

Finally the complete DRKF measurement matrix, H for spherical coordinates is the 4×14 matrix:

$$H = \qquad \text{Eq. 175}$$

$$\begin{pmatrix} 1 & \rho & 0 & 0 & 0 & 0 & 0 & 0 & 0 & 0 & \dot{\rho} & 0 & 0 & 0 \\ 0 & 0 & 0 & C_{\theta_B} & S_{\theta_B} & 0 & 0 & -C_{\theta_B}T_{\theta_E} & -S_{\theta_B}T_{\theta_E} & 1 & \dot{\theta}_B & 0 & 0 & 0 \\ 0 & 0 & 0 & 0 & 0 & 1 & \theta_E & S_{\theta_B} & -C_{\theta_B} & 0 & \dot{\theta}_E & 0 & 0 & 0 \\ 0 & 0 & 1 & 0 & 0 & 0 & 0 & 0 & 0 & 0 & 0 & 0 & 0 & 0 \end{pmatrix}.$$

which is equivalent to the SRKF H-matrix in Eq. 83. The DRKF "H-matrix" defines the relationship between the error state vector and the sensor and navigation registration measurements. This mapping relates the DRKF state estimates to sensor registration bias corrections for the second sensor 2 in range ($\delta\rho$), bearing ($\delta\theta_B$), elevation ($\delta\theta_E$), and range-rate ($\delta\rho_R$) which are dependent on the target range ($\rho$), bearing ($\theta_B$), and elevation ($\theta_E$).

4.2.2 Local-to-Remote NR & SR Measurements using Common Objects (with common navigation). FIG. 5 illustrates the concept of a local IU with its sensor aperture referenced to its navigation system observing a target it holds in common with another remote IU. The remote IU target information is communicated to the local IU over an existing data link, e.g., Link 16, and must be associated with a local track. The remote IU's sensor and navigation system provides the reference measurements of the common object which will be used to align the local sensor aperture and local navigation position. The difference in the target location between the local and remote IUs may be written as a measurement of the target error for the local IU, i.e., $$(\delta \vec{r}_{tr_r})_e = (\vec{r}_{tr_r})_e - (\hat{\vec{r}}_{tr_r})_e. \quad \text{Eq. 176}$$

Now if each IU's target equation is substituted into Eq. 176 using the remote data as the reference, the measurement model for the Kalman filter may be derived. The remote IU's estimate of the common target, expressed in earth-centered coordinates is given as:

$$\vec{z} = (\vec{r}_{tr_r})_e = \begin{pmatrix} x_{etr_r} \\ y_{etr_r} \\ z_{etr_r} \end{pmatrix}_e = \begin{pmatrix} (r_{ewtr_r} + h_{tr_r})C_{\lambda_{tr_r}}C_{\phi_{tr_r}} \\ (r_{ewtr_r} + h_{tr_r})C_{\lambda_{tr_r}}S_{\phi_{tr_r}} \\ [(1-e^2)r_{ewtr_r} + h_{tr_r}]S_{\lambda_{tr_r}} \end{pmatrix}_e, \quad \text{Eq. 177}$$

where $(\lambda_{tr_r}, \phi_{tr_r}, h_{tr_r})$ are the geodetic coordinates of the remote IU's estimate of the common target. The remote IU's estimate of the common target may also be determined from the remote IU's estimated position and its sensor measurement of the common target as:

$$\vec{z} = (\vec{r}_{tr_r})_e = \begin{pmatrix} x_{etr_r} \\ y_{etr_r} \\ z_{etr_r} \end{pmatrix}_e = (\vec{r}_r)_e + (\Delta \vec{r}_{tr_r})_e = \quad \text{Eq. 178}$$

$$\begin{pmatrix} (r_{ewr} + h_r)C_{\lambda_r}C_{\phi_r} \\ (r_{ewr} + h_r)C_{\lambda_r}S_{\phi_r} \\ [(1-e^2)r_{ewr} + h_r]S_{\lambda_r} \end{pmatrix}_e + T_{ne_r}^T \begin{pmatrix} \rho_r C_{\theta_{Br}} C_{\theta_{Er}} \\ \rho_r C_{\theta_{Br}} S_{\theta_{Er}} \\ \rho_r S_{\theta_{Er}} \end{pmatrix}_{n_r},$$

where $(\lambda_r, \phi_r, h_r)$ are the geodetic coordinates of the remote IU's position, and $(\rho_r, \theta_{Br}, \theta_{Er})$ are the remote IU's estimate of the common target range, bearing, and elevation relative to the remote IU's local-level $n_r$-frame which is a north-oriented frame at the remote IU's position. Similarly, the local IU's estimate of the associated common target, expressed in earth-centered coordinates is given as:

$$\vec{h}(\vec{x}) = (\vec{r}_{tr}) = \begin{pmatrix} x_{etr} \\ y_{etr} \\ z_{etr} \end{pmatrix}_e \quad \text{Eq. 179}$$

$$= (\vec{r})_e + T_{le}^T T_{lp} T_{bp}^T \{(\vec{l})_b + T_{b\tilde{s}} T_{\tilde{s}s}(\Delta \vec{r}_{tr})_s\}$$

$$= \begin{pmatrix} x_e \\ y_e \\ z_e \end{pmatrix}_e + T_{le}^T T_{lp} T_{bp}^T \left\{ \begin{pmatrix} l_x \\ l_y \\ l_z \end{pmatrix}_b + T_{b\tilde{s}} \begin{pmatrix} x_s \\ y_s \\ z_s \end{pmatrix}_{\tilde{s}} \right\},$$

where $\begin{pmatrix} x_e \\ y_e \\ z_e \end{pmatrix}_e = \begin{pmatrix} (r_{ew} + h)C_{\lambda}C_{\phi} \\ (r_{ew} + h)C_{\lambda}S_{\phi} \\ [(1-e^2)r_{ew} + h]S_{\lambda} \end{pmatrix}_e$, and    Eq. 180

$$\begin{pmatrix} x_s \\ y_s \\ z_s \end{pmatrix}_{\tilde{s}} = \begin{pmatrix} 1 & -\varphi_z & \varphi_y \\ \varphi_z & 1 & -\varphi_x \\ -\varphi_y & \varphi_x & 1 \end{pmatrix} \begin{pmatrix} \rho C_{\theta_B} C_{\theta_E} \\ \rho S_{\theta_B} C_{\theta_E} \\ \rho S_{\theta_E} \end{pmatrix}_{\tilde{s}}.$$

The Kalman filter input measurement error equation is given by $$\delta \vec{z} = \vec{z} - \hat{\vec{h}}(\hat{\vec{x}}) = H\varepsilon \vec{x}, \quad \text{Eq. 181}$$

where $$H = \frac{\partial \vec{h}(\vec{x})}{\partial \vec{x}^T} \bigg|_{\vec{x}=\hat{\vec{x}} \text{ or } \varepsilon \vec{x} = \vec{x} - \hat{\vec{x}}}. \quad \text{Eq. 182}$$

Then the Kalman filter error measurement, $\delta \vec{z}$, is simply the difference of the vectors computed in Eq. 178 and Eq. 179, $$\delta \vec{z} = \begin{pmatrix} \delta x_{etr} \\ \delta y_{etr} \\ \delta z_{etr} \end{pmatrix}_e = \begin{pmatrix} x_{etr_r} \\ y_{etr_r} \\ z_{etr_r} \end{pmatrix}_e - \begin{pmatrix} x_{etr} \\ y_{etr} \\ z_{etr} \end{pmatrix}_e. \quad \text{Eq. 183}$$

Given the combined NR and SR system state vector as, $(\vec{x}) = (\rho \, sf_R \, \dot{\rho} \, sf_{Bx} \, sf_{By} \, \theta_E \, sf_E \, \varphi_x \, \varphi_y \, \varphi_z \, t \, \lambda \, \phi \, h)^T$, the DRKF measurement equation is written in terms of the error states as:

$$\delta \vec{z} = \begin{pmatrix} \delta x_{etr} \\ \delta y_{etr} \\ \delta z_{etr} \end{pmatrix}_e = H\varepsilon \vec{x}, \text{ and } \vec{v} = \delta \vec{z} - H\varepsilon \vec{x} \quad \text{Eq. 184}$$

where $H = [H_1 \vdots H_2 \vdots H_3]$, and    Eq. 185

$\varepsilon \vec{x} = (\varepsilon \rho \varepsilon sf_R \varepsilon \rho_R \varepsilon sf_{Bx} \varepsilon sf_{By} \varepsilon \theta_E \varepsilon sf_E \varepsilon \varphi_x \varepsilon \varphi_y \varepsilon \varphi_z \varepsilon t \varepsilon \lambda \varepsilon \phi \varepsilon h)^T$.    Eq. 186

The sub-matrix components of the H-matrix are derived using Eq. 182 and the relationship for the DRKF input error in Eq. 184. Then using the relationships in Eq. 179 and Eq. 180, the following equation may be written:

$$H\varepsilon \vec{x} = \begin{pmatrix} \delta x_e \\ \delta y_e \\ \delta z_e \end{pmatrix}_e + T_{le}^T T_{lp} T_{bp}^T T_{b\tilde{s}} \begin{pmatrix} \delta x_s \\ \delta y_s \\ \delta z_s \end{pmatrix}_{\tilde{s}}, \quad \text{Eq. 187}$$

where the errors in the lever arm vector between the navigation system and the sensor aperture have been ignored. An expression for the navigation registration position errors was derived in section 1.1, Eq. 12, as:

$$\begin{pmatrix} \delta x_e \\ \delta y_e \\ \delta z_e \end{pmatrix}_e = H_{NR} \begin{pmatrix} \varepsilon \lambda \\ \varepsilon \phi \\ \varepsilon h \end{pmatrix}, \quad \text{Eq. 188}$$

where $$H_{NR} = \begin{pmatrix} -(r_{ew} + h)S_{\lambda}C_{\phi} & -(r_{ew} + h)C_{\lambda}S_{\phi} & C_{\lambda}C_{\phi} \\ -(r_{ew} + h)S_{\lambda}S_{\phi} & (r_{ew} + h)C_{\lambda}C_{\phi} & C_{\lambda}S_{\phi} \\ [(1-e^2)r_{ew} + h]C_{\lambda} & 0 & S_{\lambda} \end{pmatrix}. \quad \text{Eq. 189}$$

An expression for the sensor registration errors was derived in section 1.1, Eq. 8, allowing the following:

$$\begin{pmatrix} \delta x_s \\ \delta y_s \\ \delta z_s \end{pmatrix}_{\bar{s}} = \begin{pmatrix} C_{\theta_B}C_{\theta_E} & -\rho S_{\theta_B}C_{\theta_E} & -\rho C_{\theta_B}S_{\theta_E} \\ S_{\theta_B}C_{\theta_E} & \rho C_{\theta_B}C_{\theta_E} & -\rho S_{\theta_B}S_{\theta_E} \\ S_{\theta_E} & 0 & \rho C_{\theta_E} \end{pmatrix} \begin{pmatrix} \varepsilon\rho \\ \varepsilon\theta_B \\ \varepsilon\theta_E \end{pmatrix} + \begin{pmatrix} 0 & \Delta r_{trzs} & -\Delta r_{trys} \\ -\Delta r_{trzs} & 0 & \Delta r_{trxs} \\ \Delta r_{trys} & -\Delta r_{trxs} & 0 \end{pmatrix} \begin{pmatrix} \varepsilon\varphi_x \\ \varepsilon\varphi_y \\ \varepsilon\varphi_z \end{pmatrix},$$

Eq. 190 where $$\begin{pmatrix} \Delta r_{trxs} \\ \Delta r_{trys} \\ \Delta r_{trzs} \end{pmatrix}_s = \begin{pmatrix} \rho C_{\theta_B}C_{\theta_E} \\ \rho S_{\theta_B}C_{\theta_E} \\ \rho S_{\theta_E} \end{pmatrix}_s.$$

Eq. 191

Recall from Eq. 76-Eq. 78 that the sensor registration measurement error model is given by:

$$\varepsilon\rho_s = \varepsilon\rho + \rho \cdot \varepsilon sf_R,$$

$$\varepsilon\theta_{B_s} = C_{\theta_B} \cdot \varepsilon sf_{Bx} + S_{\theta_B} \cdot \varepsilon sf_{By}, \text{ and}$$

$$\varepsilon\theta_{E_s} = \varepsilon\theta_E + \theta_E \cdot \varepsilon sf_E.$$

Eq. 192

Making these substitutions in Eq. 190 provides an expression for the sensor registration errors in the s-frame given by:

$$\begin{pmatrix} \delta x_s \\ \delta y_s \\ \delta z_s \end{pmatrix}_{\bar{s}} = H_{SR} \begin{pmatrix} \varepsilon\rho \\ \varepsilon sf_R \\ \varepsilon\rho_R \\ \varepsilon sf_{Bx} \\ \varepsilon sf_{By} \\ \varepsilon\theta_E \\ \varepsilon sf_E \\ \varepsilon\varphi_x \\ \varepsilon\varphi_y \\ \varepsilon\varphi_z \end{pmatrix},$$

Eq. 193 where $$H_{SR} = \begin{pmatrix} C_{\theta_B}C_{\theta_E} & \rho C_{\theta_B}C_{\theta_E} & 0 & -\rho S_{\theta_B}C_{\theta_B}C_{\theta_E} & -\rho S_{\theta_B}^2 C_{\theta_E} & -\rho C_{\theta_B}S_{\theta_E} & -\rho C_{\theta_B}S_{\theta_E}\theta_E & 0 & \rho S_{\theta_E} & -\rho S_{\theta_B}C_{\theta_E} \\ S_{\theta_B}C_{\theta_E} & \rho S_{\theta_B}C_{\theta_E} & 0 & \rho C_{\theta_B}^2 C_{\theta_E} & \rho C_{\theta_B}S_{\theta_B}C_{\theta_E} & -\rho S_{\theta_B}S_{\theta_E} & -\rho S_{\theta_B}S_{\theta_E}\theta_E & -\rho S_{\theta_E} & 0 & \rho C_{\theta_B}C_{\theta_E} \\ S_{\theta_E} & \rho S_{\theta_E} & 0 & 0 & 0 & \rho C_{\theta_E} & \rho C_{\theta_E}\theta_E & \rho S_{\theta_B}C_{\theta_E} & -\rho C_{\theta_B}C_{\theta_E} & 0 \end{pmatrix}.$$

Eq. 194

If a Time Registration time bias error is relevant for the sensor measurements, then the differential relationship between the measurement vector, $\delta\vec{z}$, and the time bias error, $\varepsilon t$, must be established. The derivative of the earth-centered target coordinates with respect to time is given by:

$$\frac{d}{dt}(\vec{r}_{tr})_e = \begin{pmatrix} \dot{x}_{etr} \\ \dot{y}_{etr} \\ \dot{z}_{etr} \end{pmatrix}_e.$$

Eq. 195

Then the differential changes in position may be related to differential changes in time as $$dx_{etr} = \dot{x}_{etr} \cdot dt, \quad dy_{etr} = \dot{y}_{etr} \cdot dt, \quad dz_{etr} = \dot{z}_{etr} \cdot dt.$$

Eq. 196

Now, substituting the results from Eq. 188, Eq. 193, and Eq. 196 into Eq. 187 the expressions for the sub-matrices, $H_1$, $H_2$, and $H_3$ of the H-matrix may be obtained. The sub-matrix, $H_1$, is a 3×10 array that relates the DRKF input error measurement to the sensor registration measurement and misalignment errors and is given by $$H_1 = T_{le}^T T_{lp}^T T_{bp}^T T_{bs}^T H_{SR} \approx T_{le}^T T_{bp}^T T_{bs}^T H_{SR}$$

where $$T_{lp} \approx I$$

Eq. 197

The sub-matrix, $H_2$, is a 3×1 array that relates the DRKF input error measurement to the sensor registration time error and is given by $$H_2 = \begin{pmatrix} \dot{x}_{etr} \\ \dot{y}_{etr} \\ \dot{z}_{etr} \end{pmatrix}.$$

Eq. 198

If these derivatives of the position vector are not available, then $H_2$ will be replaced by a zero-vector. The sub-matrix, $H_3$, is a 3×3 array that relates the DRKF input error measurement to the navigation registration position errors and is given by $$H_3 = H_{NR}.$$

Eq. 199

Therefore the complete DRKF measurement matrix, H for the Local-to-Remote CAO observation is the 3×14 matrix:

$$H = (T_{le}^T T_{lp}^T T_{bp}^T T_{bs}^T H_{SR} \vdots H_2 \vdots H_{NR}).$$

Eq. 200

The DRKF "H-matrix" in Eq. 200 defines the relationship between the error state vector and the earth-centered sensor and navigation registration measurements. However, the SRKF "H-matrix" in Eq. 95 provides the mapping that relates the DRKF sensor registration error state estimates to sensor registration bias corrections in range ($\delta\rho$), bearing ($\delta\theta_B$), elevation ($\delta\theta_E$), and range-rate ($\delta\rho_R$) for each sensor aperture which are dependent on the target range ($\rho$), bearing ($\theta_B$), and elevation ($\theta_E$). Similarly, the NRKF identity "H-matrix" in Eq. 136 provides the mapping that relates the DRKF navigation registration error state estimates to navigation registration position corrections in latitude ($\delta\lambda$), longitude ($\delta\phi$), and altitude ($\delta h$) for each sensor aperture. The DRKF may estimate the SR errors for each local aperture using this type of CAO observation. However, it is important to recognize that the NR errors are estimated for a common local navigation system among all the sensor apertures. This may pose a problem for the implementation in that all CAO observations for all of the sensor apertures may contribute to the estimation of the NR errors. Therefore, each DRKF corresponding to a sensor aperture will provide its estimate and covariance for its NR errors to the NRKF as direct position error measurements. In this fashion all DRKF contributions to the estimation of NR errors will be integrated within the NRKF to form the composite navigation registration solution for the common navigation configuration.

4.2.3 Local-to-Local or Local-to-Remote NR & SR Measurements using Common Objects (with independent navigation). FIG. 6 illustrates the concept of a local IU with multiple geographically separated sensor apertures each having independent navigation references observing a common target. The distributed local sensor apertures communicate their target information to a local centralized IU processor for integration. FIG. 7, illustrates the concept of the IU sensor aperture sharing a common target with a remote IU. These configurations are the same except for the source of the reference data representing the common object. The local or remote reference measurements of the common object will be used to align the local sensor aperture and local navigation position. The difference in the target location between the local aperture and the reference may be written as a measurement of the target error for the local aperture, i.e., $$(\delta \vec{r}_{tr})_e = (\vec{r}_{tr})_e - (\hat{\vec{r}}_{tr})_e. \qquad \text{Eq. 201}$$

Now these measurements are completely analogous to the measurements in section 4.2.2 Therefore if each sensor's target equation is substituted into Eq. 201 using the either the local or remote IU data as the reference, the measurement model for the Kalman filter may be derived. The local or remote IU's estimate of the common target, expressed in earth-centered coordinates is given as:

$$\vec{z} = (\vec{r}_{tr_r})_e = \begin{pmatrix} x_{etr_r} \\ y_{etr_r} \\ z_{etr_r} \end{pmatrix}_e = \begin{pmatrix} (r_{ewtr_r} + h_{tr_r})C_{\lambda_{tr_r}}C_{\phi_{tr_r}} \\ (r_{ewtr_r} + h_{tr_r})C_{\lambda_{tr_r}}S_{\phi_{tr_r}} \\ [(1-e^2)r_{ewtr_r} + h_{tr_r}]S_{\lambda_{tr_r}} \end{pmatrix}_e, \qquad \text{Eq. 202}$$

where ($\lambda_{tr_r}$, $\phi_{tr_r}$, $h_{tr_r}$) are the geodetic coordinates of the local or remote IU's estimate of the common target. The local or remote IU's estimate of the common target may also be determined from the IU's estimated position and its sensor measurement of the common target as:

$$\vec{z} = (\vec{r}_{tr_r})_e = \begin{pmatrix} x_{etr_r} \\ y_{etr_r} \\ z_{etr_r} \end{pmatrix}_e = (\vec{r}_r)_e + (\Delta \vec{r}_{tr_r})_e \qquad \text{Eq. 203}$$

$$= \begin{pmatrix} (r_{ewr} + h_r)C_{\lambda_r}C_{\phi_r} \\ (r_{ewr} + h_r)C_{\lambda_r}S_{\phi_r} \\ [(1-e^2)r_{ewr} + h_r]S_{\lambda_r} \end{pmatrix}_e + T_{ne_r}^T \begin{pmatrix} \rho_r C_{\theta_{Br}}C_{\theta_{Er}} \\ \rho_r C_{\theta_{Br}}S_{\theta_{Er}} \\ \rho_r S_{\theta_{Er}} \end{pmatrix}_{n_r},$$

where ($\lambda_r$, $\phi_r$, $h_r$) are the geodetic coordinates of the local or remote IU's position, and ($\rho_r$, $\theta_{Br}$, $\theta_{Er}$) are the local or remote IU's estimate of the common target range, bearing, and elevation relative to the local or remote IU's local-level $n_r$-frame which is a north-oriented frame at the IU's position. Similarly, the local IU's sensor estimate of the associated common target, expressed in earth-centered coordinates, is given as:

$$\vec{h}(\vec{x}) = (\vec{r}_{tr})_e = \begin{pmatrix} x_{etr} \\ y_{etr} \\ z_{etr} \end{pmatrix}_e \qquad \text{Eq. 205}$$

$$= (\vec{r})_e + T_{le}^T T_{lp}^T T_{bp}^T \{(\vec{l})_b + T_{b\bar{s}} T_{\bar{s}s}(\Delta \vec{r}_{tr})_s\}$$

$$= \begin{pmatrix} x_e \\ y_e \\ z_e \end{pmatrix}_e + T_{le}^T T_{lp}^T T_{bp}^T \left\{ \begin{pmatrix} l_x \\ l_y \\ l_z \end{pmatrix}_b + T_{b\bar{s}} \begin{pmatrix} x_s \\ y_s \\ z_s \end{pmatrix}_{\bar{s}} \right\},$$

where $$\begin{pmatrix} x_e \\ y_e \\ z_e \end{pmatrix}_e = \begin{pmatrix} (r_{ew} + h)C_{\lambda}C_{\phi} \\ (r_{ew} + h)C_{\lambda}S_{\phi} \\ [(1-e^2)r_{ew} + h]S_{\lambda} \end{pmatrix}_e, \text{ and} \qquad \text{Eq. 205}$$

$$\begin{pmatrix} x_s \\ y_s \\ z_s \end{pmatrix}_{\bar{s}} = \begin{pmatrix} 1 & -\varphi_z & \varphi_y \\ \varphi_z & 1 & -\varphi_x \\ -\varphi_y & \varphi_x & 1 \end{pmatrix} \begin{pmatrix} \rho C_{\theta_B}C_{\theta_E} \\ \rho S_{\theta_B}C_{\theta_E} \\ \rho S_{\theta_E} \end{pmatrix}_{\bar{s}}.$$

The Kalman filter input measurement error equation is given by:

$$\delta \vec{z} = \vec{z} - \hat{\vec{h}}(\vec{\hat{x}}) = H\varepsilon \vec{x}, \qquad \text{Eq. 206}$$

where $$H = \left. \frac{\partial \vec{h}(\vec{x})}{\partial \vec{x}^T} \right|_{\vec{x} = \vec{\hat{x}} \text{ or } \varepsilon \vec{x} = \vec{x} - \vec{\hat{x}}}. \qquad \text{Eq. 207}$$

Then the Kalman filter error measurement, $\delta \vec{z}$, is simply the difference of the vectors computed in Eq. 203 and Eq. 204, $$\delta \vec{z} = \begin{pmatrix} \delta x_{etr} \\ \delta y_{etr} \\ \delta z_{etr} \end{pmatrix}_e = \begin{pmatrix} x_{etr_r} \\ y_{etr_r} \\ z_{etr_r} \end{pmatrix}_e - \begin{pmatrix} x_{etr} \\ y_{etr} \\ z_{etr} \end{pmatrix}_e. \qquad \text{Eq. 208}$$

Given the combined NR and SR system state vector as, $(\vec{x}) = (\rho \ sf_R \ \dot{\rho} \ sf_{Bx} \ sf_{By} \ \theta_E \ sf_E \ \varphi_x \ \varphi_y \ \varphi_z \ t \ \lambda \ \phi \ h)^T$, the DRKF measurement equation is written in terms of the error states as:

$$\delta \vec{z} = \begin{pmatrix} \delta x_{etr} \\ \delta y_{etr} \\ \delta z_{etr} \end{pmatrix}_e = H\varepsilon \vec{x}, \text{ and } \vec{v} = \delta \vec{z} - H\varepsilon \vec{x} \qquad \text{Eq. 209}$$

where $$H = [H_1 \vdots H_2 \vdots H_3], \text{ and} \quad \text{Eq. 210}$$

$$\vec{\varepsilon x} = (\varepsilon\rho \varepsilon sf_R \varepsilon\rho_R \varepsilon sf_{Bx} \varepsilon sf_{By} \varepsilon\theta_E \varepsilon sf_E \varepsilon\varphi_x \varepsilon\varphi_y \varepsilon\varphi_z \varepsilon t \varepsilon\lambda \varepsilon\phi \varepsilon h)^T. \quad \text{Eq. 211}$$

The sub-matrix components of the H-matrix are derived using Eq. 207 and the relationship for the DRKF input error in Eq. 209. Then the relationships in Eq. 204 and Eq. 207 may be used to write:

$$H\vec{\varepsilon x} = \begin{pmatrix} \delta x_e \\ \delta y_e \\ \delta z_e \end{pmatrix}_e + T_{le}^T T_{lp} T_{bp}^T T_{b\tilde{s}} \begin{pmatrix} \delta x_s \\ \delta y_s \\ \delta z_s \end{pmatrix}_{\tilde{s}}, \quad \text{Eq. 212}$$

where the errors in the lever arm vector between the navigation system and the sensor aperture have been ignored. An expression for the navigation registration position errors was derived in section 1.1, Eq. 12, as $$\begin{pmatrix} \delta x_e \\ \delta y_e \\ \delta z_e \end{pmatrix}_e = H_{NR} \begin{pmatrix} \varepsilon\lambda \\ \varepsilon\phi \\ \varepsilon h \end{pmatrix}, \quad \text{Eq. 213}$$

where $$H_{NR} = \begin{pmatrix} -(r_{ew}+h)S_\lambda C_\phi & -(r_{ew}+h)C_\lambda S_\phi & C_\lambda C_\phi \\ -(r_{ew}+h)S_\lambda S_\phi & (r_{ew}+h)C_\lambda C_\phi & C_\lambda S_\phi \\ [(1-e^2)r_{ew}+h]C_\lambda & 0 & S_\lambda \end{pmatrix}. \quad \text{Eq. 214}$$

An expression for the sensor registration errors was derived in section 1.1, Eq. 8, shown as follows:

$$\begin{pmatrix} \delta x_s \\ \delta y_s \\ \delta z_s \end{pmatrix}_{\tilde{s}} = \begin{pmatrix} C_{\theta_B} C_{\theta_E} & -\rho S_{\theta_B} C_{\theta_E} & -\rho C_{\theta_B} S_{\theta_E} \\ S_{\theta_B} C_{\theta_E} & \rho C_{\theta_B} C_{\theta_E} & -\rho S_{\theta_B} S_{\theta_E} \\ S_{\theta_E} & 0 & \rho C_{\theta_E} \end{pmatrix} \begin{pmatrix} \varepsilon\rho \\ \varepsilon\theta_B \\ \varepsilon\theta_E \end{pmatrix} + \begin{pmatrix} 0 & \Delta r_{trzs} & -\Delta r_{trys} \\ -\Delta r_{trzs} & 0 & \Delta r_{trxs} \\ \Delta r_{trys} & -\Delta r_{trxs} & 0 \end{pmatrix} \begin{pmatrix} \varepsilon\varphi_x \\ \varepsilon\varphi_y \\ \varepsilon\varphi_z \end{pmatrix}, \quad \text{Eq. 215}$$

where $$\begin{pmatrix} \Delta r_{trxs} \\ \Delta r_{trys} \\ \Delta r_{trzs} \end{pmatrix}_s = \begin{pmatrix} \rho C_{\theta_B} C_{\theta_E} \\ \rho S_{\theta_B} C_{\theta_E} \\ \rho S_{\theta_E} \end{pmatrix}_s. \quad \text{Eq. 216}$$

Recall from Eq. 76-Eq. 78 that the sensor registration measurement error model is given by:

$$\varepsilon\rho_s = \varepsilon\rho + \rho \cdot \varepsilon sf_R,$$

$$\varepsilon\theta_{B_s} = C_{\theta_B} \cdot \varepsilon sf_{Bx} + S_{\theta_B} \cdot \varepsilon sf_{By}, \text{ and}$$

$$\varepsilon\theta_{E_s} = \varepsilon\theta_E + \theta_E \cdot \varepsilon sf_E. \quad \text{Eq. 217}$$

Making these substitutions in Eq. 215 provides an expression for the sensor registration errors in the s-frame given by:

$$\begin{pmatrix} \delta x_s \\ \delta y_s \\ \delta z_s \end{pmatrix}_{\tilde{s}} = H_{SR} \begin{pmatrix} \varepsilon\rho \\ \varepsilon sf_R \\ \varepsilon\rho_R \\ \varepsilon sf_{Bx} \\ \varepsilon sf_{By} \\ \varepsilon\theta_E \\ \varepsilon sf_E \\ \varepsilon\varphi_x \\ \varepsilon\varphi_y \\ \varepsilon\varphi_z \end{pmatrix}, \quad \text{Eq. 218}$$

where $$H_{SR} = \begin{pmatrix} C_{\theta_B} C_{\theta_E} & \rho C_{\theta_B} C_{\theta_E} & 0 & -\rho S_{\theta_B} C_{\theta_B} C_{\theta_E} & -\rho S_{\theta_B}^2 C_{\theta_E} & -\rho C_{\theta_B} S_{\theta_E} & -\rho C_{\theta_B} S_{\theta_E} \theta_E & 0 & \rho S_{\theta_E} & -\rho S_{\theta_B} C_{\theta_E} \\ S_{\theta_B} C_{\theta_E} & \rho S_{\theta_B} C_{\theta_E} & 0 & \rho C_{\theta_B}^2 C_{\theta_E} & \rho C_{\theta_B} S_{\theta_B} C_{\theta_E} & -\rho S_{\theta_B} S_{\theta_E} & -\rho S_{\theta_B} S_{\theta_E} \theta_E & -\rho S_{\theta_E} & 0 & \rho C_{\theta_B} C_{\theta_E} \\ S_{\theta_E} & \rho S_{\theta_E} & 0 & 0 & 0 & \rho C_{\theta_E} & \rho C_{\theta_E} \theta_E & \rho S_{\theta_B} C_{\theta_E} & -\rho C_{\theta_B} C_{\theta_E} & 0 \end{pmatrix}. \quad \text{Eq. 219}$$

If a Time Registration time bias error is relevant for the sensor measurements, then the differential relationship between the measurement vector, $\delta\vec{z}$, and the time bias error, $\varepsilon t$, must be established. The derivative of the earth-centered target coordinates with respect to time is given by $$\frac{d}{dt}(\vec{r}_{tr})_e = \begin{pmatrix} \dot{x}_{etr} \\ \dot{y}_{etr} \\ \dot{z}_{etr} \end{pmatrix}_e. \quad \text{Eq. 220}$$

Then the differential changes in position may be related to differential changes in time as $$dx_{etr} = \dot{x}_{etr} \cdot dt, \; dy_{etr} = \dot{y}_{etr} \cdot dt, \; dz_{etr} = \dot{z}_{etr} \cdot dt. \quad \text{Eq. 221}$$

Now, substituting the results from Eq. 213, Eq. 218, and Eq. 221 into Eq. 212 the expressions for the sub-matrices, $H_1$, $H_2$, and $H_3$ of the H-matrix may be obtained. The sub-matrix, $H_1$, is a 3×10 array that relates the DRKF input error measurement to the sensor registration measurement and misalignment errors and is given by:

$$H_1 = T_{le}^T T_{lp} T_{bp}^T T_{bs} H_{SR} \approx T_{le}^T T_{bp}^T T_{bs} H_{SR}$$

where $$T_{lp} \approx I \quad \text{Eq. 222}$$

The sub-matrix, $H_2$, is a 3×1 array that relates the DRKF input error measurement to the sensor registration time error and is given by:

$$H_2 = \begin{pmatrix} \dot{x}_{etr} \\ \dot{y}_{etr} \\ \dot{z}_{etr} \end{pmatrix}.$$

Eq. 223

If these derivatives of the position vector are not available, then $H_2$ will be replaced by a zero-vector. The sub-matrix, $H_3$, is a 3×3 array that relates the DRKF input error measurement to the navigation registration position errors and is given by:

$$H_3 = H_{NR}.$$

Eq. 224

Therefore the complete DRKF measurement matrix, H for either the Local-to-Local or Local-to-Remote CAO observation is the 3×14 matrix $$H = (T_{le}^T T_{lp} T_{bp}^T T_{bs} H_{SR} \vdots H_2 \vdots H_{NR}).$$

Eq. 225

The DRKF "H-matrix" in Eq. 225 defines the relationship between the error state vector and the earth-centered sensor and navigation registration measurements. However, the SRKF "H-matrix" in Eq. 95 provides the mapping that relates the DRKF sensor registration error state estimates to sensor registration bias corrections in range ($\delta\rho$), bearing ($\delta\theta_B$), elevation ($\delta\theta_E$), and range-rate ($\delta\rho_R$) for each sensor aperture which are dependent on the target range ($\rho$), bearing ($\theta_B$), and elevation ($\theta_E$). Similarly, the NRKF identity "H-matrix" in Eq. 136 provides the mapping that relates the DRKF navigation registration error state estimates to navigation registration position corrections in latitude ($\delta\lambda$), longitude ($\delta\phi$), and altitude ($\delta h$) for each sensor aperture. Since each sensor aperture has an independent navigation source in this configuration, the NR estimates are not combined with other sensor aperture estimates as was the case in section 4.2.2. The DRKF state vector and covariance represent the complete NR & SR solution for each local sensor aperture.

4.3 DRKF Measurement Preprocessing and Screening. This section covers the measurement preprocessing associated with the CAO observations described in section 4.2. The SRKF SRO measurement type and its respective processing is also applicable to the DRKF as was defined in section 2. The DRKF 14-state model has been defined to accommodate each sensor aperture, including its associated navigation reference. All of the CAO measurement types described in this section and the geodetic SRO measurements described in section 2 shall be integrated within the DRKF implementation. The interaction between the NRKF and the DRKF, will also be described in section 4.3.2. Specifically, whenever NRKF resets are applied as described in section 3.3.1, there will be a corresponding navigation registration reset that must be applied for each DRKF state vector.

4.3.1 Local-to-Local CAO SR Measurement Preprocessing and Screening (with common navigation). Measurement preprocessing for Local-to-Local CAO SR measurements refers to the extraction, testing, and selection of associated measurements for CAOs available from two local IU sensors to create "Measurement Data Sets" for input to the DRKF for a specific sensor aperture. One of these local sensor CAO measurements will provide the reference measurement for aligning the specific sensor aperture, as illustrated in FIG. 4. This DRKF "Measurement Data Set" includes all of the information required to compute the DRKF error measurement components of Eq. 155 and Eq. 156. These input data are generally asynchronous and require time alignment prior to computing the DRKF measurement. The DRKF will process all measurements within a "DRKF Cycle" and provide the updated estimates and covariance for its sensor aperture at the end of each cycle. Each DRKF measurement update will coincide with the local sensor aperture CAO measurement (the second sensor) time-tag, denoted $t_k$. Each sensor CAO measurement has an associated reference sensor CAO measurement (the first sensor) with time-tags, denoted $t_l$. One step involves the transformation of the reference sensor measurements from its local $s_1$-frame to the local sensor $s_2$-frame which involves the static fixed-body survey sensor transformations and the corresponding lever arms. Another step time-aligns the reference sensor data in the $s_2$-frame with the local sensor aperture CAO measurement times, $\{t_k\}$, using cubic spline interpolation polynomials over the DRKF cycle to produce the range, bearing, elevation, and corresponding estimates of their respective rates at the reference sensor times, $\{t_l\}$, and local sensor aperture times, $\{t_k\}$. Other steps then determine the DRKF error measurements, $\delta\vec{z}_k$, computed according to Eq. 167 at the desired sensor measurement times, $\{t_k\}$. The DRKF may accommodate the general case where multiple CAO sources may be associated with sensor measurements from a sensor aperture over a DRKF Cycle. In addition, multiple local apertures may have associations with any CAO. Therefore, the input data must be sorted according to each sensor aperture, and its corresponding CAOs must be sorted according to each associated reference sensor source.

The following sections describe the specific preprocessing and screening required for these CAO input measurements to the DRKF. It is preferable that all information in Eq. 167 be aligned in time such that any time offsets between sensor data are known with an accuracy of ±2 msec to ensure that time errors associated with the dynamic data are minimal.

4.3.1.1 Local-to-Local CAO SR Measurement-to-Track Association. The DRKF local-to-local CAO SR measurements are intended to align local sensor aperture measurements with measurements from another local reference sensor aperture when these two apertures have particular measurements in common based on an association with a specific local Common Track. The local reference sensor provides a geodetic reference for the alignment of another local sensor, and therefore, the associated local tracks. Implicit in the development of the DRKF estimates is the need to identify, which sensor measurements correspond to which reference sensor measurement reports to ensure unambiguous inputs for the DRKF. Normal correlation processes may be sufficient when geodetic sensor alignment has been achieved. However, prior to this alignment, e.g., after initialization, the correlation process must function in the presence of whatever biases exist in the local sensor measurements. The initial NR and SR sub-covariance matrices should provide the proper measure of uncertainty for the correct correlation required under these conditions, resulting in a more robust process than conventional algorithms which presume alignment has already been achieved. One goal of the correlation process is to provide as many valid CAO associations as possible over a wide range of sensors and sensor accuracies.

In general, each sensor aperture has its own local track filter which associates its local aperture measurements with a local track to form a measurement-to-track association which is identified by a local track number called the "Local Track Number" (LTN). These local aperture measurements are provided to the Common (or Global) Track Management function of the IU where they will then be associated with an existing "Common Track Number" (CTN) for processing as an update in the IU's common track filter which integrates measurements from all of the local sensor apertures. Therefore each sensor aperture's LTN association with a CTN identifies potential local-to-local CAOs between sensor apertures for local-to-local CAO SR measurements.

The primary selection of data is based on developing the correct association of the CAO track identified by its Common Track Number (CTN), with the local sensor aperture measurements identified by their Local Track Number (LTN). In this case, there may be a local reference sensor aperture (the first sensor) with a first sensor aperture ID (SAID) to provide measurements with an association to a CTN denoted by LTN. There may also be another local sensor aperture (the second sensor) with a second sensor aperture ID ($SAID_2$) to provide measurements with an association to the same CTN denoted by $LTN_2$. It is preferable that the common track CTN be correctly associated with both of these sensor aperture measurement LTNs to produce the correct [CTN, $LTN_1$, $LTN_2$] measurement-to-track associations. It is also preferable that these associated measurements from the local sensors share overlapping time-tags. If these associations are uncertain, then the information may not be acceptable for further processing, and should be discarded.

4.3.1.2 Local Sensor CAO SR Measurement Preprocessing and Screening. The "uncorrected" sensor (the second sensor) measurements, expressed in the $s_2$-frame, should be extracted if its sensor Local Track Number ($LTN_2$) has been associated with a reference sensor (the first sensor) Local Track Number ($LTN_1$).

4.3.1.3 Local Reference Sensor CAO SR Measurement Preprocessing and Screening. The "corrected" reference sensor (the first sensor) measurements, expressed in the $s_1$-frame, should be extracted if its sensor Local Track Number ($LTN_1$) has been associated with another local sensor (the second sensor) Local Track Number ($LTN_2$). The reference sensor (the first sensor) measurements are provided at times $\{t_l\}$ and are not assumed to be available at the times $\{t_k\}$ of the local the second sensor measurements.

4.3.1.4 DRKF Local-to-Local CAO SR Measurement Preprocessing and Screening. The processing in this section will address developing the local reference measurement vector, $\vec{z}_k$, and its corresponding uncertainty covariance, $R_{z_k}$, at the local sensor measurement times, $\{t_i\}=\{t_l\}\cup\{t_k\}$. The measurement vector, $\vec{z}_k$, is composed of the local reference sensor (the first sensor) AMRs of the CAO and the corresponding sensor registration corrections for that particular CAO as estimated by its DRKF state vector, $\varepsilon\hat{\vec{x}}_k$, in the $s_1$-frame. The local reference measurements are corrected and then transformed into the local sensor (the second sensor) $s_2$-frame of the sensor aperture for which estimating SR errors is being performed. Then cubic spline interpolation polynomials are used to determine the reference sensor measurement at the local sensor time, $t_k$. These cubic spline polynomials are also used to determine the range-rate, bearing-rate, and elevation-rate of the CAO which used for the time bias estimation and range-rate bias estimation.

4.3.1.5 DRKF Local-to-Local CAO SR Error Measurement Preprocessing and Screening. The Local-to-Local CAO measurement data that was buffered in section 4.3.1.4 may be compared with the corresponding local "Uncorrected" Associated Measurement Reports (AMRs) to create the DRKF error measurement vector, $\delta\vec{z}_k$, at times, $\{t_k\}$, as defined in Eq. 167. The resulting measurements are evaluated to reject any spurious outliers prior to processing as a measurement update in the DRKF.

4.3.2 Local-to-Remote CAO NR & SR Measurement Preprocessing and Screening (with common navigation). Measurement preprocessing for Local-to-Remote CAO NR & SR measurements refers to the extraction, testing, and selection of associated measurements for CAOs available between a local IU sensor and a remote IU to create "Measurement Data Sets" for input to the DRKF for a specific sensor aperture. The remote CAO measurement is typically derived from the remote IU's navigation and sensor systems and will provide the reference measurement for aligning the specific local sensor aperture, as illustrated in FIG. 5. This DRKF "Measurement Data Set" includes all of the information required to compute the DRKF error measurement components of Eq. 178 and Eq. 180. These input data are generally asynchronous and require time alignment prior to computing the DRKF measurement. The DRKF will process all measurements within a "DRKF Cycle" and provide the updated estimates and covariance for its sensor aperture at the end of each cycle. Each DRKF measurement update will coincide with the local sensor aperture CAO measurement time-tag, denoted $t_k$. Each local CAO measurement has an associated remote reference CAO measurement with time-tags, denoted $t_l$. One step involves the initialization of the DRKF NR states and covariance at the beginning of each DRKF cycle [T0, T1] (nominally every 60 seconds) using the latest NRKF state estimates and covariance as mentioned in section 4.1.2. This ensures that the DRKF has the latest a priori estimates of the NR states and covariance which enhances the convergence and stability of the SR estimation. Another step time-aligns the remote CAO data in the e-frame with the local sensor aperture CAO measurement times, $\{t_k\}$, using cubic spline interpolation polynomials over the DRKF cycle to produce the Earth-Centered Earth-Fixed (ECEF) X,Y,Z position measurement vector $z_k$, at times, $\{t_k\}$, and corresponding estimates of their respective rates. The third step time-aligns the "Uncorrected" local hybrid navigation data with the local sensor CAO times, $\{t_k\}$. Another step will compute the earth-centered position for the local CAO measurement, $h_k(x_k)$, at times, $\{t_k\}$, using the corresponding local navigation position and sensor CAO AMR data. Another step will determine the DRKF error measurements, $\delta\vec{z}_k$, computed according to Eq. 184 at the desired local sensor CAO measurement times, $\{t_k\}$. The DRKF must accommodate the general case where multiple CAO sources may be associated with sensor measurements from a sensor aperture over a DRKF Cycle. In addition, multiple local apertures may have associations with any remote CAO. Therefore, the input data must be sorted according to each sensor aperture, and its corresponding remote CAOs must be sorted according to each associated remote source. The following sections describe the specific preprocessing and screening required for these remote CAO input measurements to the DRKF. It is preferable that all information in Eq. 183 be aligned in time such that any time offsets between the local sensor data and the remote CAO data are known with an accuracy of ±2 msec to ensure that time errors associated with the dynamic data are minimal.

4.3.2.1 Local-to-Remote CAO NR & SR Measurement-to-Track Association. The DRKF local-to-remote CAO measurements are intended to align local sensor aperture measurements with measurements or tracks from a remote reference IU when the local and remote IUs have particular measurements in common based on an association with a specific local Common Track. The remote reference IU provides a WGS-84 estimate of a CAO target for the alignment of a local sensor, and therefore, the associated local tracks. Implicit in the development of the DRKF estimates is the need to identify, which local sensor measurements correspond to which remote track or measurement reports to ensure that the potential CAO is unambiguous as an input for the DRKF. Normal correlation processes may be sufficient when local geodetic sensor alignment has been achieved. However, prior to this alignment, e.g., after initialization, the correlation process must function in the presence of whatever biases exist in the local sensor measurements. The initial NR and SR sub-covariance matrices should provide the proper measure of uncertainty for the correct correlation required under these conditions, resulting in a more robust process than conventional algorithms which presume alignment has already been achieved. The goal of the correlation process is to provide as many valid CAO associations as possible over a wide range of remote IUs and local sensors and sensor accuracies. In general, each sensor aperture has its own local track filter which associates its local aperture measurements with a local track to form a measurement-to-track association which is identified by a local track number called the "Local Track Number" (LTN). These local aperture measurements are provided to the Common (or Global) Track Management function of the IU where they will then be associated with an existing "Common Track Number" (CTN) for processing as an update in the IU's common track filter which integrates measurements from all of the local sensor apertures. Also, the Common Track Management function must perform measurement-to-track or track-to-track association for all remote data received by the IU. Then the remote measurement or track with its "Remote Track Number" (RTN) may have its association with the CTN confirmed. Hence each local sensor aperture's LTN association with a CTN identifies potential local-to-remote CAOs using the remote RTN association with a CTN resulting in potential local-to-remote CAO NR & SR measurements. The primary selection of data is based on developing the correct association of the CAO track identified by its Common Track Number (CTN), with the local sensor aperture measurements identified by their Local Track Number (LTN) and the remote data identified by their Remote Track Number (RTN). In the local-to-remote CAO case, a remote reference IU may be included to provide measurements or tracks with an association to an RTN/CTN pairing at the local IU. A local sensor aperture may also be included to provide measurements with an association of its LTN to the same CTN. It is preferable that the common track CTN be correctly associated with the local sensor aperture measurement LTN and the remote IU's RTN in order to produce the correct [CTN, LTN, RTN] measurement-to-track associations. It is also preferable that these associated measurements from the local sensors share overlapping time-tags. If these conditions are uncertain, then the information may not be acceptable for further processing, and should be discarded.

4.3.2.2 Local Sensor CAO Measurement Preprocessing and Screening. The "uncorrected" sensor Associated Measurement Reports (AMRs), expressed in the s-frame, should be extracted if the report's Local Track Number (LTN) has been associated with a received CAO Remote Track Number (RTN) where they both can be associated with the same Common Track Number (CTN).

4.3.2.3 Remote CAO Measurement Preprocessing and Screening. Each received CAO message that has been associated with local sensor AMRs should have its data extracted and processed to determine if the CAO data is acceptable, then the CAO data with times, $\{t_l\}$, must be time aligned with the sensor AMR times, $\{t_k\}$, using cubic spline interpolation polynomials. Then the remote CAO measurement, $\vec{z}_k$, and its corresponding measurement noise covariance, $R_{z_k}$, may be determined for the corresponding local sensor AMR.

4.3.2.4 Navigation Preprocessing and Screening. The IU local hybrid navigation data at times, $\{t_n\}$, shall be selected as close as possible to the local sensor AMR times, $\{t_k\}$, and the data extracted and processed as specified below. This will result in local navigation data aligned with the local CAO AMR data of the previous section 4.3.2.2.

4.3.2.5 DRKF CAO NR & SR Error Measurement Preprocessing and Screening. The processing in sections 4.3.2.2 and 4.3.2.4 has provided the local CAO AMR and local hybrid navigation data at the sensor AMR times, $\{t_k\}$. The processing included in this section will address developing the local CAO geodetic predicted measurement vector, $\vec{h}_k(\hat{\vec{x}}_k)$, its corresponding measurement noise covariance, $R_{h(x)_k}$, the DRKF input error measurement, $\delta\vec{z}_k$, and its measurement noise covariance, $R_k$, at times, $\{t_k\}$, as defined in Eq. 181. A Geometric Dilution of Precision (GDOP) metric will also be determined to quantify the expected observability within the sensor aperture's FOV based on the available local-to-remote CAO measurements.

4.3.3 Local-to-Local or Local-to-Remote CAO NR & SR Measurement Preprocessing and Screening (with independent navigation). Measurement preprocessing for either Local-to-Local or Local-to-Remote CAO NR & SR measurements refers to the extraction, testing, and selection of associated measurements for CAOs available between two local IU sensors or between a local IU sensor and a remote IU to create "Measurement Data Sets" for input to the DRKF for a specific sensor aperture. The local or remote reference CAO measurement is typically derived from the either the local or remote IU's navigation and sensor systems and will provide the measurement for aligning the specific local sensor aperture. This DRKF "Measurement Data Set" includes all of the information required to compute the DRKF error measurement components of Eq. 202 and Eq. 204. These input data are generally asynchronous and require time alignment prior to computing the DRKF measurement. The DRKF may process all measurements within a "DRKF Cycle" and provide the updated estimates and covariance for its sensor aperture at the end of each cycle. Each DRKF measurement update will coincide with the local sensor aperture CAO measurement time-tag, denoted $t_k$. Each local CAO measurement has an associated local or remote reference CAO measurement with time-tags, denoted $t_l$. One step involves the initialization of the DRKF NR states and covariance at the beginning of each DRKF cycle [T0, T1] (nominally every 60 seconds) using the latest NRKF state estimates and covariance as mentioned in section 4.1.2. This ensures that the DRKF has the latest a priori estimates of the NR states and covariance which enhances the convergence and stability of the SR estimation. Another step time-aligns the local or remote CAO reference data in the e-frame with the local sensor aperture CAO measurement times, $\{t_k\}$, using cubic spline interpolation polynomials over the DRKF cycle to produce the Earth-Centered Earth-Fixed (ECEF) X,Y,Z position measurement vector $z_k$, at times, $\{t_k\}$, and corresponding estimates of their respective rates. Another step time-aligns the "Uncorrected" local hybrid navigation data with the local sensor CAO times, $\{t_k\}$. Another will compute the earth-centered position for the local CAO measurement, $h_k(x_k)$, at times, $\{t_k\}$, using the corresponding local navigation position and sensor CAO AMR data. Another step will determine the DRKF error measurements, $\delta \vec{z}_k$, computed according to Eq. 208 at the desired local sensor CAO measurement times, $\{t_k\}$. The DRKF must accommodate the general case where multiple CAO sources may be associated with sensor measurements from a sensor aperture over a DRKF Cycle. In addition, multiple local apertures may have associations with any local or remote reference CAO. Therefore, the input data must be sorted according to each sensor aperture, and its corresponding local or remote reference CAOs must be sorted according to each associated local or remote source. Since each local sensor aperture has an independent navigation source in this configuration, the NR estimates are unique for each aperture and therefore are not combined with other local sensor aperture estimates as was the case in section 4.2.2. The DRKF state vector and covariance represent the complete NR & SR solution for each local sensor aperture. Also, the NRKF is uniquely paired with its own DRKF. The specific preprocessing and screening required for these local or remote CAO input measurements to the DRKF is identical to the Local-to-Remote CAO preprocessing and screening described in sections 4.3.2.1 through 4.3.2.5. The only difference is that the source of the reference CAO measurement may be from another local sensor having its own unique local navigation data which is completely analogous to a remote CAO. Therefore, sections 4.3.2.1 through 4.3.2.5 may be referred to for describing the details of the preprocessing and screening associated with the Local-to-Local or Local-to-Remote CAO NR & SR measurements for this case.

4.4 DRKF Measurement Update. The DRKF Measurement Update process is based on a recursive set of equations for both the error state vector and the corresponding covariance matrix (see Table 2.1). The Kalman filter measurement update is designed to provide an unbiased, minimum variance, consistent estimate and error covariance using available measurements based on linear (or nonlinear) combinations of the error state vector. The following subsections will provide the DRKF measurement update process for each CAO measurement type based on the observations processed in section 4.3. The SRKF measurements and their respective processing are also applicable to the DRKF as they were defined in section 2. The DRKF 14-state model has been defined to accommodate each sensor aperture, including its associated navigation reference. All of the CAO measurement types from this section and the geodetic SRO measurements from sections 2 shall be integrated within the measurement update process of the DRKF implementation. The DRKF state vector, $\varepsilon \vec{\hat{x}}$, is a 14-element vector written as:

$$\varepsilon \vec{\hat{x}} = \begin{pmatrix} \varepsilon \hat{x}_1 \\ \varepsilon \hat{x}_2 \\ \varepsilon \hat{x}_3 \\ \varepsilon \hat{x}_4 \\ \varepsilon \hat{x}_5 \\ \varepsilon \hat{x}_6 \\ \varepsilon \hat{x}_7 \\ \varepsilon \hat{x}_8 \\ \varepsilon \hat{x}_9 \\ \varepsilon \hat{x}_{10} \\ \varepsilon \hat{x}_{11} \\ \varepsilon \hat{x}_{12} \\ \varepsilon \hat{x}_{13} \\ \varepsilon \hat{x}_{14} \end{pmatrix} = \begin{pmatrix} \varepsilon \hat{\rho} \\ \varepsilon \hat{s} f_R \\ \varepsilon \hat{\rho}_R \\ \varepsilon \hat{s} f_{Bx} \\ \varepsilon \hat{s} f_{By} \\ \varepsilon \hat{\theta}_E \\ \varepsilon \hat{s} f_E \\ \varepsilon \hat{\varphi}_x \\ \varepsilon \hat{\varphi}_y \\ \varepsilon \hat{\varphi}_z \\ \varepsilon \hat{i} \\ \varepsilon \hat{\lambda} \\ \varepsilon \hat{\phi} \\ \varepsilon \hat{h} \end{pmatrix}. \quad \text{Eq. 226}$$

At the beginning of each DRKF filter cycle, the NR error states are reinitialized using the latest NRKF state estimates. The DRKF error covariance matrix, P, is a 14×14 positive definite symmetric matrix with its NR elements reinitialized using the latest NRKF covariance at the beginning of each DRKF filter cycle. It is also necessary to initialize (or clear) all of the DRKF cross-covariance terms between the NR and SR states to zero at the beginning of each DRKF cycle. This allows the latest NR estimates and covariance to be used as the a priori NR states and covariance for the current DRKF cycle and avoids observability problems in separating NR and SR errors in the DRKF estimation process.

4.4.1 DRKF Local-to-Local CAO SR Measurement Update. The DRKF measurement update for the Local-to-Local CAO SR observation is analogous to the SRKF SRO measurement providing updates only to the SR states; the NR states are not observable with this measurement type.

4.4.1.1 DRKF Local-to-Local CAO SR Measurement Innovation. The Kalman filter measurement innovation, at time=$t_k$, is given as:

$$\vec{v}_k = \begin{pmatrix} v_1 \\ v_2 \\ v_3 \\ v_4 \end{pmatrix}_k = \delta \vec{z}_k - H_k \varepsilon \vec{\hat{x}}_k^-. \quad \text{Eq. 227}$$

The DRKF error measurement was determined in section 4.3.1.5 as:

$$\delta \vec{z}_k = \begin{pmatrix} \delta \rho \\ \delta \theta_B \\ \delta \theta_E \\ \delta \rho_R \end{pmatrix}_k = \begin{pmatrix} \rho \\ \theta_B \\ \theta_E \\ \dot{\rho} \end{pmatrix}_k - \begin{pmatrix} \rho_s \\ \theta_{B_s} \\ \theta_{E_s} \\ \dot{\rho}_s \end{pmatrix}_k, \quad \text{Eq. 228}$$

where all data is coordinatized in the $\tilde{s}_2$-frame, and k denotes the sensor AMR measurement time, $t_k$.

The DRKF predicted (a priori) error measurement is based on the H-matrix from and the current error state estimate, at time=$t_k$, given by:

Eq. 229

$$H_k \hat{\varepsilon \vec{x}}_k^- = \begin{pmatrix} 1 & \rho & 0 & 0 & 0 & 0 & 0 & 0 & 0 & \dot{\rho} & 0 & 0 & 0 \\ 0 & 0 & 0 & C_{\theta_S} & S_{\theta_S} & 0 & 0 & -C_{\theta_E}T_{\theta_E} & -S_{\theta_S}T_{\theta_E} & 1 & \dot{\theta}_E & 0 & 0 & 0 \\ 0 & 0 & 0 & 0 & 0 & 1 & \theta_E & S_{\theta_S} & -C_{\theta_S} & 0 & \dot{\theta}_E & 0 & 0 & 0 \\ 0 & 0 & 1 & 0 & 0 & 0 & 0 & 0 & 0 & 0 & 0 & 0 & 0 \end{pmatrix}_k \begin{pmatrix} \varepsilon \hat{x}_1^- \\ \varepsilon \hat{x}_2^- \\ \varepsilon \hat{x}_3^- \\ \varepsilon \hat{x}_4^- \\ \varepsilon \hat{x}_5^- \\ \varepsilon \hat{x}_6^- \\ \varepsilon \hat{x}_7^- \\ \varepsilon \hat{x}_8^- \\ \varepsilon \hat{x}_9^- \\ \varepsilon \hat{x}_{10}^- \\ \varepsilon \hat{x}_{11}^- \\ \varepsilon \hat{x}_{12}^- \\ \varepsilon \hat{x}_{13}^- \\ \varepsilon \hat{x}_{14}^- \end{pmatrix}_k$$

The the first sensor parameters, transformed into the $s_2$-frame, are used to populate the H-matrix rather than the second sensor AMR values since they are considered to be the reference data. The rate terms in the $11^{th}$ column are available from the cubic spline polynomials used for interpolating the first sensor reference data.

4.4.1.2 DRKF Local-to-Local CAO SR Measurement Innovation Testing. It is preferable to ensure that the DRKF estimation process not be perturbed by erroneous measurements. Accepting and processing measurement outliers would have a significant impact on sensor registration errors, and thus have an adverse effect on the Track Manager functions. In order to guard against poor measurements, and to monitor DRKF performance for consistency, each measurement innovation component in $\vec{\upsilon}_k$ from Eq. 227 may be compared with its corresponding diagonal element in the measurement innovation covariance, denoted $P_\upsilon$. The Kalman filter measurement innovation in Eq. 227 has a measurement innovation covariance matrix, at time=$t_k$, given by:

$$P_\upsilon = \begin{pmatrix} P_{\upsilon 11} & P_{\upsilon 12} & P_{\upsilon 13} & P_{\upsilon 14} \\ P_{\upsilon 12} & P_{\upsilon 22} & P_{\upsilon 23} & P_{\upsilon 24} \\ P_{\upsilon 13} & P_{\upsilon 23} & P_{\upsilon 33} & P_{\upsilon 34} \\ P_{\upsilon 14} & P_{\upsilon 24} & P_{\upsilon 34} & P_{\upsilon 44} \end{pmatrix} = H_k P_k^- H_k^T + R_k, \qquad \text{Eq. 230}$$

where, $H_k$, is the same matrix as in Eq. 229, and the measurement noise matrix, $R_k$, corresponds to the error measurement $\delta \vec{z}_k$, as specified in section 4.3.1.5.

4.4.1.3 DRKF Local-to-Local CAO SR Kalman Gain. The Kalman filter gain matrix, $K_k$, at time=$t_k$, for the Local-to-Local CAO SR measurement update is a 14×4 matrix given by:

$$K_k = P_k^- H_k^T [P_\upsilon]^{-1},$$

where $$P_\upsilon = H_k P_k^- H_k^T + R_k. \qquad \text{Eq. 231}$$

This Kalman gain matrix is associated with the 4×1 measurement innovation vector in Eq. 227.

4.4.1.4 DRKF Local-to-Local CAO SR State Update. The DRKF state vector, $\varepsilon \hat{\vec{x}}_k^-$, at time=$t_k$, shall be updated, as defined in Table 2.1, for the Local-to-Local CAO SR measurement using the measurement innovation and Kalman gain given by:

$$\varepsilon \hat{\vec{x}}_k^+ = \varepsilon \hat{\vec{x}}_k^- + K_k [\vec{\upsilon}_k],$$

where $$\vec{\upsilon}_k = \delta \vec{z}_k - H_k \varepsilon \hat{\vec{x}}_k^-. \qquad \text{Eq. 232}$$

4.4.1.5 DRKF Local-to-Local CAO SR Covariance Update. The DRKF 14×14 covariance matrix, $P_k^-$, at time=$t_k$, shall be updated, as defined in Table 2.1, for the Local-to-Local CAO SR measurement using the Kalman gain as:

$$P_k^+ = [I - K_k H_k] P_k^- [I - K_k H_k]^T + K_k R_k K_k^T. \qquad \text{Eq. 233}$$

4.4.1.7 DRKF Local-to-Local CAO SR Performance Monitoring. The health of the DRKF depends on the integrity of various inputs, and must be monitored to ensure proper performance in an operational environment.

4.4.2 DRKF Local-to-Remote CAO NR & SR Measurement Update (with common navigation). The DRKF measurement update for the Local-to-Remote CAO NR & SR observation is computed in the Earth-Centered Earth-Fixed coordinate e-frame providing updates to both the NR and the SR states. When the NRKF provides good a priori estimates of the NR states and covariance, these CAO updates are allocated primarily to the DRKF SR states and covariance.

4.4.2.1 DRKF Local-to-Remote CAO NR & SR Measurement Innovation. The Kalman filter measurement innovation, at time=$t_k$, is given by the linear Eq. 184 as:

$$\vec{\upsilon}_k = \begin{pmatrix} \upsilon_1 \\ \upsilon_2 \\ \upsilon_3 \end{pmatrix}_k = \delta \vec{z}_k - H_k \varepsilon \hat{\vec{x}}_k^-. \qquad \text{Eq. 234}$$

The DRKF error measurement was determined in section 4.3.2.5 as:

$$\delta \vec{z}_k = \begin{pmatrix} \delta x_{etr} \\ \delta y_{etr} \\ \delta z_{etr} \end{pmatrix}_k = \begin{pmatrix} x_{etr_r} \\ y_{etr_r} \\ z_{etr_r} \end{pmatrix}_k - \begin{pmatrix} x_{etr} \\ y_{etr} \\ z_{etr} \end{pmatrix}_k, \qquad \text{Eq. 235}$$

where all data is coordinatized in the e-frame, and k denotes the local sensor AMR measurement time, $t_k$.

4.4.2.2 DRKF Local-to-Remote CAO NR & SR Measurement Innovation Testing. It is preferable to ensure that the DRKF estimation process not be perturbed by erroneous measurements. Accepting and processing measurement outliers would have a significant impact on the estimation of the navigation and sensor registration errors, and thus have an adverse effect on the Track Manager functions. In order to guard against poor measurements, and to monitor DRKF performance for consistency, each measurement innovation component in $\vec{v}_k$ shall be compared with its corresponding diagonal element in the measurement innovation covariance, denoted $P_v$. The Kalman filter measurement innovation has a measurement innovation covariance matrix, at time=$t_k$, given by:

$$P_v = \begin{pmatrix} P_{v11} & P_{v12} & P_{v13} \\ P_{v12} & P_{v22} & P_{v23} \\ P_{v13} & P_{v23} & P_{v33} \end{pmatrix} = \overline{P} + R_k, \qquad \text{Eq. 236}$$

where $$\overline{P} = \begin{pmatrix} \overline{P}_{11} & \overline{P}_{12} & \overline{P}_{13} \\ \overline{P}_{12} & \overline{P}_{22} & \overline{P}_{23} \\ \overline{P}_{13} & \overline{P}_{23} & \overline{P}_{33} \end{pmatrix} = H_k P_k^- H_k^T.$$

The predicted DRKF a priori covariance, $\overline{P}$, for the candidate CAO measurement with time-tag, $t_k$, is computed as an intermediate covariance which is a function of the local sensor target range, $\rho_s$, bearing, $\theta_{Bs}$, elevation, $\theta_{Es}$, the local IU position, $\lambda$, $\phi$ and $h_e$, and the X-axis rate, $\dot{x}_{etr_r}$, Y-axis rate, $\dot{y}_{etr_r}$, and Z-axis rate, $\dot{z}_{etr_r}$ specified by the H-matrix, $H_k$, and the current DRKF covariance matrix, $P_k$. The measurement noise matrix, $R_k$, corresponds to the error measurement $\delta \vec{z}_k$, which was determined in section 4.3.2.5.

4.4.2.3 DRKF Local-to-Remote CAO NR & SR Kalman Gain. The Kalman filter gain matrix, $K_k$, at time=$t_k$, for the Local-to-Remote CAO NR & SR measurement update is a 14×3 matrix given by $$K_k = P_k^- H_k^T [P_v]^{-1},$$

where $$P_v = H_k P_k^- H_k^T + R_k. \qquad \text{Eq. 237}$$

This Kalman gain matrix is associated with the 3×1 measurement innovation vector.

4.4.2.4 DRKF Local-to-Remote CAO NR & SR State Update. The DRKF state vector, $\varepsilon \hat{\vec{x}}_k^-$, at time=$t_k$, shall be updated, as defined in Table 2.1, for the Local-to-Remote CAO NR & SR measurement using the measurement innovation and Kalman gain given by $$\varepsilon \hat{\vec{x}}_k^+ = \varepsilon \hat{\vec{x}}_k^- + K_k [\vec{v}_k],$$

where $$\vec{v}_k = \delta \vec{z}_k - H_k \varepsilon \hat{\vec{x}}_k^-. \qquad \text{Eq. 238}$$

4.4.2.5. DRKF Local-to-Remote CAO NR & SR Covariance Update. The DRKF 14×14 covariance matrix, $P_k^-$, at time=$t_k$, shall be updated, as defined in Table 2.1, for the Local-to-Remote CAO NR & SR measurement using the Kalman gain computed as $$P_k^+ = [I - K_k H_k] P_k^- [I - K_k H_k]^T + K_k R_k K_k^T. \qquad \text{Eq. 239}$$

4.4.2.7 DRKF Local-to-Remote CAO NR & SR Performance Monitoring. The health of the DRKF depends on the integrity of various inputs, and must be monitored to ensure proper performance in an operational environment.

4.4.3 DRKF Local-to-Local or Local-to-Remote CAO NR & SR Measurement Update (with independent navigation). The DRKF measurement update for the Local-to-Local or Local-to-Remote CAO NR & SR observation is computed in the Earth-Centered Earth-Fixed coordinate e-frame providing updates to both the NR and the SR states. In this case the NRKF has estimates of the NR states for the local sensor aperture that are exclusively associated with its independent navigation system. When the NRKF provides good a priori estimates of the NR states and covariance, these CAO updates are allocated primarily to the DRKF SR states and covariance. Since each local sensor aperture has an independent navigation source in this configuration, the NR estimates are unique for each aperture and therefore are not combined with other local sensor aperture estimates as was the case in section 4.2.2. The DRKF state vector and covariance represent the complete NR & SR solution for each local sensor aperture. Also, the NRKF is uniquely paired with its own DRKF. The specific measurement update processing required for these local or remote CAO input measurements to the DRKF is identical to the Local-to-Remote CAO measurement update processing described in sections 4.4.2.1 through 4.4.2.7. The only difference is that the source of the reference CAO measurement may be from another local sensor having its own unique local navigation data which is completely analogous to a remote CAO. Therefore, sections 4.4.2.1 through 4.4.2.7 may be referred to for describing the details of the measurement update processing associated with the Local-to-Local or Local-to-Remote CAO NR & SR measurements for this case.

4.5 DRKF Propagation. The propagation of the DRKF state vector and covariance to either the next measurement update, or some other instant in time will be addressed in this section. The current system model for the DRKF is based on the 14×14 linear system matrix, F, defined in section 4.1.1, Eq. 141. This corresponds to a 14×14 state transition matrix, $\Phi$, defined in Eq. 142, which is used to propagate both the state vector and the covariance matrix over the time interval, $(t_k, t_{k+1})$.

4.5.1 DRKF State Propagation. The updated (a posteriori) state vector, $\delta \hat{\vec{x}}_k^+$, at time=$t_k$, shall be propagated to time=$t_{k+1}$, as defined in Table 2.1, $$\varepsilon \hat{\vec{x}}_{k+1}^- = \Phi_k \varepsilon \hat{\vec{x}}_k^+. \qquad \text{Eq. 240}$$

4.5.2 DRKF Covariance Propagation. The updated (a posteriori) covariance matrix, $P_k^+$, at time=$t_k$, from Eq. 233, shall be propagated to time=$t_{k+1}$, as defined in Table 2.1, $$P_{k+1}^- = \Phi_k P_k^+ \Phi_k^T + Q_k, \qquad \text{Eq. 241}$$

where the process noise covariance was defined in Eq. 151 as:

Eq. 242

$$Q_k = \begin{pmatrix} Q_{SRKF_{(11 \times 11)}} \cdot \Delta t & \vdots & 0_{(11 \times 1)} & 0_{(11 \times 1)} & 0_{(11 \times 1)} \\ \cdots & \vdots & \cdots & \cdots & \cdots \\ 0_{(1 \times 11)} & \vdots & \sigma_{\varepsilon\lambda}^2[1 - e^{-2\Delta t/\tau_{\varepsilon\lambda}}] & 0 & 0 \\ 0_{(1 \times 11)} & \vdots & 0 & \sigma_{\varepsilon\phi}^2[1 - e^{-2\Delta t/\tau_{\varepsilon\phi}}] & 0 \\ 0_{(1 \times 11)} & \vdots & 0 & 0 & \sigma_{\varepsilon h}^2[1 - e^{-2\Delta t/\tau_{\varepsilon h}}] \end{pmatrix},$$

where $\Delta t = t_{k+1} - t_k$.

Typically each host hybrid navigation system will have dynamic uncertainties for its navigation position errors. Therefore, just as for the NRKF process noise spectral density in Eq. 114 or Eq. 117, the DRKF navigation process noise should be adaptively adjusted according to the position uncertainties of the local hybrid navigation system.

4.6 DRKF Target Measurement Report Registration. The DRKF state vector, $\hat{\varepsilon\vec{x}}_k$, shall be used to correct all sensor target Measurement Reports as a function of each target's measured range ($\rho_s$), bearing ($\theta_{Bs}$), and elevation ($\theta_{Es}$). The corresponding covariance matrix, $P_k$, shall be used to quantify the uncertainty of the sensor registration corrections with respect to WGS-84. These corrections are to be applied to the sensor target Measurement Reports prior to providing the measurements to a Target Tracker and other Track Management functions. This ensures that all inputs are registered in WGS-84 prior to the initiation and maintenance of a track, and prior to correlation functions. It may be very difficult, if not impractical to correct the tracker output or track files as a post process since each target measurement correction is dependent upon target range, bearing, and elevation. It is important to note that the input to the DRKF requires sensor aperture uncorrected AMRs. That is, the DRKF corrections must not be applied to the sensor AMR inputs for the DRKF. A distinction exists between "corrected" target measurement report inputs for Track Management functions and the "uncorrected" AMR inputs for the DRKF function. If this distinction is not maintained, the estimates of the DRKF will become unstable. However, it should be noted that atmospheric refraction corrections may be applied to the "uncorrected" AMR inputs to the DRKF. In fact, as mentioned previously, that type of correction is desirable prior to providing the AMRs to the DRKF. Although the DRKF includes estimates of the Navigation Registration (NR) errors for each sensor aperture, these estimates are integrated within the NRKF in section 3 to produce the composite NR estimates and covariance. The NRKF generates the composite NR corrections and covariance relative to the host navigation system as documented in section 3.6. Therefore the DRKF is only concerned with generating SR corrections and covariance for target Measurement Reports for each sensor aperture as was defined in section 2.6 and in the sections below.

4.6.1 DRKF Target Measurement Report Correction. Sensor registration corrections in range ($\delta\rho$), bearing ($\delta\theta_B$), elevation ($\delta\theta_E$), range-rate ($\delta\rho_R$), and time ($\delta t$) for each target Measurement Report are based on a linear combination of the DRKF state estimates. This linear relationship depends on the sensor measured target range ($\rho_s$), bearing ($\theta_{Bs}$), and elevation ($\theta_{Es}$), and expressed using terms for the DRKF "H-matrix". A fifth row has been added to the DRKF "H-matrix" to incorporate a correction for the estimated time bias, $\varepsilon t$, in the sensor target Measurement Report time-tag. Therefore, the specific sensor registration corrections for a specific target Measurement Report are written as:

Eq. 243

$$\begin{pmatrix} \delta\rho \\ \delta\theta_B \\ \delta\theta_E \\ \delta\rho_R \\ \delta t \end{pmatrix}_s = \hat{H}\hat{\varepsilon\vec{x}} =$$

-continued $$\begin{pmatrix} 1 & \rho_s & 0 & 0 & 0 & 0 & 0 & 0 & 0 & 0 & 0 & 0 & 0 \\ 0 & 0 & 0 & C_{\theta_{Bs}} & S_{\theta_{Bs}} & 0 & 0 & -C_{\theta_{Bs}}T_{\theta_{Es}} & -S_{\theta_{Bs}}T_{\theta_{Es}} & 1 & 0 & 0 & 0 \\ 0 & 0 & 0 & 0 & 0 & 1 & \theta_{E_s} & S_{\theta_{Bs}} & -C_{\theta_{Bs}} & 0 & 0 & 0 & 0 \\ 0 & 0 & 1 & 0 & 0 & 0 & 0 & 0 & 0 & 0 & 0 & 0 & 0 \\ 0 & 0 & 0 & 0 & 0 & 0 & 0 & 0 & 0 & -1 & 0 & 0 & 0 \end{pmatrix} \begin{pmatrix} \varepsilon\hat{\rho} \\ \varepsilon\hat{s}f_R \\ \varepsilon\hat{\rho}_R \\ \varepsilon\hat{s}f_{Bx} \\ \varepsilon\hat{s}f_{By} \\ \varepsilon\hat{\theta}_E \\ \varepsilon\hat{s}f_E \\ \varepsilon\hat{\varphi}_x \\ \varepsilon\hat{\varphi}_y \\ \varepsilon\hat{\varphi}_z \\ \varepsilon\hat{t} \\ \varepsilon\hat{\lambda} \\ \varepsilon\hat{\phi} \\ \varepsilon\hat{h} \end{pmatrix}$$

Note that the DRKF state vector includes the NR states, but a target Measurement Report correction consists only of the SR states. The NR states are handled independently in section 3.6. The dependency of a target Measurement Report's correction on the target measurement is an important point in that the corrections are not simply estimated and then applied uniformly to every target measurement within the aperture's FOV. The application of these corrections to the "uncorrected" sensor target Measurement Report was derived from the SRKF input measurement Eq. 86. The "corrected" sensor target Measurement Report is determined by:

$$\begin{pmatrix} \rho \\ \theta_B \\ \theta_E \\ \dot{\rho} \\ t \end{pmatrix}_s = \begin{pmatrix} \rho_s \\ \theta_{B_s} \\ \theta_{E_s} \\ \dot{\rho}_s \\ t_s \end{pmatrix}_{\tilde{s}} + \begin{pmatrix} \delta\rho \\ \delta\theta_B \\ \delta\theta_E \\ \delta\rho_R \\ \delta t \end{pmatrix}_{\tilde{s}}.$$

Eq. 244

The corrections for time bias and range-rate bias are independent of the other states and may be treated separately.

4.6.2 DRKF Target Measurement Report Covariance. The corresponding 5×5 covariance matrix, representing the uncertainty in the corrections applied to a target Measurement Report using Eq. 253, is also dependent on the target measurement, and may be written as:

$$E\left\{ \begin{pmatrix} \delta\rho \\ \delta\theta_B \\ \delta\theta_E \\ \delta\rho_R \\ \delta t \end{pmatrix} \begin{pmatrix} \delta\rho & \delta\theta_B & \delta\theta_E & \delta\rho_R & \delta t \end{pmatrix} \right\}_{\tilde{s}} =$$

Eq. 245

$$\hat{H} E\left\{ \left(\varepsilon\vec{\hat{x}}_k\right)\left(\varepsilon\vec{\hat{x}}_k\right)^T \right\} \hat{H}^T = \hat{H} P_k \hat{H}^T,$$

where $P_k$ is the DRKF covariance matrix, and $\tilde{H}$ is the same target dependent matrix from Eq. 217.

Also, various inventive concepts may be embodied as one or more methods, of which an example has been provided.

The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that are executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A non-transitory computer program product including one or more machine-readable mediums encoded with instructions that when executed by one or more processors cause a process to be carried out for establishing a common reference frame for network communications, the process comprising:
    processing a first sensor data and a first navigation data on a first platform within a network;
    processing, on the first platform, self-reported position message data received from other platforms within the network;
    processing a second sensor data and a second navigation data on a second platform within the network;
    performing integrated data registration by estimating time registration errors, navigation registration errors and sensor registration errors for the first navigation data and the first sensor data on the first platform using the processed self-reported position message data as a reference to estimate the time registration errors, the navigation registration errors and the sensor registration errors;
    time-aligning the second sensor data with the first sensor data;
    differencing the time-aligned second sensor data with the first sensor data;
    estimating corrections to the first sensor data by removing at least one of time bias errors, navigation registration bias errors, and sensor bias errors for the first navigation data and the first sensor data on the first platform; and
    providing the first sensor data corrections to the at least one host system.

2. The process of claim 1, further comprising:
    receiving a third sensor data from a first navigation data source;
    receiving a fourth sensor data from a second navigation data source;
    processing the third sensor and the fourth sensor data;
    storing the third sensor data and the fourth sensor data;
    time aligning the fourth sensor data with the third sensor data;
    differencing the time-aligned fourth sensor data with the third sensor data;
    estimating corrections to the third sensor data; and
    providing the third sensor data corrections to the at least one host system.

3. The process of claim 1, further comprising:
    positioning the first sensor local to the platform;
    positioning the second sensor remote from the platform;
    positioning the first navigation data source local to the platform; and
    positioning the second navigation data source local to the platform.

4. The process of claim 3, wherein processing the first navigation data and the first sensor data on the first platform includes receiving a local associated measurement report (AMR); wherein processing the second navigation data and the second sensor data on the second platform includes receiving a common air object (CAO) report from a local source; wherein receiving the third input data from the first navigation data source includes receiving a hybrid navigation report; and wherein receiving the fourth input data from the second navigation data source includes receiving navigation reference data.

5. The process of claim 3, wherein processing the first navigation data and the first sensor data on the first platform includes receiving a local associated measurement report (AMR); wherein processing the second navigation data and the second sensor data on the second platform includes receiving a self-reported object (SRO) report from a remote source; wherein receiving the third input data from the first navigation data source includes receiving a hybrid navigation report; and wherein receiving the fourth input data from the second navigation data source includes receiving navigation reference data.

6. The process of claim 3, wherein processing the first navigation data and the first sensor data on the first platform includes receiving a local associated measurement report (AMR); wherein processing the second navigation data and the second sensor data on the second platform includes receiving a common air object (CAO) report from a remote source; wherein receiving the third input data from the first navigation data source includes receiving a hybrid navigation report; and wherein receiving the fourth input data from the second navigation data source includes receiving navigation reference data.

7. The process of claim 1, further comprising:
positioning the first sensor local to the platform;
positioning the data source local to the platform;
positioning the first navigation data source local to the platform; and
positioning the second navigation data source local to the platform.

8. The process of claim 7, wherein processing the first navigation data and the first sensor data on the first platform includes receiving a local associated measurement report (AMR); wherein processing the second navigation data and the second sensor data on the second platform includes receiving a self-reported object (SRO) report from a remote source; wherein receiving the third input data from the first navigation data source includes receiving a hybrid navigation report; and wherein receiving the fourth input data from the second navigation data source includes receiving navigation reference data.

9. The process of claim 7, wherein processing the first navigation data and the first sensor data on the first platform includes receiving a local associated measurement report (AMR); wherein processing the second navigation data and the second sensor data on the second platform includes receiving a common air object (CAO) report from a local source; wherein receiving the third input data from the first navigation data source includes receiving a hybrid navigation report; and wherein receiving the fourth input data from the second navigation data source includes receiving navigation reference data.

10. The process of claim 7, wherein processing the first navigation data and the first sensor data on the first platform includes receiving a local associated measurement report (AMR); wherein processing the second navigation data and the second sensor data on the second platform includes receiving a common air object (CAO) report from a remote source; wherein receiving the third input data from the first navigation data source includes receiving a hybrid navigation report; and wherein receiving the fourth input data from the second navigation data source includes receiving navigation reference data.

11. A system for establishing a common reference frame for network communications on a platform to precisely align both navigation and sensor data, the system comprising:
a platform having at least two distinct navigation data sources;
a first sensor, wherein the first sensor provides a first input data and includes first sensor data and first navigation data;
a second sensor; wherein the second sensor provides a second input data; and includes second sensor data and second navigation data;
a network communication system capable of receiving self-reported position message data from other platforms within the network;
at least one non-transitory computer readable storage medium, in operative communication with the one platform, the first sensor system and the first navigation system, having at least one set of instructions encoded thereon that, when executed by at least one processor, performs operations to establish a common reference frame and a common spatial reference frame for the platform, the operations including:
processing a first sensor data and a first navigation data on a first platform;
processing self-reported position message data received from other platforms within the network on the first platform;
processing a second sensor data and a second navigation data on a second platform within the network;
performing integrated data registration by estimating time registration errors, navigation registration errors and sensor registration errors for the first navigation data and the first sensor data on the first platform using the processed self-reported position message data as a reference to estimate the time registration errors, the navigation registration errors and the sensor registration errors;
time-aligning the second sensor data with the first sensor data;
differencing the time-aligned second sensor data with the first sensor data;
estimating corrections to the first sensor data by removing at least one of time bias errors, navigation registration bias errors, and sensor bias errors for the first navigation data and the first sensor data on the first platform; and
providing the first sensor data corrections to the at least one host system.

12. The system of claim 11, further comprising:
a first navigation data source; wherein the first navigation data source provides a third input data;
a second navigation data source; wherein the second navigation data source provides a fourth input data; and
wherein the instructions further include:
processing the third input and the fourth input data;
storing the third sensor data and the fourth sensor data;
time aligning the fourth sensor data with the third sensor data;
differencing the time-aligned fourth sensor data with the third sensor data;
estimating corrections to the third sensor data; and
providing the third sensor data corrections to the at least one host system.

13. A method for establishing a common reference frame for network communications on a platform to precisely align both navigation and sensor data, the method comprising:

providing a first platform;
providing a second platform;
processing first sensor data and first navigation data on the first platform within a network;
processing self-reported position message data received from other platforms within the network on the first platform;
performing integrated data registration by estimating time registration errors, navigation registration errors and sensor registration errors for the first navigation data and the first sensor data on the first platform using the processed self-reported position message data as a reference to estimate the time registration errors, the navigation registration errors and the sensor registration errors;
time-aligning the second sensor data with the first sensor data;
differencing the time-aligned second sensor data with the first sensor data;
estimating corrections to the first sensor data by removing at least one of time bias errors, navigation registration bias errors, and sensor bias errors for the first navigation data and the first sensor data on the first platform; and
providing the first sensor data corrections to the at least one host system.

14. The method of claim 13, further comprising:
receiving a third input data from a first navigation data source;
receiving a fourth input data from a second navigation data source;
processing the third input and the fourth input data;
storing the third sensor data and the fourth sensor data;
time aligning the fourth sensor data with the third sensor data;
differencing the time-aligned fourth sensor data with the third sensor data;
estimating corrections to the third sensor data; and
providing the third sensor data corrections to the at least one host system.

* * * * *